(12) United States Patent
Kennemur et al.

(10) Patent No.: US 11,897,987 B2
(45) Date of Patent: Feb. 13, 2024

(54) POLYMERS DERIVED FROM BIOMASS

(71) Applicant: The Florida State University Research Foundation, Inc., Tallahassee, FL (US)

(72) Inventors: Justin Kennemur, Tallahassee, FL (US); Mark Yarolimek, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 17/695,008

(22) Filed: Mar. 15, 2022

(65) Prior Publication Data

US 2022/0289885 A1 Sep. 15, 2022

Related U.S. Application Data

(60) Provisional application No. 63/161,088, filed on Mar. 15, 2021.

(51) Int. Cl.
*C08F 232/04* (2006.01)
*C08F 4/80* (2006.01)

(52) U.S. Cl.
CPC .............. *C08F 232/04* (2013.01); *C08F 4/80* (2013.01); *C08F 2410/01* (2013.01)

(58) Field of Classification Search
CPC .................. C08F 232/04; C08G 2261/418
See application file for complete search history.

(56) References Cited

PUBLICATIONS

Abraham, R. J.; Canton, M.; Griffiths, L., Proton chemical shifts in NMR: Part 17. Chemical shifts in alkenes and anisotropic and steric effects of the double bond. Magnetic Resonance in Chemistry 2001, 39 (8), 421-431.
Abraham, R. J.; Cooper, M. A.; Indyk, H.; Siverns, T. M.; Whittaker, D., The NMR spectra and conformations of cyclic compounds—VII: The conformations of β-pinene, pinocarvone and the cis- and trans-pinocarveols. Organic Magnetic Resonance 1973, 5 (8), 373-377.
Bhatia, S. Global Impact of the Modern Pine Chemical Industry; Pine Chemicals Association International: 2016.
Blankespoor, R. L.; Piers, K., Hydroboration-oxidation of (1R)-(+)-alpha-pinene to isopinocampheol: A microscale experiment that displays regio- and stereochemistry using NMR spectroscopy and molecular mechanics calculations. Journal of Chemical Education 1991, 68 (8), 693.
Brits, S.; Neary, W. J.; Palui, G.; Kennemur, J. G., A new echelon of precision polypentenamers: highly isotactic branching on every five carbons. Polymer Chemistry 2018, 9 (13), 1719-1727.
Brown, H. C.; Tierney, P. A., The Reaction of Lewis Acids of Boron with Sodium Hydride and Borohydride1. Journal of the American Chemical Society 1958, 80 (7), 1552-1558.
Brown, H. C.; Zweifel, G., A Stereospecific Cis Hydration of the Double Bond in Cyclic Derivatives. Journal of the American Chemical Society 1959, 81 (1), 247-247.

(Continued)

*Primary Examiner* — Catherine S Branch
(74) *Attorney, Agent, or Firm* — Meunier Carlin & Curfman LLC

(57) ABSTRACT

Disclosed are polymers derived from biomass. More specifically described are δ-pinene-based polymers, copolymers and compositions comprising δ-pinene-based polymers. Also disclosed are methods of making the same.

29 Claims, 22 Drawing Sheets

(56) References Cited

PUBLICATIONS

Burwell, R. L., The Mechanism of the Pyrolyses of Pinenes. Journal of the American Chemical Society 1951, 73 (9), 4461-4462.

Chae, C.-G .; Yu, Y.-G.; Seo, H.-B.; Kim, M.-J.; Kishore, M. Y. L. N.; Lee, J.-S., Molecular and kinetic design for the expanded control of molecular weights in the ring-opening metathesis polymerization of norbornene-substituted polyhedral oligomeric silsesquioxanes. Polymer Chemistry 2018, 9 (42), 5179-5189.

Chen, Z.; Zhu, X.; Yang, J.; Mercer, J. A. M.; Burns, N. Z.; Martinez, T. J.; Xia, Y., The cascade unzipping of ladderane reveals dynamic effects in mechanochemistry. Nature Chemistry 2020, 12 (3), 302-309.

Della Monica, F.; Kleij, A. W., From terpenes to sustainable and functional polymers. Polymer Chemistry 2020.

Firdaus, M.; Montero de Espinosa, L.; Meier, M. A. R., Terpene-Based Renewable Monomers and Polymers via Thiol-Ene Additions. Macromolecules 2011, 44 (18), 7253-7262.

Forcina, V.; García-Domínguez, A.; Lloyd-Jones, G. C., Kinetics of initiation of the third generation Grubbs metathesis catalyst: convergent associative and dissociative pathways. Faraday Discussions 2019, 220 (0), 179-195.

Fried, A. D.; Brantley, J. N., Controlled Polymerization of β-Pinadiene: Accessing Unusual Polymer Architectures with Biomass-Derived Monomers. ACS Macro Letters 2020, 9 (4), 595-599.

Frisch, M. J.; et al., Gaussian 09 E.01(Gaussian, Inc.), Wallingford CT, 2013.

Gandini, A., The irruption of polymers from renewable resources on the scene of macromolecular science and technology. Green Chemistry 2011, 13 (5), 1061-1083.

Geyer, R.; Jambeck, J. R.; Law, K. L., Production, use, and fate of all plastics ever made. Science Advances 2017, 3 (7).

Groß, J .; Kühlborn, J.; Opatz, T., Applications of xylochemistry from laboratory to industrial scale. Green Chemistry 2020, 22 (14), 4411-4425.

Guillory, G. A.; Kennemur, J. G., Investigating the effects of bulky allylic substituents on the regioregularity and thermodynamics of ROMP on cyclopentene. European Polymer Journal 2019, 120, 109251.

Higashimura, T.; Lu, J.; Kamigaito, M.; Sawamoto, M.; Deng, Y.-X., Cationic polymerization of α-pinene with the binary catalyst AlCl3/SbCl3. Die Makromolekulare Chemie 1992, 193 (9), 2311-2321.

Higashimura, T.; Lu, J.; Kamigaito, M.; Sawamoto, M.; Deng, Y.-X., Cationic polymerization of α-pinene with aluminium-based binary catalysts, 2. Survey of catalyst systems. Die Makromolekulare Chemie 1993, 194 (12), 3441-3453.

Hsu, T.-G .; Zhou, J.; Su, H.-W.; Schrage, B. R.; Ziegler, C. J.; Wang, J., A Polymer with "Locked" Degradability: Superior Backbone Stability and Accessible Degradability Enabled by Mechanophore Installation. Journal of the American Chemical Society 2020, 142 (5), 2100-2104.

Kaltschnee, L.; Kolmer, A.; Timári, I.; Schmidts, V.; Adams, R. W.; Nilsson, M.; Kövér, K. E.; Morris, G. A.; Thiele, C. M., "Perfecting" pure shift HSQC: full homodecoupling for accurate and precise determination of heteronuclear couplings. Chemical Communications 2014, 50 (99), 15702-15705.

Kawaguchi, H.; Ogino, C.; Kondo, A., Microbial conversion of biomass into bio-based polymers. Bioresource Technology 2017, 245, 1664-1673.

Kennedy, J. P.; Chou, T. In Poly(isobutylene-co-β-pinene) a new sulfur vulcanizable, ozone resistant elastomer by cationic isomerization copolymerization, Mechanisms of Polyreactions-Polymer Characterization, Berlin, Heidelberg, 1976//; Springer Berlin Heidelberg: Berlin, Heidelberg, 1976; pp. 1-30.

Keszler, B.; Kennedy, J. P., Synthesis of high molecular weight poly (β-pinene). In Macromolecules: Synthesis, Order and Advanced Properties, Springer Berlin Heidelberg: Berlin, Heidelberg, 1992; pp. 1-9.

Kobayashi, S.; Pitet, L. M.; Hillmyer, M. A., Regio- and Stereoselective Ring-Opening Metathesis Polymerization of 3-Substituted Cyclooctenes. Journal of the American Chemical Society 2011, 133 (15), 5794-5797.

Kolehmainen, E.; Laihia, K.; Laatikainen, R.; Vepsäläinen, J.; Niemitz, M.; Suontamo, R., Complete Spectral Analysis of the 1H NMR 16-Spin System of β-Pinene. Magnetic Resonance in Chemistry 1997, 35 (7), 463-467.

Kolicheski, M. B.; Cocco, L. C.; Mitchell, D. A.; Kaminski, M., Synthesis of myrcene by pyrolysis of β-pinene: Analysis of decomposition reactions. Journal of Analytical and Applied Pyrolysis 2007, 80 (1), 92-100.

Kukhta, N. A.; Vasilenko, I. V.; Kostjuk, S. V., Room temperature cationic polymerization of β-pinene using modified AlCl3 catalyst: toward sustainable plastics from renewable biomass resources. Green Chemistry 2011, 13 (9), 2362- 2364.

Li, J.; Nagamani, C.; Moore, J. S., Polymer Mechanochemistry: From Destructive to Productive. Accounts of Chemical Research 2015, 48 (8), 2181-2190.

Liu, S.; Zhou, L.; Yu, S.; Xie, C.; Liu, F.; Song, Z., Polymerization of a-pinene using Lewis acidic ionic liquid as catalyst for production of terpene resin. Biomass and Bioenergy 2013, 57, 238-242.

Liu, Z.; Zhang, T.; Zeng, W.; Zhu, H.; An, X., Cationic polymerization of α-pinene using Keggin silicotungstic acid as a homogeneous catalyst. Reaction Kinetics, Mechanisms and Catalysis 2011, 104 (1), 125.

Llevot, A.; Dannecker, P.-K.; von Czapiewski, M.; Over, L. C.; Söyler, Z.; Meier, M. A. R., Renewability is not Enough: Recent Advances in the Sustainable Synthesis of Biomass-Derived Monomers and Polymers. Chemistry—A European Journal 2016, 22 (33), 11510-11521.

Lu, J.; Kamigaito, M.; Sawamoto, M.; Higashimura, T.; Deng, Y.-X., Living Cationic Isomerization Polymerization of β-Pinene. 1. Initiation with HCl-2-Chloroethyl Vinyl Ether Adduct/TiCl3(OiPr) in Conjunction with nBu4NCl. Macromolecules 1997, 30 (1), 22-26.

Lu, J.; Kamigaito, M.; Sawamoto, M.; Higashimura, T.; Deng, Y.-X., Cationic polymerization of B-pinene with the AlCl3/SbCl3 binary catalyst: Comparison with α-pinene polymerization. Journal of Applied Polymer Science 1996, 61 (6), 1011-1016.

Martinez, H.; Miró, P.; Charbonneau, P.; Hillmyer, M. A.; Cramer, C. J., Selectivity in Ring-Opening Metathesis Polymerization of Z-Cyclooctenes Catalyzed by a Second-generation Grubbs Catalyst. ACS Catalysis 2012, 2 (12), 2547-2556.

Martinez, H.; Zhang, J.; Kobayashi, S.; Xu, Y.; Pitet, L. M.; Matta, M. E.; Hillmyer, M. A., Functionalized regio-regular linear polyethylenes from the ROMP of 3-substituted cyclooctenes. Applied Petrochemical Research 2015, 5 (1), 19-25.

Mazzola, E. P.; Lambert, J. B.; Ridge, C. D., The shielding effect of the double bond in 2-norbornene and α-pinene and β-pinene. Journal of Physical Organic Chemistry 2018, 31 (8), e3816.

Miller, R. G.; Sorrell, S. R., The future of oil supply. Philosophical transactions. Series A, Mathematical, physical, and engineering sciences 2013, 372 (2006), 20130179-20130179.

Miyaji, H.; Satoh, K.; Kamigaito, M., Bio-Based Polyketones by Selective Ring-Opening Radical Polymerization of α-Pinene-Derived Pinocarvone. Angewandte Chemie International Edition 2016, 55 (4), 1372-1376.

Muhs, M. A.; Weiss, F. T., Determination of Equilibrium Constants of Silver-Olefin Complexes Using Gas Chromatography. Journal of the American Chemical Society 1962, 84 (24), 4697-4705.

Nielsen, A. B.; Holder, A. J. Gauss View 5.0, User's Reference. Gaussian Inc., Pittsburgh, PA., 2009.

Pinho, P. G.; Pio, C. A.; Carter, W. P. L.; Jenkin, M. E., Evaluation of α- and β-pinene degradation in the detailed tropospheric chemistry mechanism, MCM v3.1, using environmental chamber data. Journal of Atmospheric Chemistry 2007, 57 (2), 171-202.

Quilter, H. C.; Hutchby, M.; Davidson, M. G.; Jones, M. D., Polymerisation of a terpene-derived lactone: a bio-based alternative to ε- caprolactone. Polymer Chemistry 2017, 8 (5), 833-837.

Rablen, P. R., A Procedure for Computing Hydrocarbon Strain Energies Using Computational Group Equivalents, with Application to 66 Molecules †. Chemistry 2020, 2 (2).

(56) References Cited

PUBLICATIONS

Royzen, M.; Yap, G. P. A.; Fox, J. M., A Photochemical Synthesis of Functionalized trans-Cyclooctenes Driven by Metal Complexation. Journal of the American Chemical Society 2008, 130 (12), 3760-3761.

Sanford, M. S.; Love, J. A.; Grubbs, R. H., A Versatile Precursor for the Synthesis of New Ruthenium Olefin Metathesis Catalysts. Organometallics 2001, 20 (25), 5314-5318.

Satoh, K., Controlled/living polymerization of renewable vinyl monomers into bio-based polymers. Polymer Journal 2015, 47 (8), 527-536.

Satoh, K.; Nakahara, A.; Mukunoki, K.; Sugiyama, H.; Saito, H.; Kamigaito, M., Sustainable cycloolefin polymer from pine tree oil for optoelectronics material: living cationic polymerization of β-pinene and catalytic hydrogenation of high-molecular-weight hydrogenated poly(β-pinene). Polymer Chemistry 2014, 5 (9), 3222-3230.

Schmedding, R.; Ma, M.; Zhang, Y.; Farrell, S.; Pye, H. O. T.; Chen, Y.; Wang, C.-t.; Rasool, Q. Z.; Budisulistiorini, S. H.; Ault, A. P.; Surratt, J. D.; Vizuete, W., α-Pinene-Derived organic coatings on acidic sulfate aerosol impacts secondary organic aerosol formation from isoprene in a box model. Atmospheric Environment 2019, 213, 456-462.

Sibaja, B.; Sargent, J.; Auad, M. L., Renewable thermoset copolymers from tung oil and natural terpenes. Journal of Applied Polymer Science 2014, 131 (23).

Silvestre, A. J. D.; Gandini, A., Chapter 2—Terpenes: Major Sources, Properties and Applications. In Monomers, Polymers and Composites from Renewable Resources, Belgacem, M. N.; Gandini, A., Eds. Elsevier: Amsterdam, 2008; pp. 17-38.

Stadler, B. M.; Wulf, C.; Werner, T.; Tin, S.; de Vries, J. G., Catalytic Approaches to Monomers for Polymers Based on Renewables. ACS Catalysis 2019, 9 (9), 8012-8067.

Stamm, A.; Biundo, A.; Schmidt, B.; Brücher, J.; Lundmark, S.; Olsén, P.; Fogelström, L.; Malmström, E.; Bornscheuer, U. T.; Syrén, P.-O., A Retro-biosynthesis-Based Route to Generate Pinene-Derived Polyesters. ChemBioChem 2019, 20 (13), 1664-1671.

Stockmann, P. N.; Pastoetter, D. L.; Woelbing, M.; Falcke, C.; Winnacker, M.; Strittmatter, H.; Sieber, V., New Bio-Polyamides from Terpenes: α-Pinene and (+)-3-Carene as Valuable Resources for Lactam Production. Macromolecular Rapid Communications 2019, 40 (11), 1800903.

Strick, B. F.; Delferro, M.; Geiger, F. M.; Thomson, R. J., Investigations into Apopinene as a Biorenewable Monomer for Ring-Opening Metathesis Polymerization. ACS Sustainable Chemistry & Engineering 2015, 3 (7), 1278-1281.

Stubba, D.; Lahm, G.; Geffe, M.; Runyon, J. W.; Arduengo III, A. J.; Opatz, T., Xylochemistry—Making Natural Products Entirely from Wood. Angewandte Chemie International Edition 2015, 54 (47), 14187-14189.

Su, J. K.; Feist, J. D.; Yang, J.; Mercer, J. A. M.; Romaniuk, J. A. H.; Chen, Z.; Cegelski, L.; Burns, N. Z.; Xia, Y., Synthesis and Mechanochemical Activation of Ladderene-Norbornene Block Copolymers. Journal of the American Chemical Society 2018, 140 (39), 12388-12391.

Szakonyi, Z.; Martinek, T. A.; Sillanpää, R.; Fülöp, F., Regio- and stereoselective synthesis of the enantiomers of monoterpene-based β-amino acid derivatives. Tetrahedron: Asymmetry 2007, 18 (20), 2442-2447.

Takahashi, H.; Sakuragi, M.; Hasegawa, M., A photodegradable polymer: Polyhexamethylene-α-truxillamide. Journal of Polymer Science Part B: Polymer Letters 1971, 9 (9), 685-688.

Tateyama, S.; Masuo, S.; Suvannasara, P.; Oka, Y.; Miyazato, A.; Yasaki, K.; Teerawatananond, T.; Muangsin, N.; Zhou, S.; Kawasaki, Y.; Zhu, L.; Zhou, Z.; Takaya, N.; Kaneko, T., Ultrastrong, Transparent Polytruxillamides Derived from Microbial Photodimers. Macromolecules 2016, 49 (9), 3336-3342.

Tuba, R.; Al-Hashimi, M.; Bazzi, H. S.; Grubbs, R. H., One-Pot Synthesis of Poly(vinyl alcohol) (PVA) Copolymers via Ruthenium Catalyzed Equilibrium Ring-Opening Metathesis Polymerization of Hydroxyl Functionalized Cyclopentene. Macromolecules 2014, 47 (23), 8190-8195.

Wang, Z.; Miller, B.; Mabin, M.; Shahni, R.; Wang, Z. D.; Ugrinov, A.; Chu, Q. R., Cyclobutane-1,3-Diacid (CBDA): A Semi-Rigid Building Block Prepared by [2+2] Photocyclization for Polymeric Materials. Scientific Reports 2017, 7 (1), 13704.

Weems, A. C.; Delle Chiaie, K. R.; Worch, J. C.; Stubbs, C. J.; Dove, A. P., Terpene- and terpenoid-based polymeric resins for stereolithography 3D printing. Polymer Chemistry 2019, 10 (44), 5959-5966.

Wilbon, P. A.; Chu, F.; Tang, C., Progress in Renewable Polymers from Natural Terpenes, Terpenoids, and Rosin. Macromolecular Rapid Communications 2013, 34 (1), 8-37.

Winnacker, M., Pinenes: Abundant and Renewable Building Blocks for a Variety of Sustainable Polymers. Angewandte Chemie International Edition 2018, 57 (44), 14362-14371.

Winnacker, M.; Lamparelli, D. H.; Capacchione, C.; Güngör, H. H.; Stieglitz, L.; Rodewald, K. S.; Schmidt, M.; Gronauer, T. F., Sustainable Polyesteramides and Copolyamides: Insights into the Copolymerization Behavior of Terpene-Based Lactams. Macromolecular Chemistry and Physics 2020, 221 (12), 2000110.

Winnacker, M.; Sag, J.; Tischner, A.; Rieger, B., Sustainable, Stereoregular, and Optically Active Polyamides via Cationic Polymerization of ε-Lactams Derived from the Terpene β-Pinene. Macromolecular Rapid Communications 2017, 38 (9), 1600787.

Winnacker, M.; Sag, J., Sustainable terpene-based polyamides via anionic polymerization of a pinene-derived lactam. Chemical Communications 2018, 54 (7), 841-844.

Yarolimek et al. "Investigating the effect of a-pinene on the ROMP of δ-pinene" in Polymer Chemistry, 2021, 12, 5048.

Yu, P.; Li, A.- L.; Liang, H.; Lu, J., Polymerization of β-pinene with Schiff-base nickel complexes catalyst: Synthesis of relatively high molecular weight poly(β- pinene) at high temperature with high productivity. Journal of Polymer Science Part A: Polymer Chemistry 2007, 45 (16), 3739-3746.

Zannoni, N.; Leppla, D.; Lembo Silveira de Assis, P. I.; Hoffmann, T.; Sá, M.; Araújo, A.; Williams, J., Surprising chiral composition changes over the Amazon rainforest with height, time and season. Communications Earth & Environment 2020, 1 (1), 4.

Zhang, J.; Deubler, R.; Hartlieb, M.; Martin, L.; Tanaka, J.; Patyukova, E.; Topham, P. D.; Schacher, F. H.; Perrier, S., Evolution of Microphase Separation with Variations of Segments of Sequence-Controlled Multiblock Copolymers. Macromolecules 2017, 50 (18), 7380-7387.

POLYMERS DERIVED FROM BIOMASS

CROSS-REFERENCE TO RELATED APPLICATIONS

This application claims the benefit of U.S. Provisional Application No. 63/161,088 filed Mar. 15, 2021, the content of which is incorporated herein by reference in its entirety.

TECHNICAL FIELD

The current disclosure relates to polymers derived from δ-pinene and methods of making the same.

BACKGROUND

Of the 380 million metric tons of plastic produced in 2015, only approximately 1% was either bio-based or bio-derived. Traditional plastics have historically utilized petrochemicals as a feedstock due to the cheap abundance and production available throughout the $20^{th}$ century. However, looming predictions of 'peak oil' expect a reduction of the supply and an increase in the cost of this finite resource. This presents an issue in the precursory supply of many polymers that have become a mainstay in the lives of modern society. Chemicals rich in hydrocarbons such as terpenes, terpenoids, and rosins have led to the burgeoning field of biomass-derived plastics as a potential alternative petrochemical source.

Terpenes, a class of xylochemicals derived from woody biomass, are a promising sustainable feedstock due to their hydrocarbon structures, chirality, and unsaturation. Naturally, present olefins make these molecules amenable to polymerization and afford multiple potential polymers akin to the polyolefins that have historically accounted for approximately half of all plastic produced. The most common source of terpenes, turpentine, is derived from abundant pine trees and is already produced at a rate of approximately 350,000 tons per annum. In addition to this already established supply, modern advances have allowed pine tappers to harvest 4 to 6 times more trees than traditional methods. The industry has an increased focus on sustainable harvesting practices affording potential for large increases in annual production. The exact chemical composition of tree extracts is surprisingly complex and may vary by tree species, age, geographical location, and season. Nevertheless, they are primarily composed of α-pinene (45-97%) and β-pinene (0.5-28%) with varying quantities of other monoterpenes. Pinene's abundance in inedible plant matter, and relative ease of isolation, has drawn the interest of researchers aiming to capitalize on this promising class of chemicals through various polymerization strategies for a wide range of uses; 3D printing, coatings, optoelectronics, pressure-sensitive adhesives, tackifying agents, and as additives in rubbers, to name a few.

Despite the higher abundance of α-pinene, most polymerization strategies have historically focused on β-pinene, which features a terminal and exocyclic olefin. This is because of the steric hindrance associated with the trisubstituted alkene in α-pinene, leading to polymerization difficulty. Much of the focus on β-pinene has centered around using Lewis acids for cationic ring opening polymerizations (ROP) through β-scission of the cyclobutane and subsequent creation of a tertiary cation species suitable for propagation. While not universally true, this route is typically limited to polymers with low molecular weights (<20 kg $mol^{-1}$) and, therefore, poor material properties. Other explored uses of the β isomer have involved polyamides synthesized through both cationic and anionic methods in addition to materials produced through polyesterifications and vinyl-addition polymerizations of various β-pinene derivatives.

While α-pinene has also been successfully produced through cationic means, these reactions are more tedious and require harsh reagents that have a host of issues, including worse ecological impacts. To create a more polymerizable monomer, α-pinene has seen utilization as a precursor feedstock to create a range of functionalized materials, including polyolefins, polyesters polyamides, polycarbonates, polyketones, and resins.

Of particular interest of all the multitude of pinene derivatives are those polymers that contain a cyclobutane into the polymeric backbone. Multiple polymers containing a singular carbon-carbon bond of cyclobutane have been previously synthesized and extensively studied for their unique responses to mechanical stimuli and have been deemed "mechanophores." Conversely, relatively few polymers have been created with three vertices of a cyclobutane unit directly incorporated into their backbone. Of those materials that have been made, mechanical strength has been far superior to analogous transparent plastics due to the spring-like functioning of the cyclobutanyl backbone.

Thus, there is a need for a substantially biomass-derived polymer with unique and desirable mechanical properties and for the methods of making the same. These needs and other needs are at least partially satisfied by the present disclosure.

SUMMARY

In accordance with the purposes of the disclosed materials and methods, as embodied and broadly described herein, the disclosed subject matter, in one aspect, relates to compounds, compositions and methods of making and using compounds and compositions.

In some aspects, disclosed herein is a polymer comprising a repeating unit of formula (I):

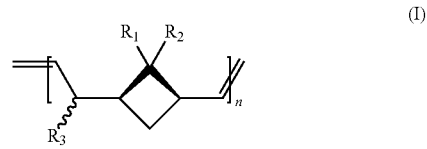

wherein,
$R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, $C(O)R'$, $C(O)NH_2$, $C(O)NHR'$ wherein each of $R_1$, $R_2$, $R_3$, independent of the other, is optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol;
wherein R' is independently chosen from $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, any of which are optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

Still, in further aspects, the disclosed herein polymer is thermoplastic. In yet further aspects, the disclosed herein polymer has an average molecular weight from about 100 to about 500,000 Dalton. In yet further aspects, the polymer disclosed herein has a glass transition temperature from about 70° C. to about 140° C. In yet further aspects, the disclosed herein polymer is substantially biomass based.

Also disclosed herein are articles comprising any of the described herein polymers.

In still further aspects, disclosed herein is a composition comprising: a) any of the disclosed herein polymers in an amount from greater than 0% to less than 100% by the weight of the composition; and b) an additive, wherein the additive reacts with a ring opened product of the polymer.

In still further aspects, disclosed herein is a copolymer composition comprising: a) a repeating unit comprising a monomer of any of the disclosed herein polymers present in an amount from greater than 0% to less than 100% of the copolymer composition; and b) a repeating unit comprising a monomer of a further polymer, wherein the further polymer is different from the polymer of a).

In still further aspects, the further polymer can comprise a cycloolefin. In yet other aspects, the copolymer can further comprise at least one additional repeating unit comprising a monomer that is different from a) and b).

In yet further aspects, the copolymer can comprise a block copolymer, a statistical copolymer, or a combination thereof.

In certain aspects, disclosed are methods comprising polymerizing a δ-pinene in the presence of a catalyst, thereby forming a polymer having a structure of Formula (I):

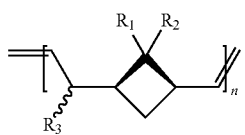

(I)

wherein
$R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, C(O)R', C(O)NH$_2$, C(O)NHR' wherein each of $R_1$, $R_2$, $R_3$, independent of the other, is optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol;
wherein R' is independently chosen from $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, any of which are optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

In still further aspects, the catalyst can be a ring-opening metathesis polymerization (ROMP) catalyst.

Also disclosed herein are methods of forming copolymers. In such aspects, the method comprises forming a copolymer comprising: i) a repeating unit comprising a monomer of any of the disclosed herein δ-pinene-based polymers present in an amount from greater than 0% to less than 100% of the copolymer composition; and ii) a repeating unit comprising a monomer of a further polymer, wherein the further polymer is different from the polymer of i); wherein the step of forming comprising a reaction in the presence of a catalyst.

Additional advantages will be set forth, in part, in the detailed figures and claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIG. 9A Conversion of δ-pinene to poly(δ-pinene) as a function of time. Monomer conversion was calculated through the loss of monomer olefin peaks (6.11, 5.55 ppm) relative to the growth of polymer olefin peaks (5.29, 5.16 ppm); FIG. 9B Number-average molar mass (M$_n$, solid squares) and dispersity (Đ, open squares) as a function of initial monomer-to-initiator ratio multiplied by conversion targeting a range of molecular weights. Polymerizations were conducted at 1.0 M concentration in CDCl$_3$ at 23° C. for 1 hour each.

FIG. 1A Conversion of δ-pinene to poly(δ-pinene) as a function of mole fraction of α-pinene inclusion in the monomer feedstock ($X_{\alpha\text{-pinene}}$). Monomer conversion was calculated through the loss of monomer olefin peaks (6.11, 5.55 ppm) relative to the growth of polymer olefin peaks (5.29, 5.16 ppm). Polymerizations were targeting 20 kDa molar mass ($[M]_0/[I]_0=147$); FIG. 15B Number-average molar mass ($M_n$, solid squares) and dispersity (Đ, open squares) as a function of initial monomer-to-initiator ratio multiplied by conversion targeting a range of molecular weights. Polymerizations were conducted at 1.0 M concentration in $CDCl_3$ at 23° C. for 1 hour each.

DETAILED DESCRIPTION

Figure 1:
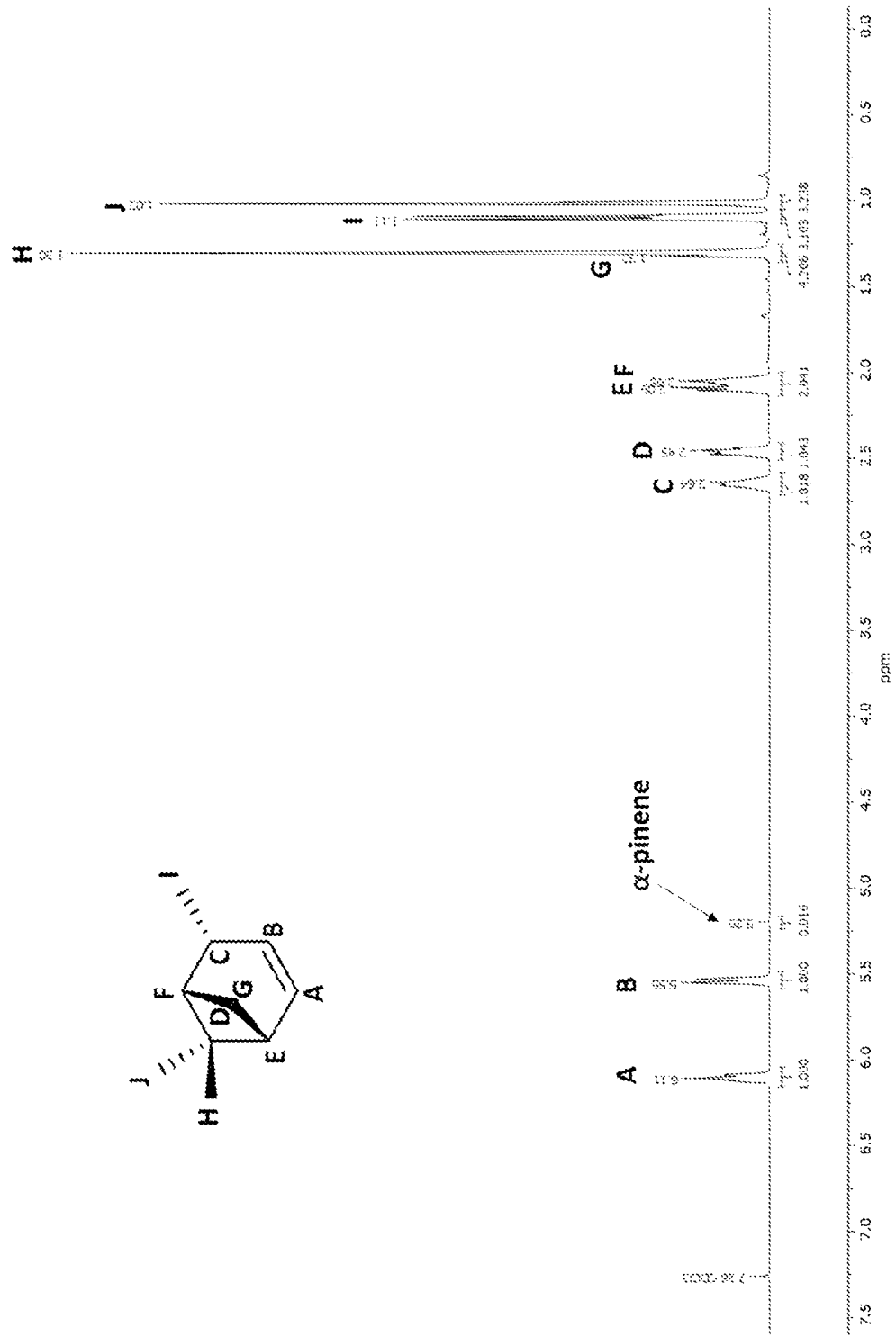
FIG. 1 shows a $^1$H NMR spectrum (CDCl$_3$, 25° C.) of δ-pinene.

The materials, compounds, compositions, and methods described herein may be understood more readily by reference to the following detailed description of specific aspects of the disclosed subject matter, the FIGURES, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entirety are hereby incorporated by reference into this application to more fully describe the state of the art to which the disclosed matter pertains. The references disclosed are also individually and specifically incorporated by reference herein for the material contained in them that is discussed in the sentence in which the reference is relied upon.

Definitions

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used herein, the terms "optional" or "optionally" mean that the subsequently described event or circumstance can or cannot occur and that the description includes instances where said event or circumstance occurs and instances where it does not.

As used in the description and the appended claims, the singular forms "a," "an," and "the" include plural referents unless the context clearly dictates otherwise. Thus, for example, reference to "a composition" includes mixtures of two or more such compositions, reference to "a monomer" includes mixtures of two or more such monomers and the like.

The term "comprising" and variations thereof used herein are used synonymously with the term "including," and variations thereof and are open, non-limiting terms. Although the terms "comprising" and "including" have been used herein to describe various examples, the terms "consisting essentially of" and "consisting of" can be used in place of "comprising" and "including" to provide for more specific examples of the invention and are also disclosed. Other than in the examples, or where otherwise noted, all numbers expressing quantities of ingredients, reaction conditions, and so forth used in the specification and claims are to be understood at the very least and not as an attempt to limit the application of the doctrine of equivalents to the scope of the claims, to be construed in light of the number of significant digits and ordinary rounding approaches.

For the terms "for example" and "such as," and grammatical equivalences thereof, the phrase "and without limitation" is understood to follow unless explicitly stated otherwise.

As used herein, the term "biomass" means a renewable material generally comprising carbon-based biological material derived from living or recently-living organisms. Suitable feedstocks include lignocellulosic feedstock, cellulosic feedstock, hemicellulose feedstock, starch-containing feedstocks, etc. The lignocellulosic feedstock can be from any lignocellulosic biomass, such as plants (e.g., duckweed, annual fibers, etc.), trees (softwood, e.g., fir, pine, spruce, etc.; tropical wood, e.g., balsa, iroko, teak, etc.; or hardwood, e.g., elm, oak, aspen, pine, poplar, willow, eucalyptus, etc.), bushes, grass (e.g., miscanthus, switchgrass, rye, reed canary grass, giant reed, or sorghum), dedicated energy crops, municipal waste (e.g., municipal solid waste), and/or a by-product of an agricultural product. Biomass can also include fruits, fungi, flowers, and the like. The biomass can be from a virgin source (e.g., a forest, woodland, or farm) and/or a by-product of a processed source (e.g., off-cuts, bark, and/or sawdust from a paper mill or sawmill, sugarcane bagasse, corn stover, palm oil industry residues, branches, leaves, roots, and/or hemp). Suitable feedstocks may also include the constituent parts of any of the feedstocks.

As used herein, the term "substituted" means that a hydrogen atom is removed and replaced by a substituent. It is contemplated to include all permissible substituents of organic compounds. As used herein, the phrase "optionally substituted" means unsubstituted or substituted. It is to be understood that substitution at a given atom is limited by valency. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein, which satisfy the heteroatoms' valencies. This disclosure is not intended to be limited in any manner by the permissible substituents of organic compounds. Also, the terms "substitution" or "substituted with" include the implicit proviso that such substitution is in accordance with the permitted valence of the substituted atom and the substituent and that the substitution results in a stable compound, e.g., a compound that does not spontaneously undergo transformation such as by rearrangement, cyclization, elimination, etc. In still further aspects, it is understood that when the disclosure describes a group being substituted, it means that the group is substituted with one or more (i.e., 1, 2, 3, 4, or 5) groups as allowed by valence selected from alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "compound," as used herein, includes all stereoisomers, geometric isomers, tautomers, and isotopes of the structures depicted. Compounds identified by name or structure as one particular tautomeric form are intended to include other tautomeric forms unless otherwise specified.

All compounds, and salts thereof, can be found together with other substances such as water and solvents (e.g., hydrates and solvates).

Compounds provided herein also can include tautomeric forms. Tautomeric forms result from the swapping of a single bond with an adjacent double bond together with the concomitant migration of a proton. Tautomeric forms include prototropic tautomers that are isomeric protonation states having the same empirical formula and total charge. Exemplary prototropic tautomers include ketone—enol pairs, amide—imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Compounds provided herein can also include all isotopes of atoms occurring in the intermediates or final compounds. Isotopes include those atoms having the same atomic number but different mass numbers. For example, isotopes of hydrogen include hydrogen, tritium, and deuterium.

Also provided herein are salts of the compounds described herein. It is understood that the disclosed salts can refer to derivatives of the disclosed compounds wherein the parent compound is modified by converting an existing acid or base moiety to its salt form. Examples of the salts include but are not limited to mineral or organic acid salts of basic residues such as amines; alkali or organic salts of acidic residues such as carboxylic acids; and the like. The salts of the compounds provided herein include the conventional non-toxic salts of the parent compound formed, for example, from non-toxic inorganic or organic acids. The salts of the compounds provided herein can be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two. In various aspects, nonaqueous media like ether, ethyl acetate, alcohols (e.g., methanol, ethanol, isopropanol, or butanol), or acetonitrile (ACN) can be used.

In various aspects, the compounds provided herein, or salts thereof, are substantially isolated. By "substantially isolated," it meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

As used herein, chemical structures that contain one or more stereocenters depicted with dashed and bold bonds are meant to indicate absolute stereochemistry of the stereocenter(s) present in the chemical structure. As used herein, bonds symbolized by a simple line do not indicate a stereopreference. Unless otherwise indicated to the contrary, chemical structures, which include one or more stereocenters, illustrated herein without indicating absolute or relative stereochemistry encompass all possible stereoisomeric forms of the compound (e.g., diastereomers and enantiomers) and mixtures thereof. Structures with a single bold or dashed line and at least one additional simple line encompass a single enantiomeric series of all possible diastereomers.

The resolution of racemic mixtures of compounds can be carried out using appropriate methods. An exemplary method includes fractional recrystallization using a chiral resolving acid that is an optically active, salt-forming organic acid. Suitable resolving agents for fractional recrystallization methods are, for example, optically active acids, such as the D and L forms of tartaric acid, diacetyltartaric acid, dibenzoyltartaric acid, mandelic acid, malic acid, lactic acid, or the various optically active camphorsulfonic acids such as camphorsulfonic acid. Other resolving agents suitable for fractional crystallization methods include stereoisomerically pure forms of methylbenzylamine (e.g., S and R forms, or diastereomerically pure forms), 2-phenylglycinol, norephedrine, ephedrine, N-methylephedrine, cyclohexylethylamine, 1,2-diaminocyclohexane, and the like.

Resolution of racemic mixtures can also be carried out by elution on a column packed with an optically active resolving agent (e.g., dinitrobenzoylphenylglycine). Suitable elution solvent compositions can be determined by one skilled in the art.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

"$R^1$," "$R^2$," "$R^3$," "$R^4$," etc., are used herein as generic symbols to represent various specific substituents. These symbols can be any substituents, not limited to those disclosed herein, and when they are defined to be certain substituents in one instance, they can, in another instance, be defined as some other substituents.

At various places in the present specification, divalent linking substituents are described. It is specifically intended that each divalent linking substituent includes both the forward and backward forms of the linking substituent. For example, —NR(CR'R")$_n$— includes both —NR(CR'R")$_n$— and —(CR'R")$_n$NR—. In aspects where the structure clearly requires a linking group, the Markush variables listed for that group are understood to be linking groups.

The term "n-membered," where n is an integer, typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

Throughout the definitions, the term "$C_n$-$C_m$" indicates a range that includes the endpoints, wherein n and m are integers and indicate the number of carbons. Examples include, without limitation, $C_1$-$C_4$, $C_1$-$C_6$, and the like.

The term "aliphatic," as used herein, refers to a nonaromatic hydrocarbon group and includes branched and unbranched, alkyl, alkenyl, or alkynyl groups. As used herein, the term "$C_n$-$C_m$ alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, teri-butyl, isobutyl, sec-butyl; higher homologs such as 2-methyl-I-butyl, n-pentyl, 3-pentyl, n-hexyl, 1,2,2-trimethylpropyl, heptyl, octyl, nonyl, decyl, dodecyl, tetradecyl, hexadecyl, eicosyl, tetracosyl, and the like. In various aspects, the alkyl group contains from 1 to 24 carbon atoms, from 1 to 12 carbon atoms, from 1 to 10 carbon atoms, from 1 to 8 carbon atoms, from 1 to 6 carbon atoms, from 1 to 4 carbon atoms, from 1 to 3 carbon atoms, or 1 to 2 carbon atoms. The alkyl group can also be substituted or unsubstituted. Throughout the specification, "alkyl" is generally used to refer to both unsubstituted alkyl groups and substituted alkyl groups; however, substituted alkyl groups are also specifically referred to herein by identifying the specific substituent(s) on the alkyl group. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below and the like. When "alkyl" is used in one instance, and a specific term such as "alkylalcohol" is used in another, it is not meant to imply that the term "alkyl" does not also refer to specific terms such as "alkylalcohol" and the like.

As used herein, "$C_n$-$C_m$ alkenyl" refers to an alkyl group having one or more double carbon-carbon bonds and having n to m carbons. Example alkenyl groups include, but are not limited to, ethenyl, n-propenyl, isopropenyl, n-butenyl, seobutenyl, and the like. In various aspects, the alkenyl moiety contains 2 to 6, 2 to 4, or 2 to 3 carbon atoms. Asymmetric structures such as $(R^1R^2)C=C(R^3R^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, thiol, or phosphonyl, as described below.

As used herein, "$C_n$-$C_m$ alkynyl" refers to an alkyl group having one or more triple carbon-carbon bonds and having n to m carbons. Exemplary alkynyl groups include, but are not limited to, ethynyl, propyn-1-yl, propyn-2-yl, and the like. In various aspects, the alkynyl moiety contains 2 to 6, 2 to 4, or 2 to 3 carbon atoms. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

As used herein, the term "$C_n$-$C_m$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_n$-$C_m$ alkoxy," employed alone or in combination with other terms, refers to a group of formula —O-alkyl, wherein the alkyl group has n to m carbons. Exemplary alkoxy groups include methoxy, ethoxy, propoxy (e.g., w-propoxy and isopropoxy), teri-butoxy, and the like. In various aspects, the alkyl group has 1 to 6, 1 to 4, or 1 to 3 carbon atoms.

The terms "amine" or "amino" as used herein are represented by the formula —$NR^1R^2$, where $R^1$ and $R^2$ can each be substitution groups as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —$C(O)NR^1R^2$.

As used herein, the term "$C_n$-$C_m$ alkylamino" refers to a group of formula —NH(alkyl), wherein the alkyl group has n to m carbon atoms. In various aspects, the alkyl group has 1 to 6, 1 to 4, or 1 to 3 carbon atoms.

As used herein, the term "$C_n$-$C_m$ alkoxycarbonyl" refers to a group of formula —C(O)O-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylcarbonyl" refers to a group of formula —C(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylcarbonylamino" refers to a group of formula —NHC(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonylamino" refers to a group of formula —NHS(O)$_2$-alkyl, wherein the alkyl group has n to m carbon atoms. In various aspects, the alkyl group has 1 to 6, 1 to 4, or 1 to 3 carbon atoms.

The term "aldehyde" as used herein is represented by the formula —C(O)H. Throughout this specification, "C(O)" or "CO" is a shorthand notation for C=O, which is also referred to herein as a "carbonyl."

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)$R^1$ or —C(O)O$R^1$, where $R^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $R^1OR^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $R^1C(O)R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "aminosulfonyl" refers to a group of formula —S(O)$_2$NH$_2$.

As used herein, the term "$C_n$-$C_m$ alkylaminosulfonyl" refers to a group of formula —S(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminosulfonyl" refers to a group of formula —S(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_n$-$C_m$ alkylaminosulfonylamino" refers to a group of formula —NHS(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminosulfonylamino" refers to a group of formula —NHS(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminocarbonylamino," employed alone or in combination with other terms, refers to a group of formula —NHC(O)NH$_2$.

As used herein, the term "$C_n$-$C_m$ alkylaminocarbonylamino" refers to a group of formula —NHC(O)NH(alkyl), wherein the alkyl group has n to m carbon atoms. In various aspects, the alkyl group has 1 to 6, 1 to 4, or 1 to 3 carbon atoms.

As used herein, the term "di($C_n$-$C_m$ alkyl)aminocarbonylamino" refers to a group of formula —NHC(O)N(alkyl)$_2$, wherein each alkyl group independently has n to m carbon atoms. In various aspects, each alkyl group has, independently, 1 to 6, 1 to 4, or 1 to 3 carbon atoms.

As used herein, the term "$C_n$-$C_m$ alkylcarbamyl" refers to a group of formula —C(O)—NH(alkyl), wherein the alkyl group has n to m carbon atoms. In various aspects, the alkyl group has 1 to 6, 1 to 4, or 1 to 3 carbon atoms.

As used herein, the term "thio" refers to a group of formula —SH.

As used herein, the term "$C_n$-$C_m$ alkylthio" refers to a group of formula —S— alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfmyl" refers to a group of formula —S(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonyl" refers to a group of formula —S(O)$_2$-alkyl, wherein the alkyl group has n to m carbon atoms. In various aspects, the alkyl group has 1 to 6, 1 to 4, or 1 to 3 carbon atoms.

As used herein, the term "carbamyl" to a group of formula —C(O)NH$_2$.

As used herein, the term "carbonyl," employed alone or in combination with other terms, refers to a —C(=O)— group, which may also be written as C(O).

As used herein, the term "carboxy" refers to a group of formula —C(O)OH.

As used herein, the term "($C_n$-$C_m$)($C_n$-$C_m$)amino" refers to a group of formula —N(alkyl)$_2$, wherein the two alkyl groups each has, independently, n to m carbon atoms. In various aspects, each alkyl group independently has 1 to 6, 1 to 4, or 1 to 3 carbon atoms.

As used herein, the term "di($C_n$-$C_m$-alkyl)carbamyl" refers to a group of formula —C(O)N(alkyl)$_2$, wherein the two alkyl groups each has, independently, n to m carbon atoms. In various aspects, each alkyl group independently has 1 to 6, 1 to 4, or 1 to 3 carbon atoms.

As used herein, "halogen" refers to F, Cl, Br, or I.

The term "hydroxyl" as used herein is represented by the formula —OH.

The term "cyano" as used herein is represented by the formula —CN.

The term "nitro" as used herein is represented by the formula —NO$_2$.

The term "phosphonyl" is used herein to refer to the phospho-oxo group represented by the formula —P(O)

(OR$^1$)$_2$, where R$^1$ can be absent, hydrogen, an alkyl, alkenyl, alkynyl, aryl, heteroaryl, cycloalkyl, or cycloalkenyl.

The term "silyl" as used herein is represented by the formula —SiR$^1$R$^2$R$^3$, where R$^1$, R$^2$, and R$^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2$R$^1$, where R$^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

As used herein, "C$_n$-C$_m$ haloalkoxy" refers to a group of formula —O— haloalkyl having n to m carbon atoms. An example haloalkoxy group is OCF$_3$. In various aspects, the haloalkoxy group is fluorinated only. In various aspects, the alkyl group has 1 to 6, 1 to 4, or 1 to 3 carbon atoms.

As used herein, the term "C$_n$-C$_m$ haloalkyl," employed alone or in combination with other terms, refers to an alkyl group having from one halogen atom to 2s+1 halogen atoms, which may be the same or different, where "s" is the number of carbon atoms in the alkyl group, wherein the alkyl group has n to m carbon atoms. In various aspects, the haloalkyl group is fluorinated only. In various aspects, the alkyl group has 1 to 6, 1 to 4, or 1 to 3 carbon atoms.

As used herein, the term "amine base" refers to a mono-substituted amino group (i.e., primary amine base), di-substituted amino group (i.e., secondary amine base), or a tri-substituted amine group (i.e., tertiary amine base). Exemplary mono-substituted amine bases include methylamine, ethylamine, propylamine, butylamine, and the like. Example di-substituted amine bases include dimethylamine, diethylamine, dipropylamine, dibutylamine, pyrrolidine, piperidine, azepane, morpholine, and the like. In various aspects, the tertiary amine has the formula N(R')$_3$, wherein each R' is independently C$_1$-C$_6$ alkyl, 3-10 member cycloalkyl, 4-10 membered heterocycloalkyl, 1-10 membered heteroaryl, and 5-10 membered aryl, wherein the 3-10 member cycloalkyl, 4-10 membered heterocycloalkyl, 1-10 membered heteroaryl, and 5-10 membered aryl is optionally substituted by 1, 2, 3, 4, 5, or 6 Ci-6 alkyl groups. Exemplary tertiary amine bases include trimethylamine, triethylamine, tripropylamine, triisopropylamine, tributylamine, tri-tert-butylamine, N-dimethylethanamine, N-ethyl-N-methylpropan-2-amine, N-ethyl-N-isopropylpropan-2-amine, morpholine, N-methylmorpholine, and the like. In various aspects, the term "tertiary amine base" refers to a group of formula N(R)$_3$, wherein each R is independently a linear or branched C$_{1-6}$ alkyl group.

As used herein, "cycloalkyl" refers to non-aromatic cyclic hydrocarbons, including cyclized alkyl and/or alkenyl groups. Cycloalkyl groups can include mono- or polycyclic (e.g., having 2, 3, or 4 fused rings) groups and spirocycles. Cycloalkyl groups can have 3, 4, 5, 6, 7, 8, 9, or 10 ring-forming carbons (C$_{3-10}$). Ring-forming carbon atoms of a cycloalkyl group can be optionally substituted by oxo or sulfido (e.g., C(O) or C(S)). Cycloalkyl groups also include cycloalkylidenes. Exemplary cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcaranyl, and the like. In various aspects, cycloalkyl is cyclopropyl, cyclobutyl, cyclopentyl, cyclohexyl, cycloheptyl, or adamantyl. In various aspects, the cycloalkyl has 6-10 ring-forming carbon atoms. In various aspects, cycloalkyl is cyclohexyl or adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom, including a ring-forming atom of the fused aromatic ring.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Exemplary heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazepine, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In various aspects, the heterocycloalkyl group contains 0 to 3 double bonds. In various aspects, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom, including a ring-forming atom of the fused aromatic ring. In various aspects, the heterocycloalkyl has 4-10, 4-7, or 4-6 ring atoms with 1 or 2 heteroatoms independently selected from nitrogen, oxygen, or sulfur and having one or more oxidized ring members.

The term "cycloalkenyl," as used herein, is a non-aromatic carbon-based ring composed of at least three carbon atoms and containing at least one double bond, i.e., C=C. Examples of cycloalkenyl groups include but are not limited to cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, one or more aryl groups, and one or more non-aryl groups.

As used herein, the term "aryl," employed alone or in combination with other terms, refers to an aromatic hydrocarbon group, which may be monocyclic or polycyclic (e.g., having 2, 3, or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, phosphorus, and nitrogen. In various aspects, the heteroaryl ring has 1, 2, 3, or 4 heteroatom ring members independently selected from nitrogen, sulfur, and oxygen. In various aspects, any ring-forming N in a heteroaryl moiety can be an N-oxide. In various aspects, the heteroaryl has 5-10 ring atoms and 1, 2, 3, or 4 heteroatom ring members independently selected from nitrogen, sulfur, and oxygen. In various aspects, the heteroaryl has 5-6 ring atoms and 1 or 2 heteroatom ring members independently selected from nitrogen, sulfur, and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl, and pyridazinyl.

The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

At certain places, the definitions or aspects refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas an azetidin-3-yl ring is attached at the 3-position.

As used herein, the term "electron withdrawing group" (EWG), employed alone or in combination with other terms, refers to an atom or group of atoms substituted onto a π-system (e.g., substituted onto an aryl or heteroaryl ring) that draws electron density away from the π-system through induction (e.g., withdrawing electron density about a σ-bond) or resonance (e.g., withdrawing electron density about a π-bond or π-system). Example electron withdrawing groups include, but are not limited to, halo groups (e.g., fluoro, chloro, bromo, iodo), nitriles (e.g., —CN), carbonyl groups (e.g., aldehydes, ketones, carboxylic acids, acid chlorides, esters, and the like), nitro groups (e.g., —NO$_2$), haloalkyl groups (e.g., —CH$_2$F, —CHF$_2$, —CF$_3$, and the like), alkenyl groups (e.g., vinyl), alkynyl groups (e.g., ethynyl), sulfonyl groups (e.g., S(O)R, S(O)$_2$R), sulfonate groups (e.g., —SO$_3$H), and sulfonamide groups (e.g., S(O)N(R)$_2$, S(O)$_2$N(R)=). In various aspects, the electron withdrawing group is selected from the group consisting of halo, $C_2$-$C_6$ alkenyl, $C_2$-$C_6$ alkynyl, $C_1$-$C_3$ haloalkyl, CN, NO$_2$, C(=O)OR$^{aI}$, C(=O)R$^{bI}$, C(=O)NR$^{cI}$R$^{dI}$, C(=O)SR$^{eI}$, —NR$^{dI}$S(O)R$^{eI}$, —NR$^{dI}$S(O)$_2$R$^{eI}$, S(=O)R$^{eI}$, S(=O)$_2$R$^{eI}$, S(=O)NR$^{cI}$R$^{dI}$, S(=O)$_2$NR$^{cI}$R$^{dI}$, and P(O)(OR$^{aI}$)$_2$. In various aspects, the electron withdrawing group is selected from the group consisting of C(=O)OR$^{aI}$, C(=O)R$^{bI}$, C(=O)NR$^{cI}$R$^{dI}$, C(=O)SR$^{eI}$, S(=O)R$^{eI}$, S(=O)$_2$R$^{eI}$, S(=O)NR$^{cI}$R$^{dI}$, and S(=O)$_2$NR$^{cI}$R$^{dI}$. In various aspects, the electron withdrawing group is C(=O)OR$^{aI}$. In various aspects, the electron withdrawing group is C(=O)OR$^{aI}$, wherein R$^{aI}$, R$^{bI}$, R$^{cI}$, R$^{dI}$, and R$^{eI}$ are independently selected at each occurrence from alkyl, alkenyl, alkynyl, cycloalkyl, cycloalkenyl, heterocycloalkyl, aryl, or heteroaryl, each of which R$^{aI}$, R$^{bI}$, R$^{cI}$, R$^{dI}$, or R$^{eI}$ may be optionally substituted with one or more substituents as described herein.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the selected groups, a first group can be incorporated within the second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Dashed lines in a chemical structure are used to indicate that a bond may be present or absent or that it may be a delocalized bond between the indicated atoms.

As used herein, the term "ionic liquid" refers to a salt in which the ions are poorly coordinated, and as a result, the salts are present in a liquid state at a temperature below about 150° C., for example, below about 120° C., about 100° C., about 80° C., about 60° C., about 40° C., about 25° C., or even below about 20° C. However, it is further understood that ionic liquids can be present as solids at other temperature ranges or points. Since the disclosed ionic liquid compositions are liquid and thus not crystalline solids, at a given temperature, the disclosed compositions do not suffer from the problems of polymorphism associated with crystalline solids. An ionic liquid is not considered a mere solution containing ions as solutes dissolved therein. In ionic liquids, at least one ion has a delocalized charge, and at least one component is organic. It is understood that while the cation can have an impact on the properties of the ionic liquid and often define its stability, the anion can have an impact on the chemistry and functionality of the ionic liquid. Some exemplary and unlimiting cations can comprise imidazolium, pyridinium, pyrrolidinium, phosphonium, ammonium, sulfonium, or any combination thereof. Some exemplary and unlimiting anions can comprise alkylsulfate, tosylate, methanesulfonate, bis(trifluoromethylsulfonyl) imide, hexafluorophosphate, tetrafluoroborate, halide, or any combination thereof.

Preparation of the compounds described herein can involve a reaction in the presence of an acid or a base. Example acids can be inorganic or organic acids and include, but are not limited to, strong and weak acids. Example acids include but are not limited to hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Example weak acids include, but are not limited to, acetic acid, propionic acid, butanoic acid, benzoic acid, tartaric acid, pentanoic acid, hexanoic acid, heptanoic acid, octanoic acid, nonanoic acid, and decanoic acid. Examples include, without limitation, lithium hydroxide, sodium hydroxide, potassium hydroxide, lithium carbonate, sodium carbonate, potassium carbonate, sodium bicarbonate, and amine bases. Example strong bases include, but are not limited to, hydroxide, alkoxides, metal amides, metal hydrides, metal dialkylamides, and arylamines, wherein; alkoxides include lithium, sodium, and potassium salts of methyl, ethyl, and t-butyl oxides; metal amides include sodium amide, potassium amide, and lithium amide; metal hydrides include sodium hydride, potassium hydride, and lithium hydride; and metal dialkylamides include lithium, sodium, and potassium salts of methyl, ethyl, n-propyl, isopropyl, n-butyl, t-butyl, trimethylsilyl, and cyclohexyl substituted amides (e.g., lithium N-isopropylcyclohexylamide).

The following abbreviations may be used herein: AcOH (acetic acid); aq. (aqueous); atm. (atmosphere(s)); $Br_2$ (bromine); Bn (benzyl); calc. (calculated); d (doublet); dd (doublet of doublets); DCM (dichloromethane); DMF (N,N-dimethylformamide); Et (ethyl); $Et_2O$ (diethyl ether); EtOAc (ethyl acetate): EtOH (ethanol); EWG (electron withdrawing group); g (gram(s)); h (hour(s)); HCl (hydrochloric acid/hydrogen chloride); HPLC (high performance liquid chromatography); $H_2SO_4$ (sulfuric acid); Hz (hertz); (iodine); IPA (isopropyl alcohol); J (coupling constant); KOH (potassium hydroxide); $K_3PO_4$ (potassium phosphate); LCMS (liquid chromatography-mass spectrometry); GC (gas chromatography), LiICA (lithium N-isopropylcyclohexylamide): m (multiplet); M (molar); MS (Mass spectrometry); Me (methyl); MeCN (acetonitrile); MeOH (methanol); mg (milligram(s)); min. (minutes(s)); mL (milliliter(s)); mmol (millimole(s)); N (normal); $NaBH_4CN$ (sodium cyanoborohydride); NHP (N-heterocyclic phosphine); NHP-Cl (N-heterocyclic phosphine chloride); $Na_2CO_3$ (sodium carbonate); NaHCOs (sodium bicarbonate); NaOH (sodium hydroxide); $Na_2SO_4$ (sodium sulfate); nM (nanomolar); NMR (nuclear magnetic resonance spectroscopy); PCb (trichlorophosphine); PMP (4-methoxyphenyl); RP-HPLC (reverse phase high performance liquid chromatography); t (triplet or tertiary); t-Bu (teri-butyl); TEA (triethylamine); TFA (trifluoroacetic acid); THF (tetrahydrofuran); TLC (thin layer chromatography); μg (microgram(s)); μL (microliter(s)); μM (micromolar); wt % (weight percent).

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges and individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight, component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

As used herein, the term "substantially" means that the subsequently described event or circumstance completely occurs or that the subsequently described event or circumstance generally, typically, or approximately occurs. Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is then about 1% by weight or less, e.g., less than about 0.5% by weight, less than about 0.1% by weight, less than about 0.05% by weight, or less than about 0.01% by weight of the stated material, based on the total weight of the composition.

It is further understood that certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co. (Milwaukee, WI), Acros Organics (Morris Plains, NJ), Fisher Scientific (Pittsburgh, PA), Sigma (St. Louis, MO), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials, such as the ligands disclosed herein, can be obtained from commercial sources.

Reference will now be made in detail to specific aspects of the disclosed materials, compounds, compositions, articles, and methods, examples of which are illustrated in the accompanying Examples and FIGURES.

Polymers

As summarized above, disclosed polymers that are substantially biomass-based and allow a sustainable alternative to the currently used polyolefins.

In certain aspects, disclosed herein is a polymer composition comprising a repeating unit of formula (I):

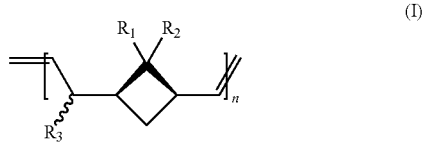

wherein, $R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, $C(O)R'$, $C(O)NH_2$, $C(O)NHR'$ wherein each of $R_1$, $R_2$, $R_3$, independent of the other, is optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol;

wherein R' is independently chosen from $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, any of which are optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

In still further aspects, the polymer of formula (I) can have various stereochemistry. In such aspects, the polymer can encompass all possible stereoisomeric forms of $R_3$ (e.g., diastereomers and enantiomers) and mixtures thereof. In some aspects, the stereoisomers can be present in any ratio. In yet other aspects, the stereoisomers can form a racemic mixture. It is understood that the stereochemistry of the polymer can be determined by a specific stereochemistry of the initial composition comprising α-pinene.

In still further aspects, $R_1$, $R_2$, and $R_3$ are independently selected from $C_1$-$C_{10}$ alkyls. Still, in further aspects, $R_1$, $R_2$, and $R_3$ are independently $CH_3$, for example. In such exemplary aspects, the polymer of formula (I) can have a structure as shown below:

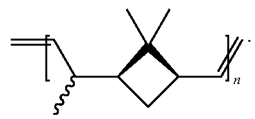

In still further aspects, n can be any integer within the provided range. For example, n can be between 2 to 100,000, including exemplary values of 5, 10, 50, 100, 500, 1,000, 10,000, 50,000, and 75,000. It is further understood that n can have any value between any two foregoing values. In still further aspects, the polymer is a δ-pinene-based polymer. In yet still further aspects, the polymer is a poly(δ-pinene).

In still further aspects, the polymer disclosed herein is a thermoplastic polymer. In certain aspects, the polymer can have an average molecular weight from about 100 to about 1,000,000,000 Dalton, including exemplary values of about 200, about 300, about 400, about 500, about 1,000, about 10,000, about 50,000, about 100,000, about 150,000, about 200,000, about 250,000, about 300,000, about 350,000, about 400,000, about 450,000 Dalton, about 50,000, about 550,000, about 600,000, about 650,000, about 700,000, about 750,000, about 800,000, about 850,000, about 900,000, and about 950,000 Dalton. It is further understood that the disclosed herein polymer can have an average molecular weight between any two foregoing values. For example, the average molecular weight can be from about 100 Dalton to about 200,000 Dalton, or from about 100 Dalton to about 500,000 Dalton, or from about 100,000 Dalton to about 750,000 Dalton.

In still further aspects, the disclosed herein polymer has an amorphic structure. In still further aspects, the disclosed herein polymer is substantially amorphic. In certain aspects, the disclosed polymer is glassy. In yet other aspects, the disclosed herein polymer is substantially glassy.

In still further aspects, the polymer exhibits a glass transition temperature from about 70° C. to about 140° C., including exemplary values of about 75° C., about 80° C., about 85° C., about 90° C., about 95° C., about 100° C., about 105° C., about 110° C., about 115° C., about 120° C., about 125° C., about 130° C., and about 135° C. In yet further aspects, the polymer has a glass transition temperature between about 80° C. to about 120° C., or from about 90° C. to about 110° C., or from about 100° C. to about 105° C.

In still further aspects, the disclosed herein polymer can exhibit regioregularity. While in other aspects, the polymer disclosed herein is not regioregular. In certain aspects, the polymer disclosed herein has a regioregularity from greater than 0 to 100%, including exemplary values of about 10%, about 20%, about 30%, about 40%, about 50%, about 60%, about 70%, about 80%, and about 90%. In still further aspects, the polymer disclosed herein can exhibit regioregularity greater than about 10%, greater than about 20%, greater than about 30%, greater than about 40%, greater than about 50%, greater than about 60%, greater than about 70%, greater than about 80%, or greater than about 90%, or greater than 95%, or even greater than 99.5%.

In still further aspects, the polymer disclosed herein can comprise from 0% to 100% of a trans-isomer. In aspects where the polymer has non or low regioregularity, the polymer can also comprise a cis-isomer. In certain aspects, the polymer can comprise from greater than 0% of a trans-isomer, greater than about 10%, greater than about 20%, greater than about 30%, greater than about 40%, greater than about 50%, greater than about 60%, greater than about 70%, greater than about 80%, or greater than about 90%, or greater than 95%, or even greater than about 99.5% of a trans-isomer.

In still further aspects, when the polymer comprises the trans-isomer, the polymer can have various configurations. For example, the polymer can comprise a head-to-head trans isomer, a head-to-tail trans-isomer, a tail-to-tail trans-isomer, or a combination thereof. In still further aspects, when the polymer is trans-isomer, such a polymer is less than about 50%, less than about 40%, less than about 30%, less than about 20%, less than about 10%, or less than about 5% of the head-to-head trans-isomer, the tail-to-tail trans-isomer, or a combination thereof. In yet other aspects, the polymer is more than about 50%, more than about 60%, more than about 70%, more than about 80%, more than about 90%, more than about 95% of the head-to-tail isomer.

In still further aspects, if the cis-isomer is present, it is present in an amount of less than about 50%, less than about 40%, less than about 30%, less than about 20%, less than about 10%, or less than about 5%, less than about 1%, or less than about 0.5%. In yet still, further aspects, when the cis-isomer is present, it can also comprise a cis-head-to-tail isomer, a cis-head-to-head isomer, a cis-tail-to-tail isomer, and a combination thereof. In still further aspects, if the cis-isomer is present, a majority of this isomer is present in a cis-head-to-tail configuration, while the cis-head-to-head and/or cis-tail-to-tail represent a minority of the polymer composition. In still further aspects, if the cis-isomer is present, less than about 50%, less than about 40%, less than about 30%, less than about 20%, less than about 10%, or less than about 5%, less than about 1%, or less than about 0.5% of this cis-isomer is present in the cis-head-to-head and/or cis-tail-to-tail configurations.

In still further aspects, the polymer can be crosslinkable. It is understood that the crosslinking of the disclosed herein polymers can be achieved by crosslinking reactions in the presence of the crosslinking agents, or can be initiated by heat, pressure, change in pH, irradiation, exposure to the oxidative atmosphere, and the like.

In still further aspects, the polymers disclosed herein can be substantially transparent. In such aspects, the polymers can exhibit transmittance above about 80%, above about 85%, above about 90%, or even above about 95%.

In still further aspects, the disclosed herein polymer can be substantially sourced from biomass. In such aspects, the polymer allows sustainable utilization of the biomass to form bio-polymers. In still further aspects, the disclosed polymers are recyclable. In still further aspects, the polymers described herein can be designed according to the "cradle to cradle" principles of sustainability.

In still further aspects, any suitable for the desired purpose filler can be added to the polymer to form the needed composition. The fillers can be chosen specifically based on the desired application. In some exemplary and unlimiting aspects, the filler can include calcium carbonate, fly-ash, recycled calcium carbonate, aluminum trihydrate, talc, nano-clay, kaolin clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, limestone, polyurethane foam, rubber, thermoplastic powder, thermoplastic polyurethane (TPU), wollastonite, or any combination thereof and any combination thereof.

In yet other aspects, the polymer disclosed herein can also be mixed with a pigment, a flame retardant, surfactant, processing aids, or a combination thereof. Exemplary flame retardants can include, without limitation, organo-phosphorous flame retardants, red phosphorous magnesium hydroxide, magnesium dihydroxide, hexabromocyclododecane, bromine-containing flame retardants, brominated aromatic flame retardants, melamine cyanurate, melamine polyphosphate, melamine borate, methylol and its derivatives, silicon dioxide, calcium carbonate, resorcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide.

In other aspects, any pigments or surfactant known in the art can be utilized. In yet other aspects, any processing aids known in the art can be used. In some aspects, processing aids can include without limitation antistatic chemicals, lubricants, oils, or any combination thereof.

In still further aspects, the polymers disclosed herein can withstand a temperature range up to about 100° C., up to about 200° C., up to about 250° C., up to about 300° C., up to about 350° C., or up to about 400° C.

Also disclosed herein are articles that can be made from the disclosed herein polymers. The articles can be formed by extrusion, injection molding, blow molding, compression molding, casting, and the like.

Articles disclosed herein can comprise suitable plastic materials, for example, bottles, fibers, textile, gloves, components in electronic devices, components in electrical devices, containers, tableware, cutlery, tire components, construction materials, automotive & aeronautic components, sporting equipment, and any combination thereof.

In still further aspects, the polymers disclosed herein can also be used as high temperature elastomers (performance elastomers), bitumen modifiers, viscosity modifiers, and the like.

In still further aspects, the polymer disclosed herein is moldable and/or extrudable. These properties allow the polymer to be easily formed in articles that can be useful in everyday life.

Also disclosed herein is a composition comprising a) any of the disclosed above polymers present in an amount from greater than 0% to less than 100% by the weight of the composition; and b) an additive, wherein the additive reacts with a ring opened product of the polymer.

It is understood that the polymer can be present in an amount of about 0.5%, about 1%, about 10%, about 20%, about 30%, about 40%, about 50%, about 60%, about 70%, about 80%, about 90%, about 95%, about 99%, or about 99.99%. It is understood that the polymer can be present in any percentage between any two foregoing values.

In still further aspects, the additive can also be present in an amount that is suitable for the specific purpose. For example, the additive can be present in an amount of less than 100%, less than about 90%, less than about 80%, less than about 70%, less than about 60%, less than about 50%, less than about 40%, less than about 30%, less than about 20%, less than about 10%, less than about 5%, less than about 2%, less than about 1%, less than about 0.5%, or even less than about 0.01%.

In certain aspects, the polymer can undergo a transformation. For example, and without limitations, the transformation can include the opening of a ring present in the polymer structure. Such transformation can occur under conditions effective to cause ring opening in the polymer. In some exemplary aspects, the conditions effective to cause ring opening can include exposure to chemicals capable of a chemical reaction with the polymer, exposure to heat, irradiation, and the like. In such aspects, the disclosed herein additive can react with a ring-opened product to form a new chemical structure. In some aspects, the additive can behave as a sensor to indicate that the polymer has undergone the transformation. In certain aspects, the additive and a radical scavenging dye. In yet other aspects, the dye can comprise one or more of 3',3",5',5"-tetrabromo-phenolsulfonephthalein (Bromophenol Blue), 3,3'-[(3-Carboxy-4-oxocyclohexa-2,5-dien-1-ylidene)methylene]bis(6-hydroxybenzoic acid) (Aurinytricaboxulic acid), ethyl-[4-[[4-[ethyl-[(3-sulfophenyl)methyl]amino]phenyl]-(4-hydroxy-2-sulfophenyl)methylidene]-1-cyclohexa-2,5-dienylidene]-[(3-sulfophenyl)methyl]azanium (Fast Green FCF), or 2,6-Dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol (Bromocresol green). In certain aspects, the transformation can be reversible. Yet, in other aspects, the transformation is irreversible. In certain aspects, the transformation can be desirable. While in still further aspects, the transformation and the subsequent reaction with the additive can indicate that the polymer has changed its desired properties, and the end user's attention is needed.

In certain aspects, such compositions can be used to form articles. Some of the exemplary and unlimiting usages can be in a field when the end-user needs to be informed that the original polymer has undergone a transformation and does not possess the desired properties anymore, and therefore it needs to be discarded or replaced. In yet other aspects, the transformation can be desired. In such aspects, when the additive reacts with the ring opening product, the end-user can be informed that the polymer has changed its original properties and can be used for additional applications.

In still further aspects, the disclosed polymer can be used as a homopolymer. Yet, in still further aspects, the disclosed polymer can be used in graft polymers or block polymers. In yet further aspects, the polymer compositions disclosed herein can comprise random copolymers. In yet other aspects, the polymers disclosed herein can comprise alternating copolymers. It is understood that in some aspects, the polymer is a homopolymer. While in other aspects, the polymer is a graft polymer or a block polymer.

In certain aspects, disclosed herein is a block copolymer comprising a) a repeating block unit comprising a monomer of any of the disclosed above polymers present in an amount from greater than 0% to less than 100% of the block copolymer composition; and b) a repeating block unit comprising a monomer of a further polymer, wherein the further polymer is different from the polymer of a).

In such aspects, the repeating block unit comprising the monomer of the disclosed herein polymer can be an amount of about 0.5%, about 1%, about 10%, about 20%, about 30%, about 40%, about 50%, about 60%, about 70%, about 80%, about 90%, about 95%, about 99%, or about 99.99% of the total block copolymer. It is understood that the polymer can be present in any percentage between any two foregoing values.

In still further aspects, the repeating block unit comprising any of the disclosed above polymers and the repeating block unit comprising the further polymer can be present in any ratio to form the desired block copolymer. For example, these two repeating units can be present in a ratio from 10:1 to 1:10, including exemplary values of 9:1, 8:1, 7:1, 6:1, 5:1, 4:1, 3:1, 2:1, 1:1, 1:2, 1:3, 1:4, 1:5, 1:6, 1:7, 1:8, and 1:9. It is, however, understood that other ratios can also be contemplated depending on the desired outcome.

In some aspects, the further polymer can comprise any suitable polymer capable of forming a block polymer with the disclosed delta pinene-based polymer.

The monomer of the further polymer is not particularly limited, and the specific examples thereof can include aromatic vinyls, such as styrene, α-methylstyrene, 3-methylstyrene, 4-methylstyrene, 4-ethyl styrene, 4-t-butyl styrene, 1-vinyl naphthalene and indene; (meth)acrylic monomers, such as (meth)acrylic acid, methyl (meth)acrylate, ethyl (meth)acrylate, butyl (meth)acrylate, 2-hydroxyethyl (meth) acrylate and glycidyl(meth)acrylate; maleic anhydride, maleic acid, fumaric acid, maleimide; nitrile group-containing vinyl monomers, such as acrylonitrile and methacrylonitrile; amide group-containing vinyl monomers, such as acrylamide and methacrylamide; olefins, such as ethylene, propylene; cyclo-butene, cyclopentene, cycloheptene, cyclooctene, cyclononene, isobutylene, butadiene, isoprene and norbornene, oxanorbornes, and substituted versions thereof; turpentine-derived double bond-containing compounds such as β-pinene, α-pinene, limonene, myrcene, camphene and carene; vinyl esters, such as vinyl acetate, vinyl pivalate and vinyl benzoate; styrene derivatives having polar groups, vinyl chlorides, vinylidene chlorides, allylic chlorides, allylic alcohols and the like. Furthermore, they may also contain bifunctional monomers, such as p-divinylbenzene, p-diisopropenyl benzene, ethylene glycol divinyl ether, and the like. These can be used either alone or as a combination of two or more thereof.

In still further aspects, the further polymer can comprise a cycloolefin. In still further aspects, the cycloolefin polymer can comprise a substituted or unsubstituted bridged cyclic hydrocarbon. In still further aspects, the substituted or unsubstituted bridged cyclic hydrocarbon comprises a substituted or unsubstituted norbornene.

In yet still further aspects, the block copolymer composition can also comprise at least one additional repeating block unit that is different from the repeating unit comprising the described polymer and is different from the further polymers described above.

It is understood that in exemplary aspects, wherein the polymer is a block polymer, the polymer can comprise any known in the art block polymer configurations. For example, and without limitation, in some aspects, the polymers disclosed herein can comprise diblock polymers (AB), or triblock polymers (ABA or ABC), or tetrablock terpolymers of ABCA type. It is understood that in such exemplary aspects, the letters A, B, and C, represent an individual polymer block present in the block copolymer.

In still further aspects, the block copolymer compositions can comprise any of the disclosed above fillers, additives, pigments, flame retardants, surfactants, processing aid, and the like.

It is understood that the copolymers that are random or statistical (non-block copolymers) comprising the described herein δ-pinene and any of the disclosed herein additional polymers are also disclosed. In such aspects, the ratio between the disclosed herein δ-pinene and any other monomeric unit can have any of the disclosed above values.

Also disclosed herein are articles that comprise the disclosed above block copolymer compositions. Also disclosed herein are articles that comprise random (statistical) copolymer compositions comprising the disclosed herein δ-pinene.

As disclosed above, various articles can be manufactured from the disclosed polymers and the compositions. In certain aspects, the disclosed polymers and compositions can be used as a starting material for 3-D printing. In still further aspects, disclosed herein are 3-D printing materials comprising polymers and compositions as disclosed herein. In yet further aspects, the articles comprising the disclosed polymers and compositions can comprise any articles that can be prepared from the polymer compositions. Due to the versatilities provided by the disclosed polymers and compositions, articles can comprise components for daily use, military use, medical use, electronics, mining, space industry, textile, first responders clothing and equipment, etc. In yet further aspects, the articles can comprise fabrics, gloves, cords, tapes, membranes, sensors, tubing, sheets of materials, blocks of materials, or any combination thereof. In certain aspects, the compositions disclosed herein can be used as gas separation membranes. In yet other aspects, the compositions disclosed herein can be used as fuel cell membranes. The polymers and compositions disclosed herein can also be used as pressure-sensitive adhesives, tackifying agents, additives in rubbers, coatings, and the like.

Methods

Also disclosed herein are various methods. In some aspects, disclosed are methods comprising polymerizing a δ-pinene in the presence of a catalyst, thereby forming a polymer having a structure of Formula (I):

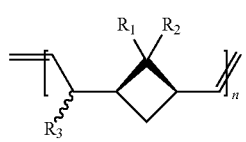

(I)

wherein

R$_1$, R$_2$, R$_3$, are independently selected from hydrogen, C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, hydroxyl, halogen, CN, CF$_3$, CO$_2$H, CO$_2$NH$_2$, CO$_2$NHR', CO$_2$R', C(O)R', C(O)NH$_2$, C(O)NHR' wherein each of R$_1$, R$_2$, R$_3$, independent of the other, is optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol;

wherein R' is independently chosen from C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, any of which are optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

In still further aspects, it is understood that the polymer of formula (I) formed by the disclosed herein methods can have various stereochemistry. In such aspects, the polymer can encompass all possible stereoisomeric forms of R$_3$ (e.g., diastereomers and enantiomers) and mixtures thereof. In some aspects, the stereoisomers can be present in any ratio. In yet other aspects, the stereoisomers can form a racemic mixture. It is understood that the stereochemistry of the polymer can be determined by a specific stereochemistry of the initial composition comprising α-pinene.

In still further aspects, n can be any integer from 2 to 100,000. In yet further aspects, n can have integer value in the disclosed range, including exemplary values of 5, 10, 100, 500, 1,000, 5,000, 10,000, 50,000, 80,000, or 90,000. It is understood that n can have any values between any two foregoing values, for example, n can be from 2 to 10 or from 10 to 5,000 or from 50 to 50,000, etc.

In still further aspects, the polymer is a δ-pinene-based polymer. In still further aspects, the polymer is a poly(δ-pinene).

In still further aspects, the formed polymer is a thermoplastic polymer. In certain aspects, the formed polymer can have an average molecular weight from about 100 to about 500,000 Dalton, including exemplary values of about 200, about 300, about 400, about 500, about 1,000, about 10,000, about 50,000, about 100,000, about 150,000, about 200,000, about 250,000, about 300,000, about 350,000, about 400,000, and about 450,000 Dalton. It is further understood that the disclosed herein polymer can have any molecular weight between any two foregoing values.

In still further aspects, the disclosed herein methods comprise any of the described above monomers. In yet further aspects, the catalyst can be any catalyst capable of catalyzing the desired polymerization.

In certain aspects, the catalyst is a ring-opening metathesis polymerization (ROMP) catalyst. In yet other aspects, the step of polymerizing comprises a living ring-opening metathesis polymerization. In certain aspects, the catalyst can comprise a Grubb catalyst. In some exemplary and unlimiting aspects, the Grubb catalyst can be a second-generation catalyst, a third-generation catalyst, or a combination thereof. In yet further aspects, the Grubb catalyst is a 3$^{rd}$ generation catalyst.

In still further aspects, the S-pinene is formed from biomass. Any of the disclosed above biomass can be used to form the S-pinene. In still further exemplary and unlimiting aspects, the δ-pinene is formed from an α-pinene. It is understood, however, it is understood that forming the S-pinene from the α-pinene are only exemplary, and any other methods capable of forming the δ-pinene can be utilized.

In some exemplary aspects, the S-pinene is formed by converting a first composition comprising an α-pinene under conditions effective to form a second composition comprising the δ-pinene. It is understood that the conditions effective to form the second composition are known in the art and can include exemplary reactions as shown in Scheme 1 and discussed in detail in the Example section of the disclosure. Other methods of converting the α-pinene to the S-pinene can also be utilized.

In still further aspects, the second composition formed during the conversion of the original α-pinene can comprise an α-pinene present in an amount from 0% to less than 100%. In some aspects, the second composition is substantially free of the α-pinene. While in other aspects, the second composition can comprise from about 0.5%, about 1%, about 2%, about 5%, about 10%, about 15%, about 20%, about 30%, about 40%, about 50%, about 60%, about 70%, about 80%, and about 90% of the α-pinene. In yet other aspects, the second composition can comprise less than 100%, less than about 90%, less than about 80%, less than about 70%, less than about 60%, less than about 50%, less than about 40%, less than about 30%, less than about 20%, less than about 10%, less than about 5%, less than about 1%, less than about 0.5%, or less than about 0.1% of the α-pinene.

In still further aspects, the α-pinene and the δ-pinene are present in any ratio between 0:1 to 1:10, including exemplary values of 0:1, 1:1, 1:2, 1:3, 1:4, 1:5, 1:6, 1:7, 1:8, and 1:9. In yet still further aspects, the ratio between the α-pinene and the δ-pinene can be between 0:1 to 1:3 or between 0:1 to 1:1.

In still further aspects, to obtain the desired yield the desired molecular weight of the poly(δ-pinene), one can tune the conditions to arrive at an optimal ratio of an amount of catalyst used in open ring polymerization and a ratio of the α-pinene and the δ-pinene obtained in the second composition.

In still further aspects, the second composition can be purified to remove the α-pinene if present. Again, it is understood that any known in the art methods suitable for purifications of components disclosed herein can be utilized. For example, the second composition can be purified by selectively reacting the α-pinene or separating the α-pinene from the second composition or by a combination thereof.

In some aspects, the selective reacting comprises forming a derivative of the α-pinene. In some exemplary aspects, the derivative of the α-pinene is a beta-lactam derivative of the α-pinene. Some exemplary and unlimiting examples of such purification steps are discussed in detail in the Example section of this disclosure.

In other aspects, the step of the separation can comprise a silver nitrate coated silica gel, fractional distillation, or a combination thereof. Again, some exemplary and unlimiting examples using such purification steps are discussed in detail in the Example section of this disclosure.

In still further aspects, a yield of the δ-pinene is greater than 0% to 100% after purification step, including exemplary values of greater than about 1%, greater than about 5%, greater than about 10%, greater than about 20%, greater than about 30%, greater than about 40%, greater than about 50%, greater than about 60%, greater than about 70%, greater than about 80%, greater than about 90%, greater than about 95%, and greater than about 99%. In still further aspects, a yield of the δ-pinene is greater than about 5% to 100%, greater than about 10% to 100%, greater than about 20% to 100%, greater than about 30% to 100%, or greater than about 40% to 100%.

In still further aspects, where the α-pinene is not present in the second composition, and purification step is not needed, a yield of the δ-pinene is greater than 0% to 100%, including exemplary values of greater than about 1%, greater than about 5%, greater than about 10%, greater than about 20%, greater than about 30%, greater than about 40%, greater than about 50%, greater than about 60%, greater than about 70%, greater than about 80%, greater than about 90%, greater than about 95%, and greater than about 99%. In still further aspects, a yield of the δ-pinene is greater than about 5% to 100%, greater than about 10% to 100%, greater than about 20% to 100%, greater than about 30% to 100%, or greater than about 40% to 100%.

The formed polymer has any of the glass transition temperatures disclosed above. In still further aspects, the formed polymer can exhibit any of the discussed above regioregularity. In still further aspects, the formed polymer can comprise cis, and trans-isomers in any of the disclosed above amounts. In further aspects, the cis and trans-isomers can be present as head-to-tail, head-to-head, and tail-to-tail isomer configurations as discussed above and, in the amounts, disclosed above.

In still further aspects, the formed polymer can be cross-linkable. In still further aspects, the formed polymer can be transparent and exhibit any of the disclosed above transmittance values. In still further aspects, the formed polymer is recyclable.

Also disclosed herein are methods of extruding or molding the polymer into any desired article.

Also disclosed herein are methods further comprising reacting the polymer under conditions effective to form a hydrogenated olefin. The hydrogenated δ-pinene-based polymer can be formed through a hydrogenation reaction; however, the hydrogenation methods are not particularly limited and can be performed using any known methods. In still further aspects, the hydrogenation reaction can occur in the presence of a catalyst. Any known in the art catalyst capable of hydrogenating olefin compounds can be used. The catalysts can be homogeneous or heterogeneous. Any known homogeneous or heterogeneous catalysts suitable for hydrogenation reactions can be utilized for this purpose.

If needed, any of the disclosed reactions herein can be carried out in the presence of a solvent. Again, any known in the art solvents suitable for the specific reactions can be utilized.

It is also understood that the reactions disclosed herein can be carried out at atmospheric pressure, in a vacuum, or at elevated pressure if needed. The pH of the reactive solutions can also be controlled as desired.

Also disclosed are methods of making a composition comprising any of the disclosed herein δ-pinene-based polymers and the additive that can react with a ring opened product as disclosed above.

Also disclosed herein is a method of forming a block copolymer. In such aspects, the method comprises forming a block copolymer comprising: i) a repeating block unit comprising any of the disclosed herein δ-pinene-based polymers present in an amount from greater than 0% to less than 100% of the block copolymer composition; and ii) a repeating block unit comprising a further polymer, wherein the further polymer is different from the polymer of i); wherein the step of forming comprising a reaction in the presence of a catalyst.

In still further aspects, the disclosed herein methods comprise any of the described above monomers. In yet further aspects, the catalyst can be any catalyst capable of catalyzing the desired polymerization.

In certain aspects, the catalyst is a ring-opening metathesis polymerization (ROMP) catalyst. In yet other aspects, the step of polymerizing comprises a living ring-opening metathesis polymerization. In certain aspects, the catalyst can comprise a Grubb catalyst. In some exemplary and unlimiting aspects, the Grubb catalyst can be a second-generation catalyst, a third-generation catalyst, or a combination thereof. In yet further aspects, the Grubb catalyst is a 3$^{rd}$ generation catalyst In such aspects, the repeating block unit of the disclosed herein δ-pinene based polymer can be an amount of about 0.5%, about 1%, about 10%, about 20%, about 30%, about 40%, about 50%, about 60%, about 70%, about 80%, about 90%, about 95%, about 99%, or about 99.99% of the total block copolymer. It is understood that the polymer can be present in any percentage between any two foregoing values.

In still further aspects, the repeating block unit comprising any of the disclosed above δ-pinene-based polymers and the repeating block unit comprising the further polymer can be present in any ratio to form the desired block copolymer. For example, these two repeating units can be present in a ratio from 10:1 to 1:10, including exemplary values of 9:1, 8:1, 7:1, 6:1, 5:1, 4:1, 3:1, 2:1, 1:1, 1:2, 1:3, 1:4, 1:5, 1:6, 1:7, 1:8, and 1:9. It is, however, understood that other ratios can also be contemplated depending on the desired outcome.

In some aspects, the further polymer can comprise any suitable polymer capable of forming a block polymer with the disclosed delta pinene-based polymer.

It is also understood that statistical or random (non-block) copolymers obtained by the described above methods are also disclosed. In such aspects, the repeating unit of the disclosed herein δ-pinene can be polymerized with a repeating unit of any other disclosed herein polymers. The ratios of the different monomeric units can have any of the disclosed above values. In still further aspects, these exemplary statistical polymers can also comprise further polymers as described below.

The monomer of the further polymer is not particularly limited, and the specific examples thereof can include aromatic vinyls, such as styrene, α-methylstyrene, 3-methylstyrene, 4-methylstyrene, 4-ethyl styrene, 4-t-butyl styrene, 1-vinyl naphthalene and indene; (meth)acrylic monomers, such as (meth)acrylic acid, methyl (meth)acrylate, ethyl (meth)acrylate, butyl (meth)acrylate, 2-hydroxyethyl (meth)acrylate and glycidyl(meth)acrylate; maleic anhydride, maleic acid, fumaric acid, maleimide; nitrile group-containing vinyl monomers, such as acrylonitrile and methacrylonitrile; amide group-containing vinyl monomers, such as acrylamide and methacrylamide; olefins, such as ethylene, propylene, isobutylene, butadiene, isoprene and norbornene; turpentine-derived double bond-containing compounds such as β-pinene, α-pinene, limonene, myrcene, camphene and carene; vinyl esters, such as vinyl acetate, vinyl pivalate and vinyl benzoate; styrene derivatives having polar groups, vinyl chlorides, vinylidene chlorides, allylic chlorides, allylic alcohols and the like. Furthermore, they may also contain bifunctional monomers, such as p-divinylbenzene, p-diisopropenyl benzene, ethylene glycol divinyl ether, and the like. These can be used either alone or as a combination of two or more thereof.

In still further aspects, the further polymer can comprise a cycloolefin. In still further aspects, the cycloolefin polymer can comprise a substituted or unsubstituted bridged cyclic hydrocarbon. In still further aspects, the substituted or unsubstituted bridged cyclic hydrocarbon comprises a substituted or unsubstituted norbornene.

In still further aspects, the block copolymer formed by the methods disclosed above can have at least one additional repeating bock unit comprising a monomer that is different from i) or ii).

EXAMPLES

The example shows the polymerization of an α-pinene to a poly(δ-pinene) according to Scheme 1.

Scheme 1: Overall monomer reaction scheme from an α-pinene to a poly(δ-pinene) including purification reactions and common polymerization conditions.

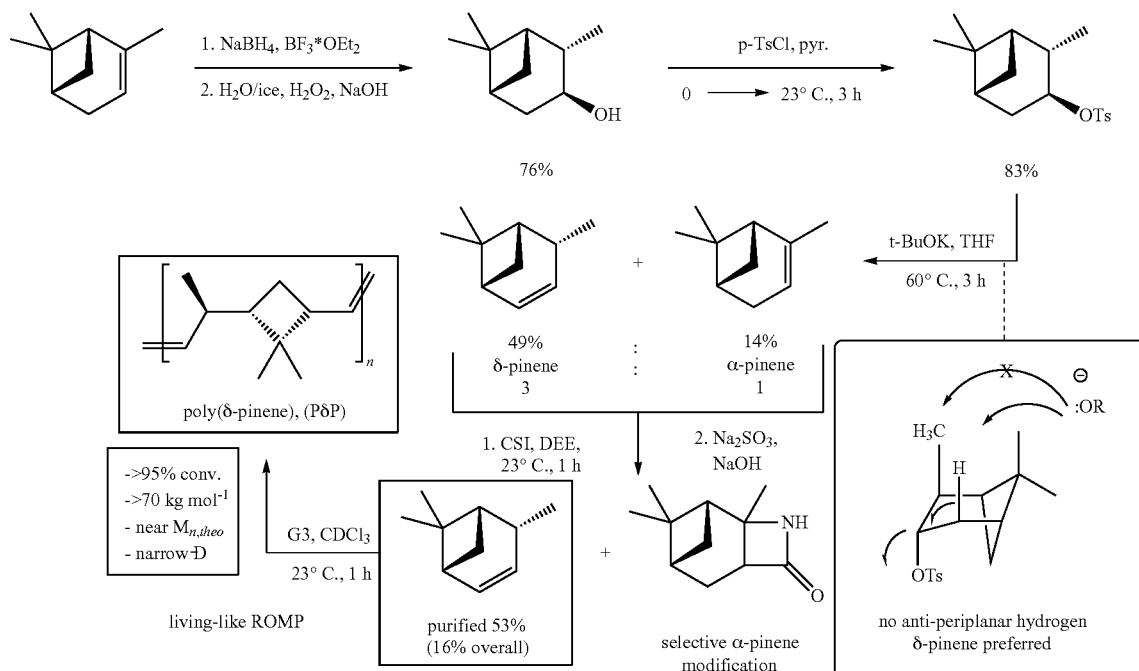

Materials. All chemicals were used as received unless otherwise noted. Sodium hydroxide (≥85%), boron trifluoride diethyl etherate (98%), and 3-bromopyridine (99%) were obtained from Sigma-Aldrich. Catalyst M204 (Grubbs 2$^{nd}$ generation, G2) (99.95%) was obtained from Umicore. Potassium tert-butoxide (99%), 4-toluenesulfonyl chloride (tosyl chloride, TsCl) (99%), sodium borohydride (98%), pyridine (99.9%), (−)-alpha-pinene (98%), hydrogen peroxide (35%), chlorosulfonyl isocyanate (99%), and anhydrous sodium sulfite (99%) were obtained from Oakwood Chemical. Hexane (≥98.5%), dichloromethane (DCM) (≥99.5%), tetrahydrofuran (THF) (≥99.5%), diethyl ether (DEE) (≥99.0%), and methanol (≥99.8%) were obtained from EMD Millipore. Silver nitrate (≥99.9%) and basic aluminum oxide Brockman Grade 1 (99%) were obtained from Alfa-Aesar. Neutral aluminum oxide Brockman Grade 1 (99%) was obtained from BeanTown Chemical. THF and DCM were purified with an SG Water USA Company solvent still where they were passed through two columns of neutral alumina and an in-line 2 µm filter. Hydrochloric acid (HCl, 36.5-38%) was obtained from VWR. Sodium sulfate (>99%), sodium chloride (>99%), sodium bicarbonate (≥99.7%) were obtained from BDH. Silica gel, SiliaFlash P60 (40-63 µm), was obtained from SiliCycle. Chloroform-d (CDCl$_3$) (99.8%, Sigma-Aldrich) was stored over 4 Å molecular sieves.

Figure 2:
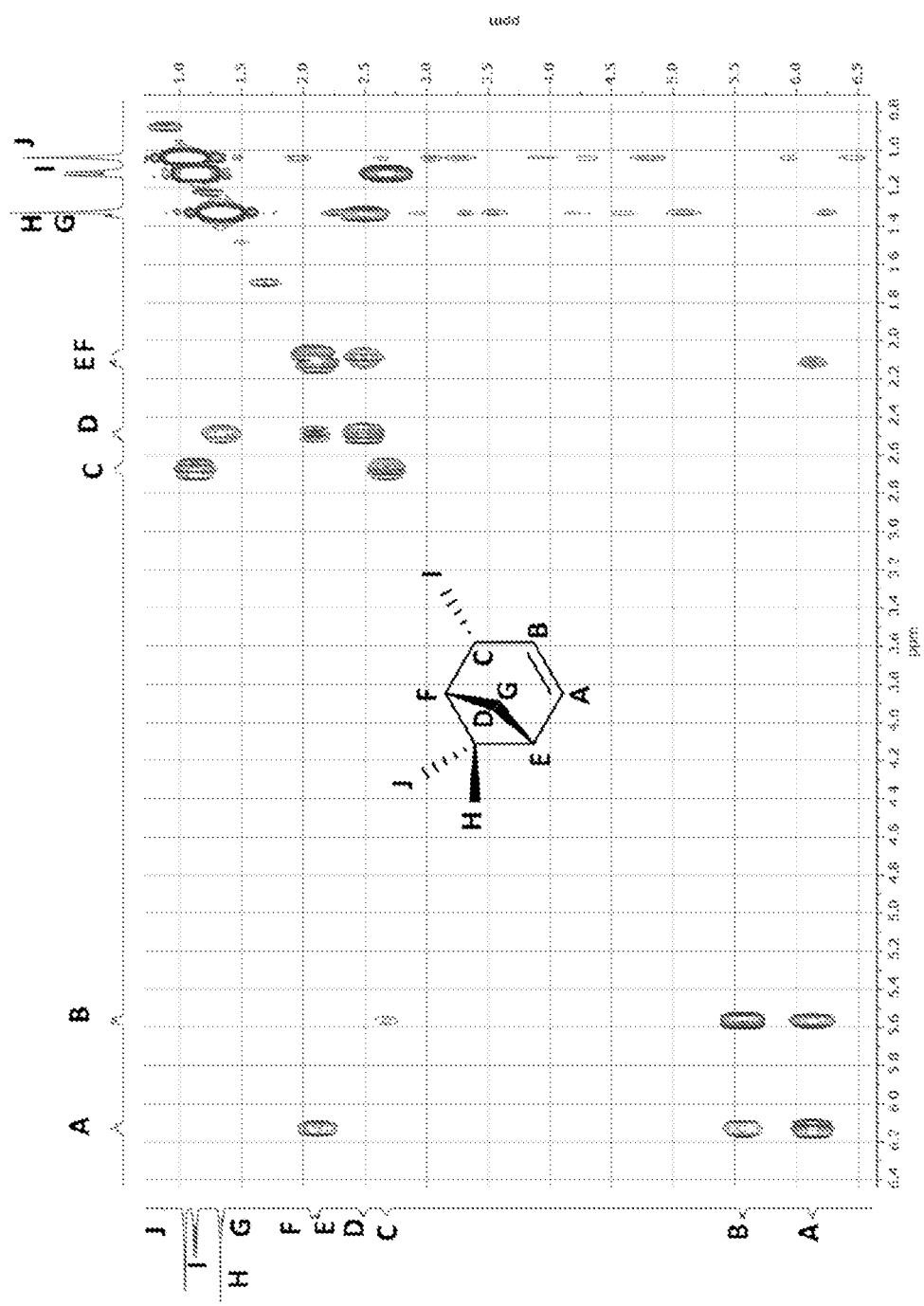
FIG. 2 shows a COSY NMR spectrum (CDCl$_3$, 25° C.) of δ-pinene.
Figure 3:
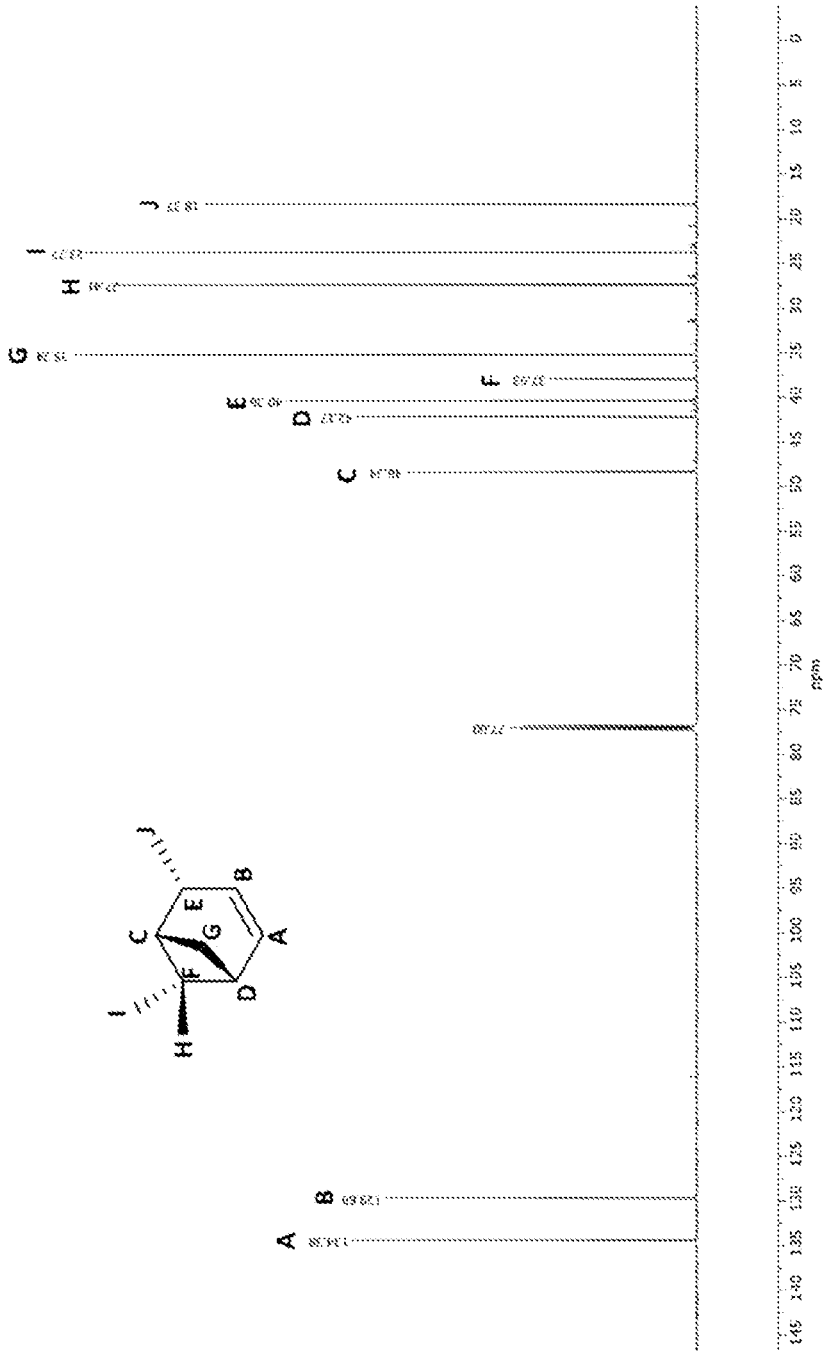
FIG. 3 shows a $^{13}$C NMR spectrum (CDCl$_3$, 25° C.) of δ-pinene.
Figure 4:
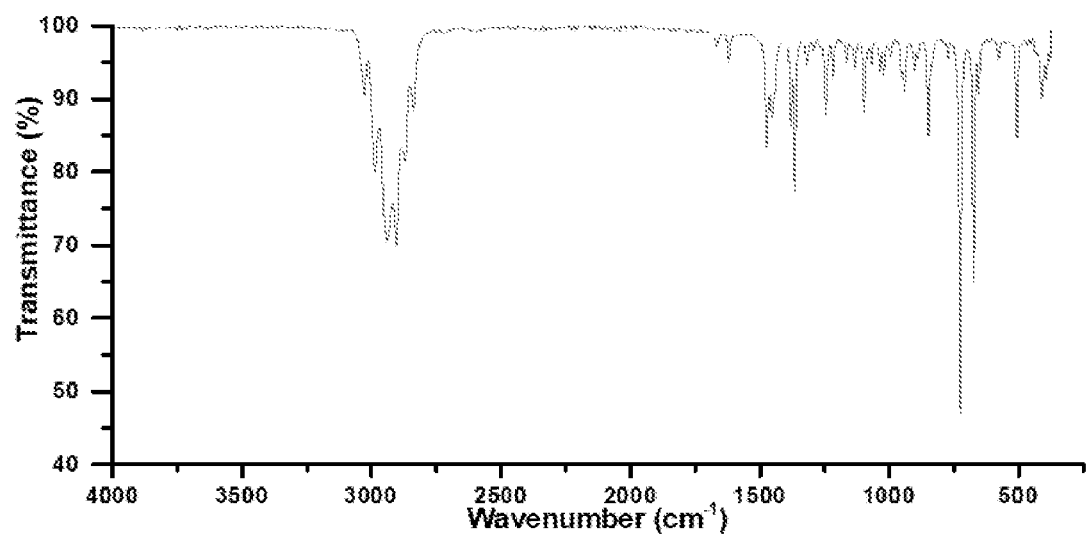
FIG. 4 shows an FTIR spectrum of δ-pinene.

Characterizations. Samples were prepared for nuclear magnetic resonance (NMR) samples were prepared by dissolving the sample in deuterated chloroform. $^1$H and $^{13}$C NMR data were obtained on either a Bruker Advance III 600 MHz or 400 MHz NMR with a 1 s pulse delay for small molecule samples and a 10 s delay for polymers. Size exclusion chromatography (SEC) samples were prepared by dissolving ~10 mg of polymer in 1 mL of THF and filtering through 0.45 µm polytetrafluoroethylene (PTFE) filter before analysis with an Agilent-Wyatt combination triple detection SEC equipped with three successive Agilent PL-gel Mixed C columns (THF mobile phase, 25° C.), an Agilent 1260 infinity series pump, degasser, autosampler and thermostated column chamber. The triple detection unit comprises a MiniDawn TREOS 3-angle light scattering detector, Optilab TrEX refractive index (RI) detector, and a Viscostar II differential viscometer in successive order. In order to garner accurate molar masses, the specific refractive index increment (dn/dc) was calculated through the creation of five polymer solutions ranging from 0.882-8.82 mg mLA in THF. These samples were injected along with leading and trailing blank THF injections directly into the RI detector, with the blank THF samples acting as a baseline. Various NMR spectra of the δ-pinene are shown in FIGS. 1-3.

Figure 17:
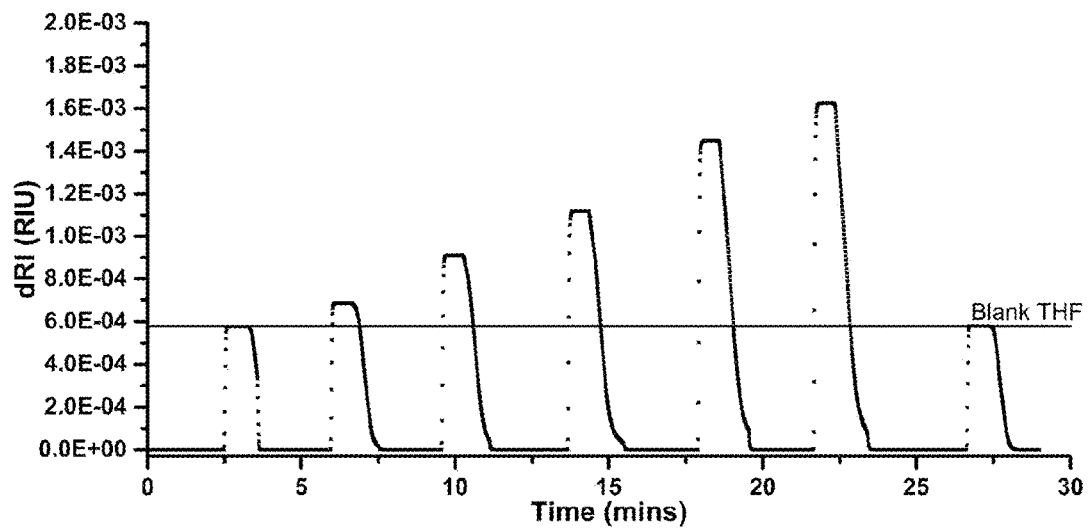
FIG. 17 shows a differential refractive index response graph generated from injections of poly(δ-pinene). Poly(δ-pinene) samples were prepared by dissolution in THF and subsequent dilution in four volumetric flasks to create a concentration range between 0.882-8.824 mg $mL^{-1}$. The initial and final peaks were blank THF samples that were used to create a baseline.
Figure 18:
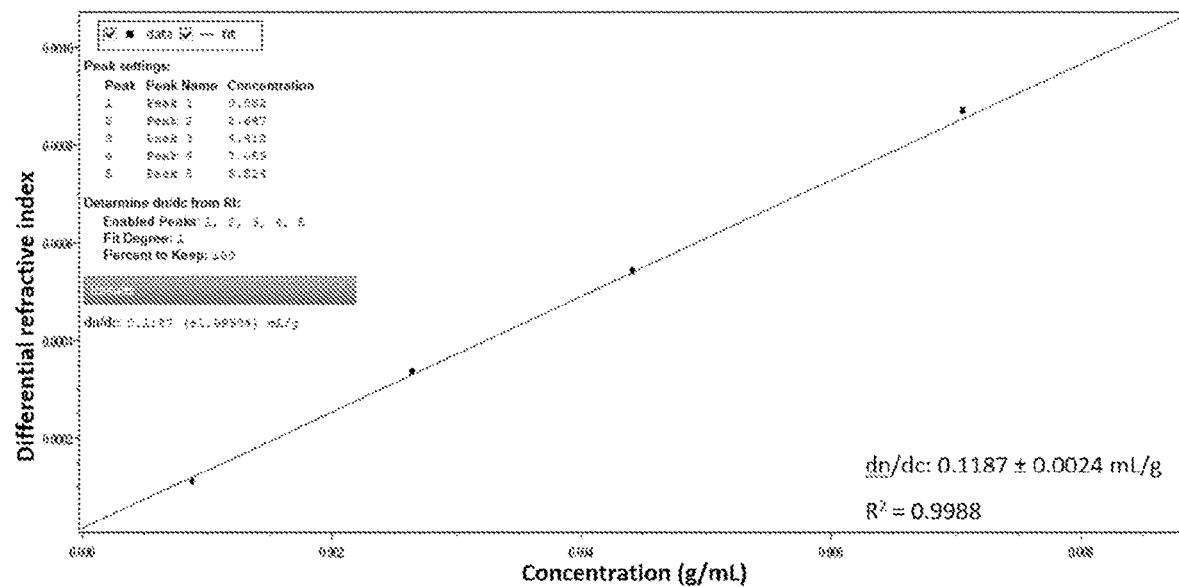
FIG. 18 shows a dn/dc line fitted to the dRI response graph in FIG. 16.

A linear calibration curve was created from the refractive index as a function of concentration ($R^2$=0.9988), and dn/dc=0.1187 (±0.0024) mL g$^{-1}$ was determined (FIGS. 17 and 18).

Figure 19:
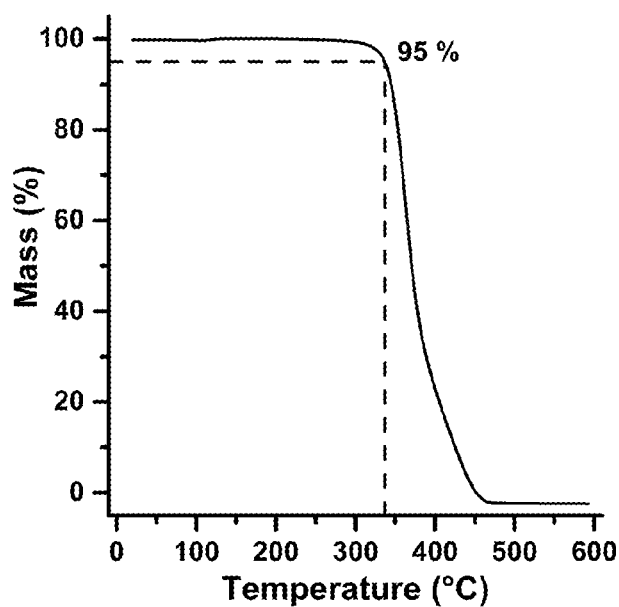
FIG. 19 depicts a thermogravimetric analysis of poly(δ-pinene). Data collected at a heating rate of 10° C. $min^{-1}$ under argon.
Figure 20:
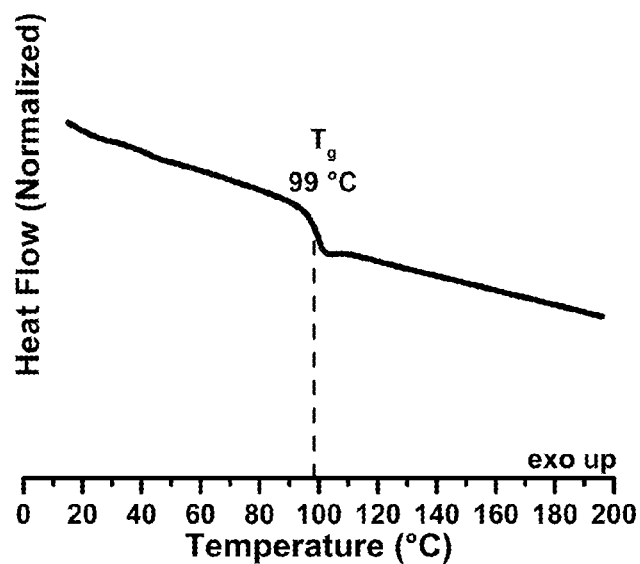
FIG. 20 shows a normalized differential scanning calorimetry thermogram of 70 kg $mol^{-1}$ poly(δ-pinene). Data collected from the $2^{nd}$ sweep, heated at a rate of 10° C. $min^{-1}$ under a nitrogen atmosphere.
Figure 21:
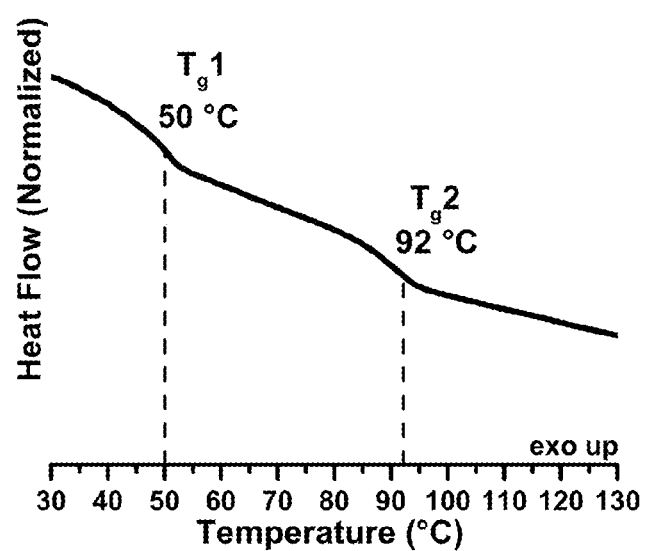
FIG. 21 shows a normalized differential scanning calorimetry thermogram of poly(norbornene)-block-poly(δ-pinene). Data collected from the $2^{nd}$ sweep, heated at a rate of 10° C. $min^{-1}$ under a nitrogen atmosphere.
Figure 22:
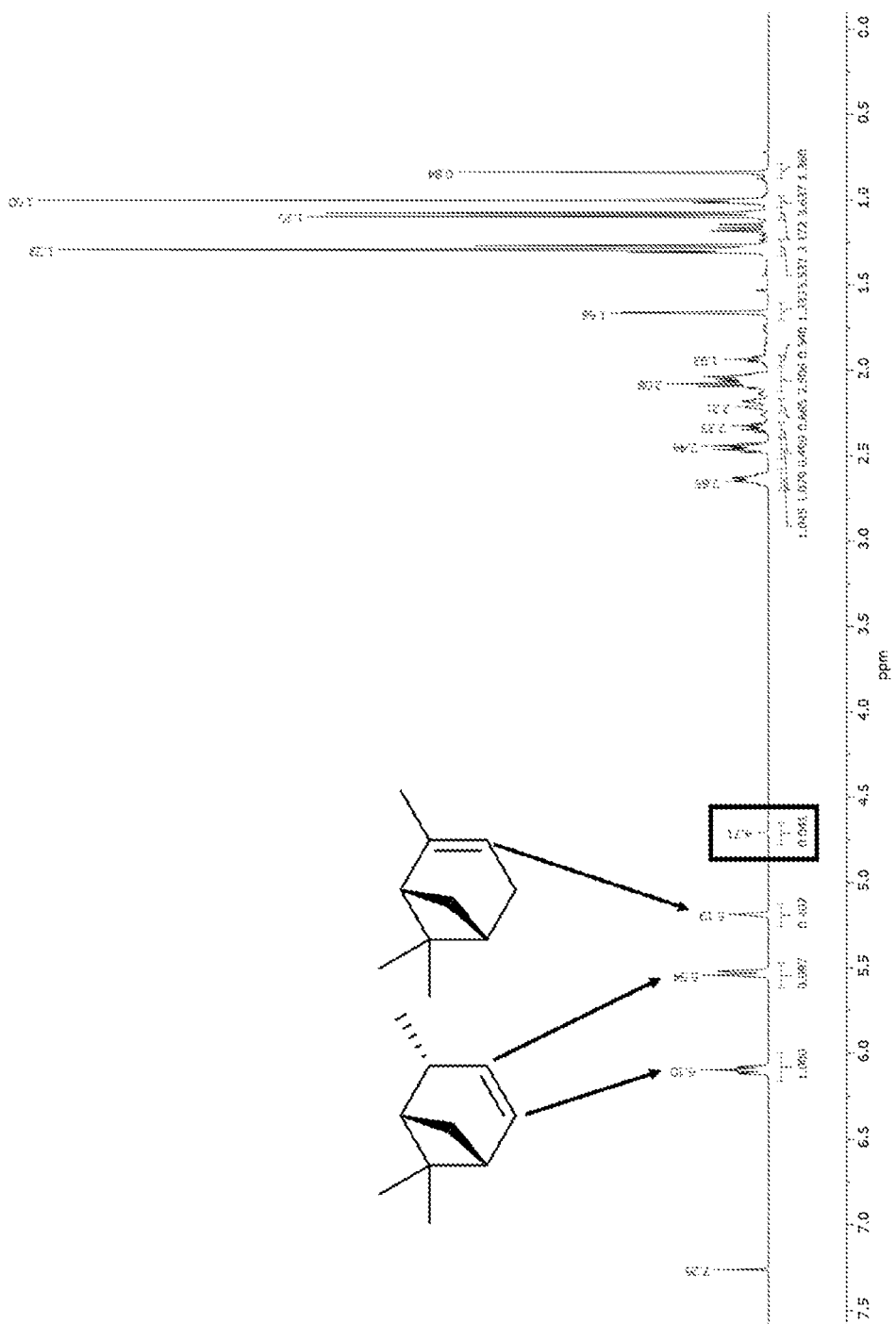
FIG. 22 shows $^1H$ NMR of δ-pinene that has only been purified through a hexane/silica gel plug and subsequent vacuum transfer. No attempt has been made to remove excess α-pinene from this sample, and subsequently, α-pinene is present at approximately 28.9 mol % relative to δ-pinene. Another peak is also present at 4.71 ppm that does not correlate to either pinene isomer.
Figure 23:
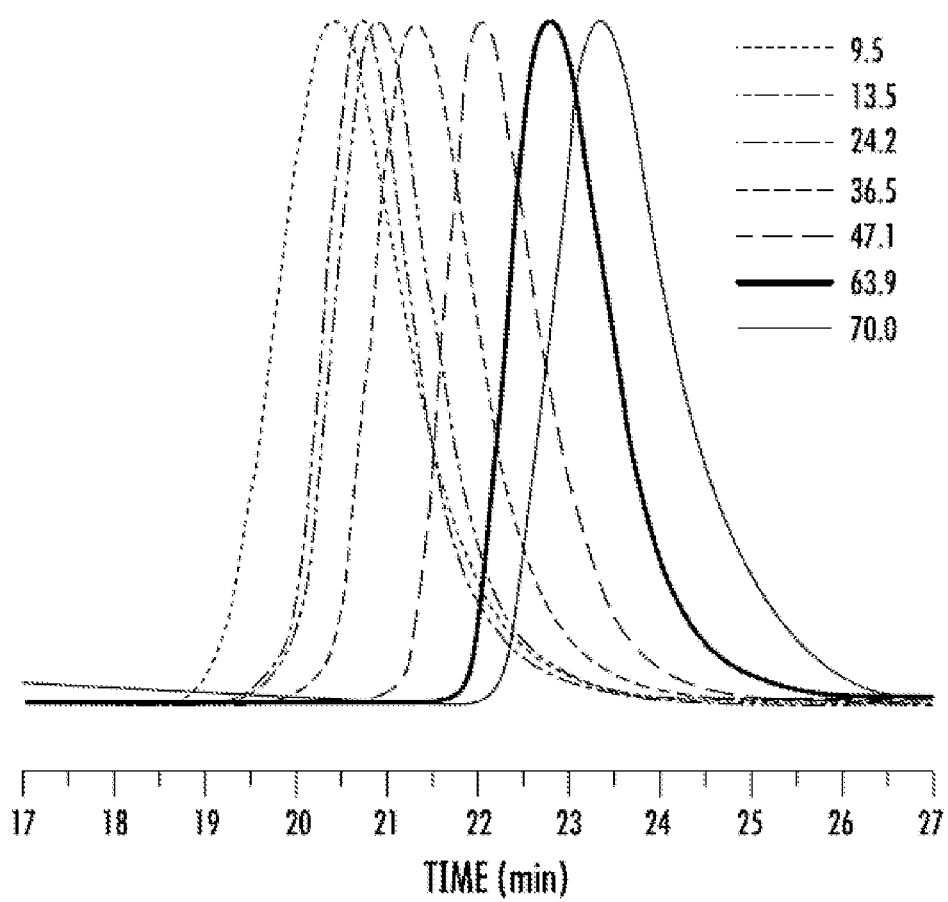
FIG. 23 shows normalized size exclusion chromatograph traces from selective poly(δ-pinene) polymerization trials targeting a range of molar masses.

Thermogravimetric analysis (TGA) was performed holding isothermal for 10 min at 100° C. to remove moisture, followed by heating at 10° C. min$^{-1}$ to 600° C. on a combined DSC/TGA (SDT) TA Instruments model Q600. Differential scanning calorimetry (DSC) analysis was performed by cycling the samples between 0° C. and 200° C. at a rate of 10° C. min$^{-1}$ on a TA Instruments model Q1000 equipped with a model RCS 90 refrigerated cooling system. The second heating cycle was utilized for glass-transition temperature ($T_g$) determination. Exemplary thermogravimetry analysis is shown in FIG. 19. Exemplary scanning calorimetry thermogram is shown in FIGS. 20-21.

Specific optical rotation, $[\alpha]_{589}^{24}$ was obtained at 24° C. using a 589 nm polarized light filter on a Jasco P-2000 polarimeter by creating three solutions of δ-pinene with known concentrations of 15.55, 20.70, and 27.70 mg mL$^{-1}$ in THF. The same analysis was performed on two solutions of poly(δ-pinene) with concentrations of 19.95 and 24.95 mg mL$^{-1}$ in THF. Quintuplicate polarimeter readouts were taken at 25° C. in a 10 cm quartz cell and were averaged.

Mass spectrometry was performed through dilution of 3 µL of δ-pinene in 1 mL hexane followed by analysis via 1 µL split injection via gas chromatography/electron ionization-mass spectrometry (GC/EI-MS). Measurements were obtained on a ThermoScientific DSQ II 2.0.1, SP1 Version with electron ionization at 70 eV and an ion source temperature of 250° C. The scanned mass-to-charge (m/z) range was 35 to 400 m/z at 1500 u/s with a gain of 5*10$^5$ (EM voltage=1852 V) and a 4-minute delay on the filament.

Figure 5:
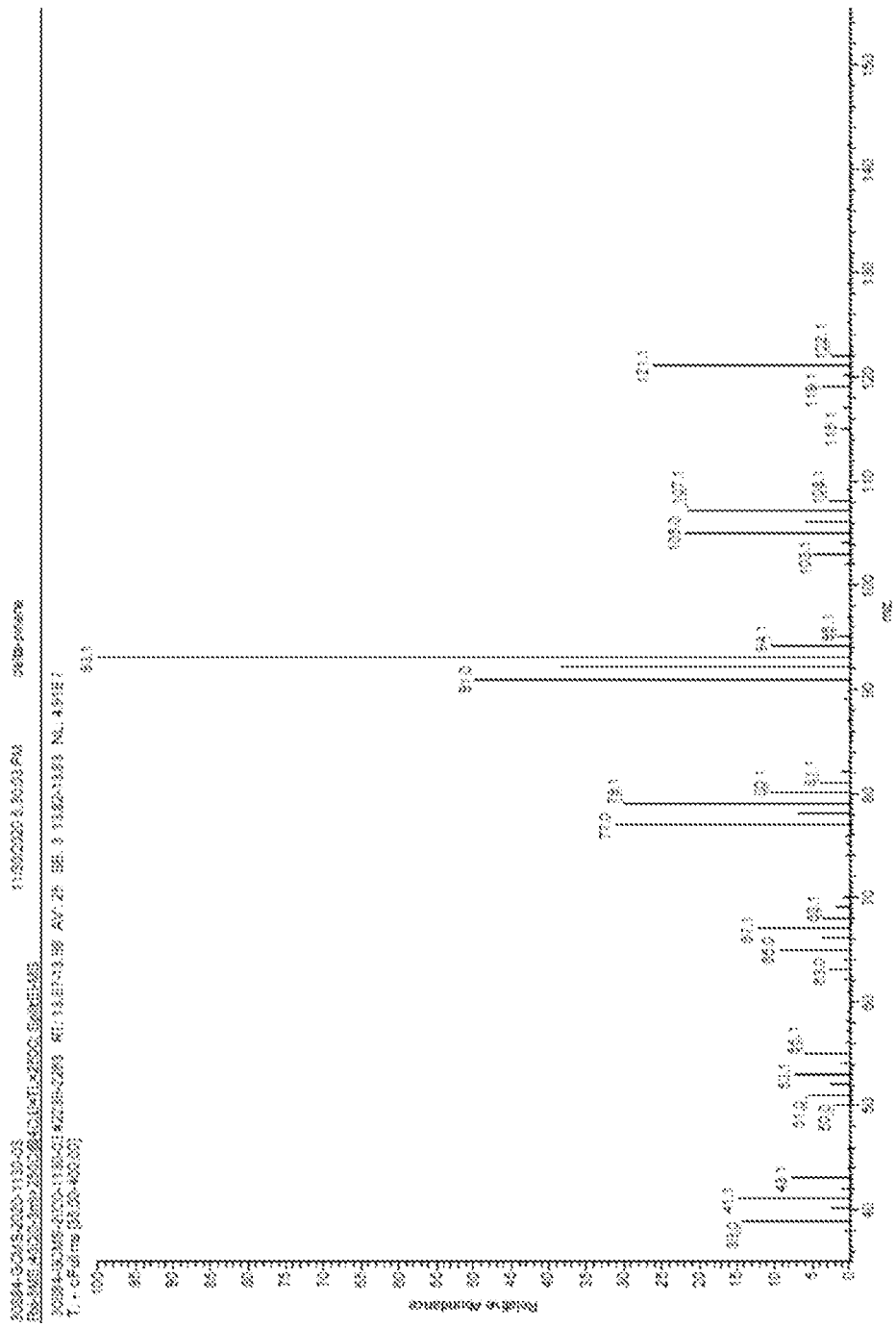
FIG. 5 shows a gas chromatograph-electron impact-mass spectrum (GC-EI-MS) of δ-pinene.
Figure 6:
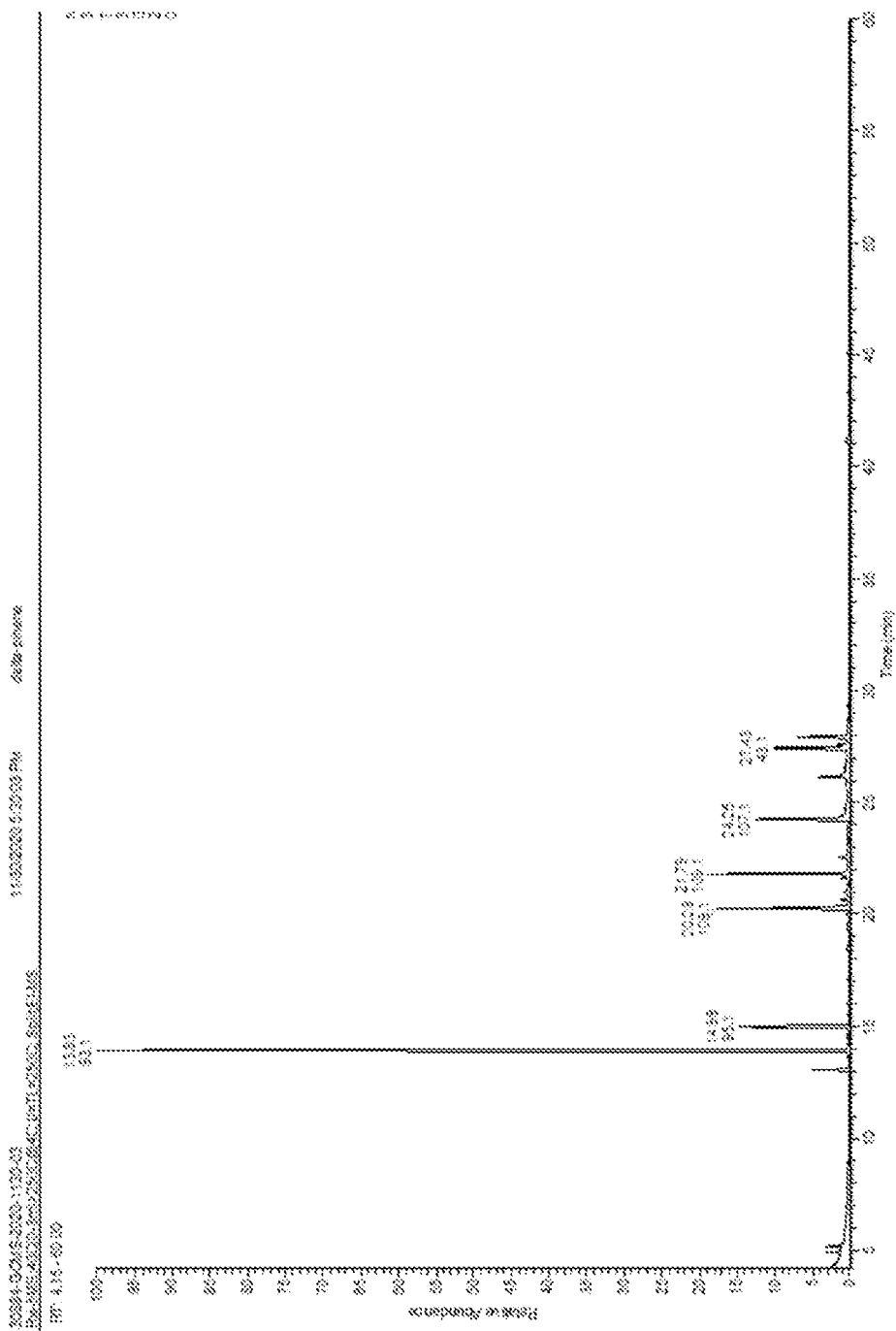
FIG. 6 shows a GC/EI-MS total ion current (TIC) chromatogram of δ-pinene.
Figure 7:
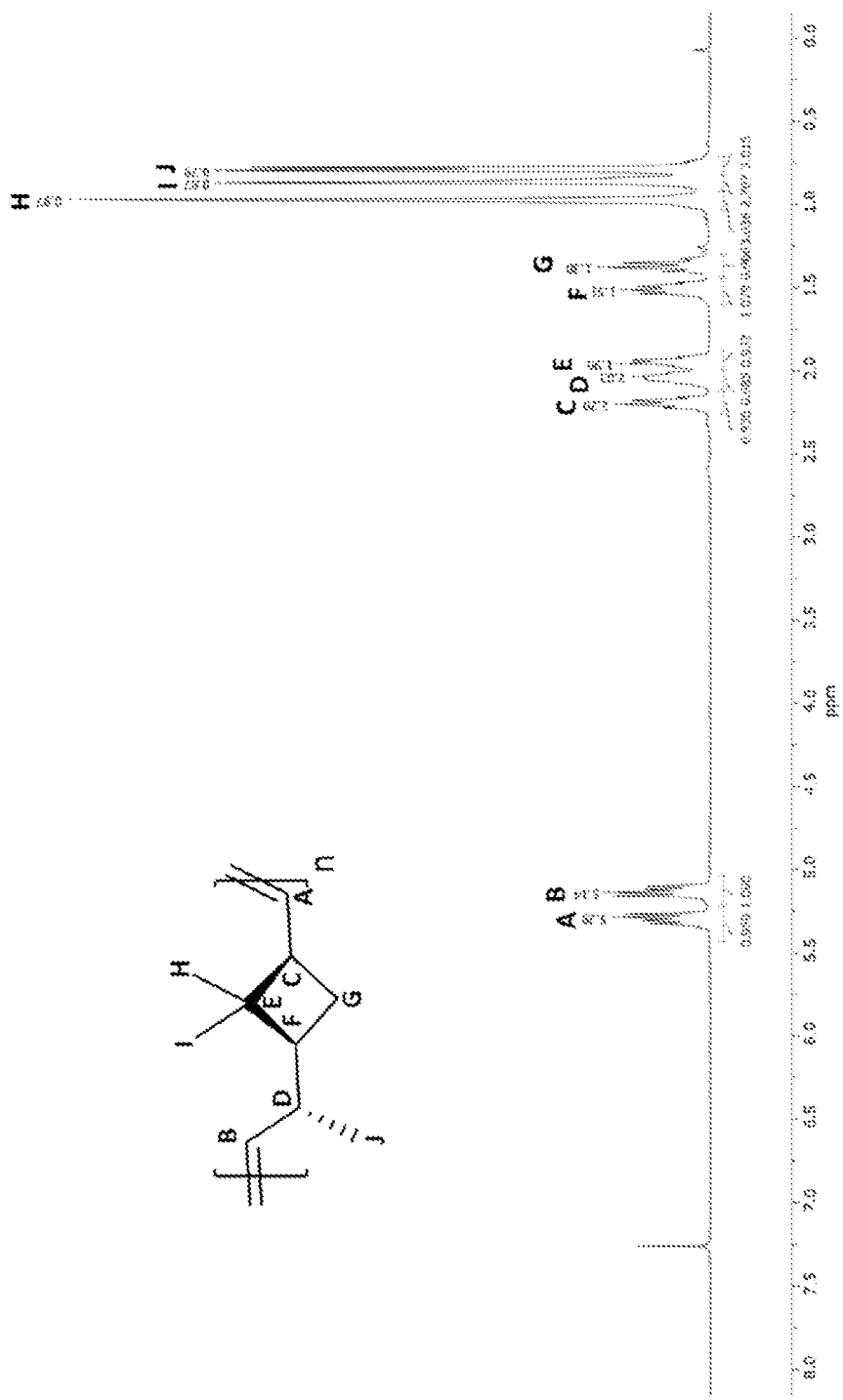
FIG. 7 shows a $^1$H NMR spectrum (CDCl$_3$, 25° C.) of poly(δ-pinene).
Figure 8:
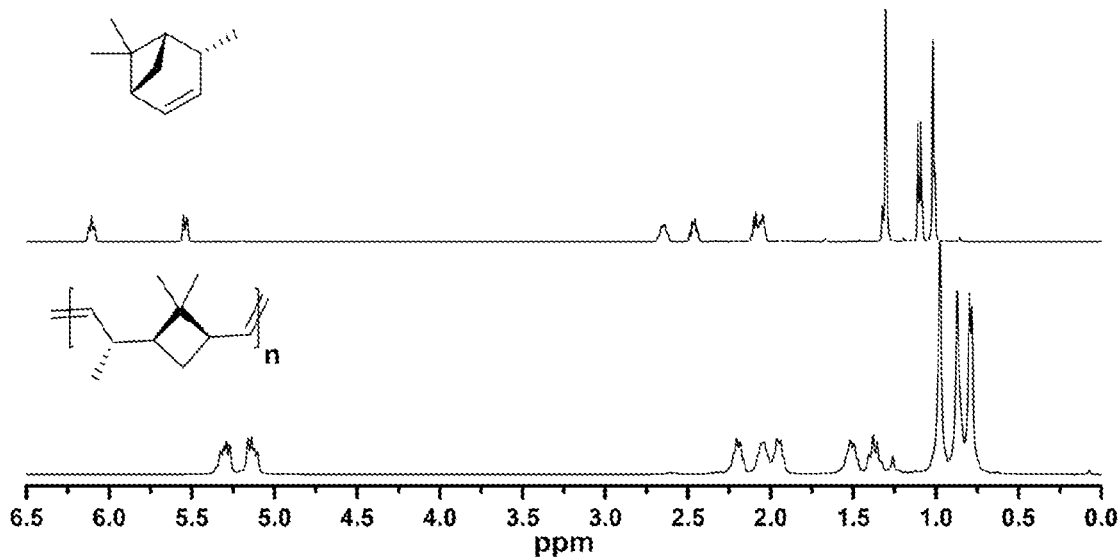
FIG. 8 shows stacked 1H NMR (400 MHz, CDCl$_3$, 23° C.) spectra of δ-pinene (top) and resulting polymer, poly(δ-pinene) (pδp) (bottom). Spectra were referenced to the CHCl$_3$ solvent peak at 7.26 ppm.

The gas chromatograph utilized for the GC/EI-MS was a ThermoScientific Trace GC Ultra with a mass spectrometry transfer line and injection port, both set to 250° C. Helium was used as the carrier gas with a vacuum compensated constant flow rate of 1 mL min$^{-1}$ and a split flow injection rate of 10 mL min$^{-1}$. The temperature was held at 40° C. for the first 3 minutes, followed by a ramp to 250° C. at a rate of 4° C. min$^{-1}$, where it was held for 5 minutes. The columns utilized on the gas chromatograph were a Restek Corp. Rxi-5MS and an Agilent Technologies DB-5MS. Exemplary spectra of δ-pinene are shown in FIGS. 5-6.

Methods
Silica Nitrate Isomeric Separation Setup:

Silver nitrate impregnated silica gel was prepared for column chromatography according to literature and is described below.[1]

Silica Gel Impregnation

In a 1 L Erlenmeyer flask, 5.0019 g (29.4 mmol) of AgNO$_3$ was dissolved in 5 mL of DI water. A total of 45 g of silica gel was added to the flask, along with an additional 90 mL of DI water. The flask was wrapped in the aluminum foil due to light sensitivity and stirred for 12 hours. The excess water was rotovapped off at 65° C., and the silica gel was vacuum dried prior to use.

Silver Nitrate TLC Plate Treatment

A total of 2 g (11.8 mmol) of AgNO$_3$ was dissolved in 5 mL of DI water in order to make a stock aqueous AgNO$_3$ solution. Thin-layer chromatography (TLC) plates were pretreated for isomeric separation columns by running a blank TLC plate in the AgNO$_3$(aq.) solution and allowing the solvent line to reach the top of the plate. The plates were then removed from the solvent and allowed to air dry before using.

Separation of δ/α-Pinene with Silver Nitrate Impregnated Silica Gel

Chromatography columns were prepared for isomeric separation utilizing standard slurry packing methodology with pure DCM. Columns were run using air pressure (flash), and isomeric separation was tested by spotting on pretreated TLC plates, stained with potassium permanganate, and heated with a heat gun. DCM proved to be the only effective solvent of those tested (DCM, hexane, ethyl acetate, diethyl ether) for isomer separations, giving relative fractions ($R_f$) of 0.65 and 0.43 for a and 6 pinene, respectively.

Synthesis

Isopinocampheol was synthesized following previous procedures and is described below.

Sodium borohydride (1.5 eq., 7.67 g, 220 mmol) was dissolved in dry THF (200 mL) in a 500 mL round bottom flask (RBF), equipped with a magnetic stir bar, and placed in an ice bath. An addition funnel was used to add 1.5 equivalents of boron trifluoride diethyl etherate (27.2 mL, 220 mmol) dropwise under nitrogen. The reaction was allowed to stir for approximately ten minutes before the addition of 23.3 mL of α-pinene (1 eq., 147 mmol) via syringe. The reaction mixture was allowed to react for 3 hours at 0° C. The diglyme was hydrolyzed through the piecemeal addition of ice chips. In a beaker, 120 mL of 1 M NaOH (0.82 eq., 120 mmol) and 60 mL of 30% $H_2O_2$ (4 eq., 590 mol) were combined and slowly poured into the RBF. This solution was allowed to react for 1 hour at 0° C. and 2 hours at room temperature before separating the aqueous and organic layers in a separatory funnel. The aqueous layer was extracted three times with diethyl ether and combined with the organic layer, which was then washed twice with brine and dried over sodium sulfate. The solution was then filtered with a Buchner funnel and concentrated en vacuo. The crude isopinocampheol was purified through vacuum sublimation at 65° C. for approximately 3 hours, yielding 16.350 g of white, crystalline solid (106 mmol, 72.2%). NMR characterization matched literature reported values.

Isopinocampheol tosylate [(1S,2S,3S,5R)-2,6,6-trimethylbicyclo[3.1.1]heptan-3-yl 4-methylbenzenesulfonate] was synthesized by dissolving isopinocampheol (16.350 g, 106 mmol) in three equivalents of pyridine (25.73 mL, 318 mmol) in a 250 mL round bottom flask with a stir bar. The reaction flask was chilled in an ice bath for approximately 10 minutes before tosyl chloride (22.23 g, 117 mmol, 1.1 eq.) was added via spatula, and the reaction was left stirring for 90 minutes. The reaction was then removed from the ice bath and allowed to proceed for another 90 minutes at room temperature (23° C.). Approximately 100 mL of ethyl acetate and 100 mL of DI water were added to the solution, and the layers were separated in a separatory funnel. The aqueous layer was extracted twice with ethyl acetate and combined with the organic layer, which was then washed thrice with 1 M HCl (aq.), once with saturated sodium bicarbonate, once with DI water, and once with brine. The solution was dried over sodium sulfate, filtered, concentrated en vacuo, and used crude for the next reaction (with a yield of about 83%).

δ-pinene [(1R,4R, 5S)-4,6,6-trimethylbicyclo[3.1.1]hept-2-ene] was synthesized by dissolving 21.62 g of crude isopinocampheol tosylate (70.1 mmol) with 100 mL of dry THF in 500 mL RBF. In a glovebox, 15.73 g of potassium tert-butoxide (140 mmol, 2 eq.) was added to a 500 mL RBF, removed from the glovebox, and subsequently dissolved in 150 mL of dry THF. The round bottom containing the tosylated intermediate was placed in an ice bath to chill for approximately 5 minutes prior to the addition of the tert-butoxide solution. The reaction vessel was then transferred to an oil bath preheated to 50° C. and allowed to react for 3 hours. Following reaction completion, ~30 mL of DI water was added, and the majority of the THF was removed via rotovap. The aqueous solution was extracted four times with 50 mL of hexane. The hexane was then washed twice with brine before concentration en vacuo. The concentrate was purified through column chromatography utilizing pure hexane as a solvent. NMR analysis (FIG. SX) shows a mixture of α & δ-pinene in a ~1:3 ratio. Yield of δ-pinene 4.63 g, 44.0 mmol, 48.5%.

Purification of δ-pinene was achieved through a selective reaction between chlorosulfonyl isocyanate and α-pinene following a literature procedure and is described below. 4.42 g of 1:3 α: δ pinene mixture (8.07 mmol:24.4 mmol) was added to a 100 mL RBF with a stir bar and dissolved in 50 mL of diethyl ether. Chlorosulfonyl isocyanate (0.700 mL, 8.07 mmol, 1 eq.) was added via micropipette, and the reaction was allowed to proceed for one hour at room temperature. In a 4 mL vial, approximately 5 mL of DI water was used to dissolve 1.53 g of sodium sulfite (12.1 mmol, 1.5 eq.). The aqueous $Na_2SO_3$ was added to the reaction with a Pasteur pipette, and the pH was between 7-8 through addition as needed of a 1 M aqueous NaOH solution as monitored via pH paper. The aqueous and organic layers were then separated, and the aqueous layer was extracted twice with 40 mL of DEE. The organic solution was then dried over $Na_2SO_4$, filtered, and concentrated in vacuo. The δ-pinene was then separated from the amide via static vacuum transfer at 35° C. Yield 1.74 g, 16.9 mmol, 52.4%. $^1$H NMR (400 MHz, $CDCl_3$) δ=6.11 (t, 1H), 5.55 (d, 1H), 2.64 (m, 1H), 2.45 (m, 1H), 2.09 (m, 1H), 2.05 (m, 1H), 1.32 (m, 1H), 1.30 (s, 3H), 1.11 (d, 3H), 1.02 (s, 3H) $^{13}$C NMR (150 MHz, $CDCl_3$) δ=134.38, 129.68, 48.34, 42.17, 40.36, 37.93, 35.24, 27.41, 23.77, 18.37. $[\alpha]_{589}^{24}$=−35° (±1.9°). (FIGS. 1-3)

Grubbs $3^{rd}$ generation catalyst (G3) was synthesized following previous procedures and is described below.

In a 20 mL scintillation vial, 0.0497 g (0.0585 mmol) of G2 was dissolved in excess of 3-bromopyridine and allowed to stir at 23° C. for 30 minutes. The freshly synthesized green G3 was precipitated out through the addition of approximately 5 mL of hexane, chilled to 0° C., and stirred for one hour. The precipitant was collected in a glass-fritted funnel and washed thrice with excess hexane. The recovered solid was then dried under vacuum overnight resulting in 0.0484 g (0.0547 mmol) of bright green G3. Yield 92.9%

Ring opening metathesis polymerization (ROMP) of δ-pinene. An average reaction setup is described below, minor variations took place as described in the results and discussion section in order to probe polymerization information further.

A 4 mL scintillation vial was equipped with a stir bar, and 3.0 mg (0.0034 mmol, 1 eq.) of G3 was added. In a separate vial, 0.1010 g (0.741 mmol, 218 eq.) of δ-pinene was added via micropipette and dissolved in 0.619 mL of CDCl3 to make a 1.0 M solution. The δ-pinene solution was added to the G3 vial and stirred for 1 hour at 23° C. The reaction was quenched with an excess of ethyl vinyl ether (EVE) (0.2 mL, 2.1 mmol, 615 eq.) and was allowed to stir for approximately 10 minutes. The entire solution was then transferred to an NMR tube for conversion analysis. The reaction mixture was then precipitated in methanol, filtered through a Büchner funnel, collected, and dried overnight in a vacuum chamber. Polymer samples that were utilized for characterization were redissolved in DCM, precipitated in methanol, and dried a total of two more times to ensure purity. Yield: 0.0609 g, 60.3% $^1$H NMR (400 MHz, $CDCl_3$) δ=5.30 (dd, 1H), 5.13 (dd, 1H), 2.20 (q, 1H), 2.04 (m, 1H), 1.96 (q, 1H), 1.52 (m, 1H), 1.38 (q, 1H), 0.97 (s, 3H), 0.87 (s, 3H), 0.80 (d, 3H). $^{13}$C NMR (150 MHz, $CDCl_3$) δ=136.58, 128.50, 48.79, 45.51, 42.68, 38.70, 30.52, 28.47, 18.57, 17.26. $[\alpha]_{589}^4$=+830 (±1.1°). (FIGS. 7-8, 10, 12)

ROMP copolymerization of δ-pinene with norbornene. A 4 mL scintillation vial was equipped with a stir bar, and 6.7 mg (0.0076 mmol, 1 eq.) of G3 was added. In a separate vial, 0.0688 g (0.731 mmol, 96 eq.) of norbornene was dissolved in 0.619 mL $CDCl_3$ to make a 1.0 M solution. The norbornene solution was added to the G3 vial and allowed to react at 23° C. After 10 minutes, 0.100 g (0.734 mmol, 97 eq.) of δ-pinene was added via micropipette, and the reaction was allowed to proceed for an hour. The reaction was quenched through the addition of 0.2 mL EVE (2.1 mmol, 276 eq.) and stirred for 10 minutes. The solution was then precipitated in approximately 100 mL of methanol, filtered through a Buchner funnel, and dried on a Schlenk line. Yield: 0.0709 g, 42%.

Results and Discussion

An internal shift of α-pinenes' double bond was carried out in order to afford greater catalyst access to the olefin in order to undergo ROMP.

Hydroboration-oxidation of the alkene, followed by tosylation, was utilized in order to add a good leaving-group anti to the adjacent methyl in order to push the reaction towards a Hoffman elimination pathway. Potassium tert-butoxide was similarly chosen to yield the less favorable Hoffman product and did so in good yield (~50%) and with good selectivity for the δ position, 3:1 δ:α-pinene.

Figure 24:
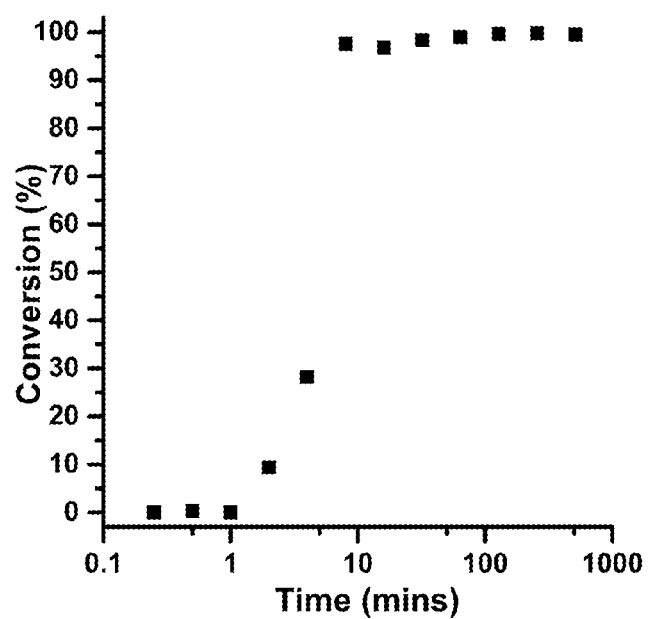
FIG. 24 shows the conversion of δ-pinene to poly(δ-pinene) catalyzed via Grubbs' $2^{nd}$ Generation catalyst at room temperature under a nitrogen atmosphere. Aliquots (50 microliters each) were taken at intervals starting at 15 seconds and doubling in time up to 516 minutes. The aliquots were quenched through addition to 4 mL vials containing approximately 0.1 mL of ethyl vinyl ether each before checking conversion via $^1H$ NMR in $CDCl_3$.
Figure 25:
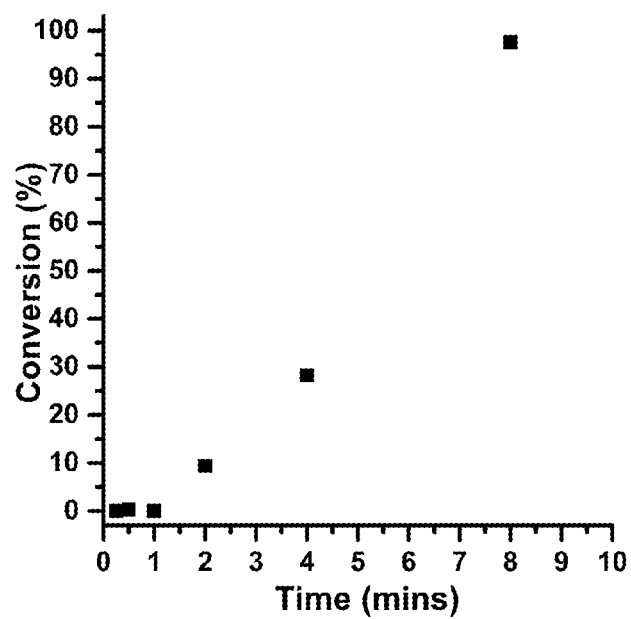
FIG. 25 shows the conversion of δ-pinene to poly(δ-pinene) catalyzed via Grubbs' $2^{nd}$ Generation catalyst at room temperature under a nitrogen atmosphere. Data zoomed in on the first 10 minutes of the experiment to better illustrate the induction period of the catalyst initiation and subsequent rapid propagation to near quantitative conversion.
Figure 26:
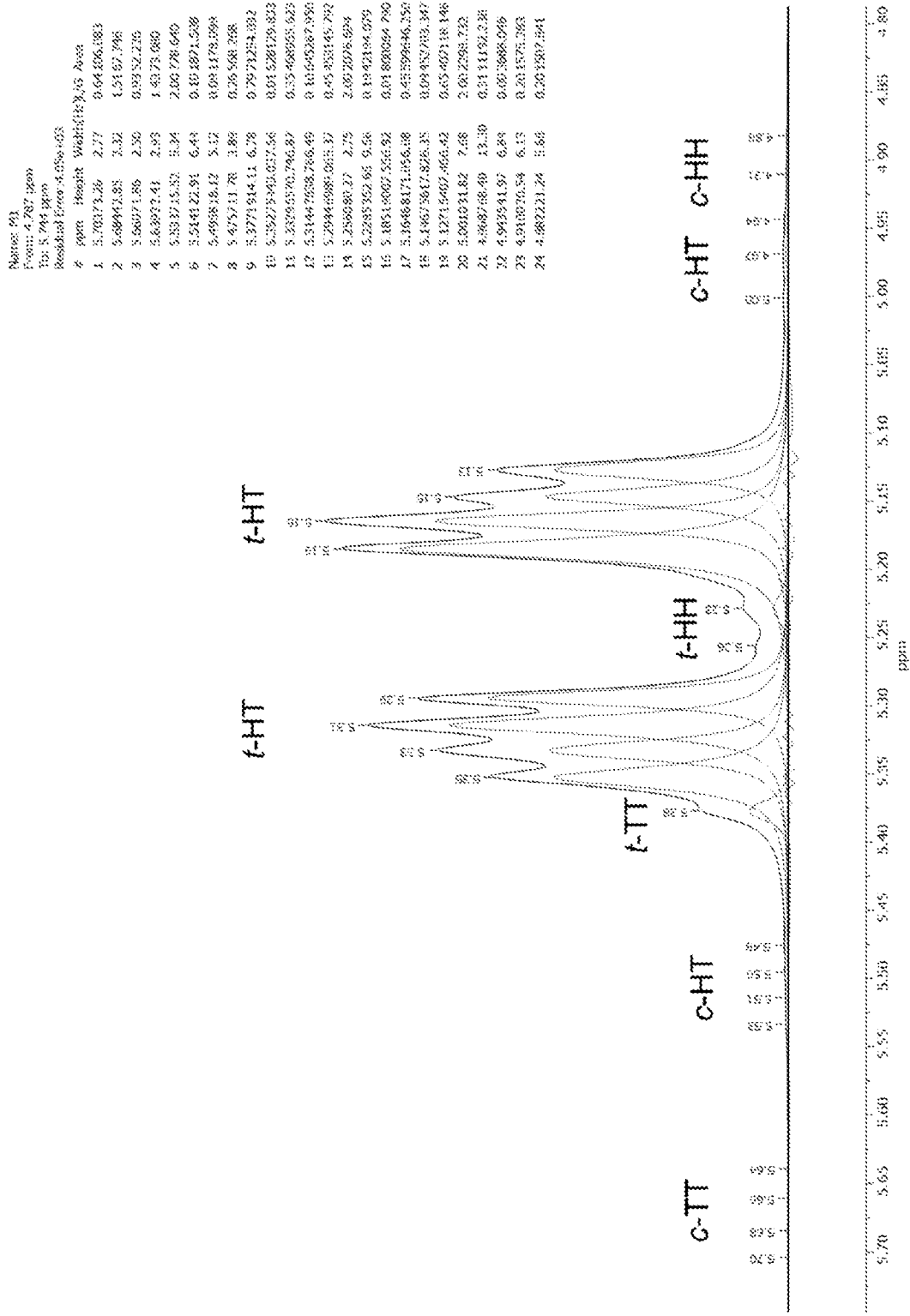
FIG. 26 shows $^1H$ NMR of poly(δ-pinene) in $CDCl_3$ taken on a B400 with $T_0=10$ s. Peak deconvolution was performed in MestReNova with the resulting areas shown on the graph above. Cis "c," trans "t," head-to-tail "HT," head-to-head "HH," and tail-to-tail "TT" designations are labeled above their respective regions.
Figure 27:
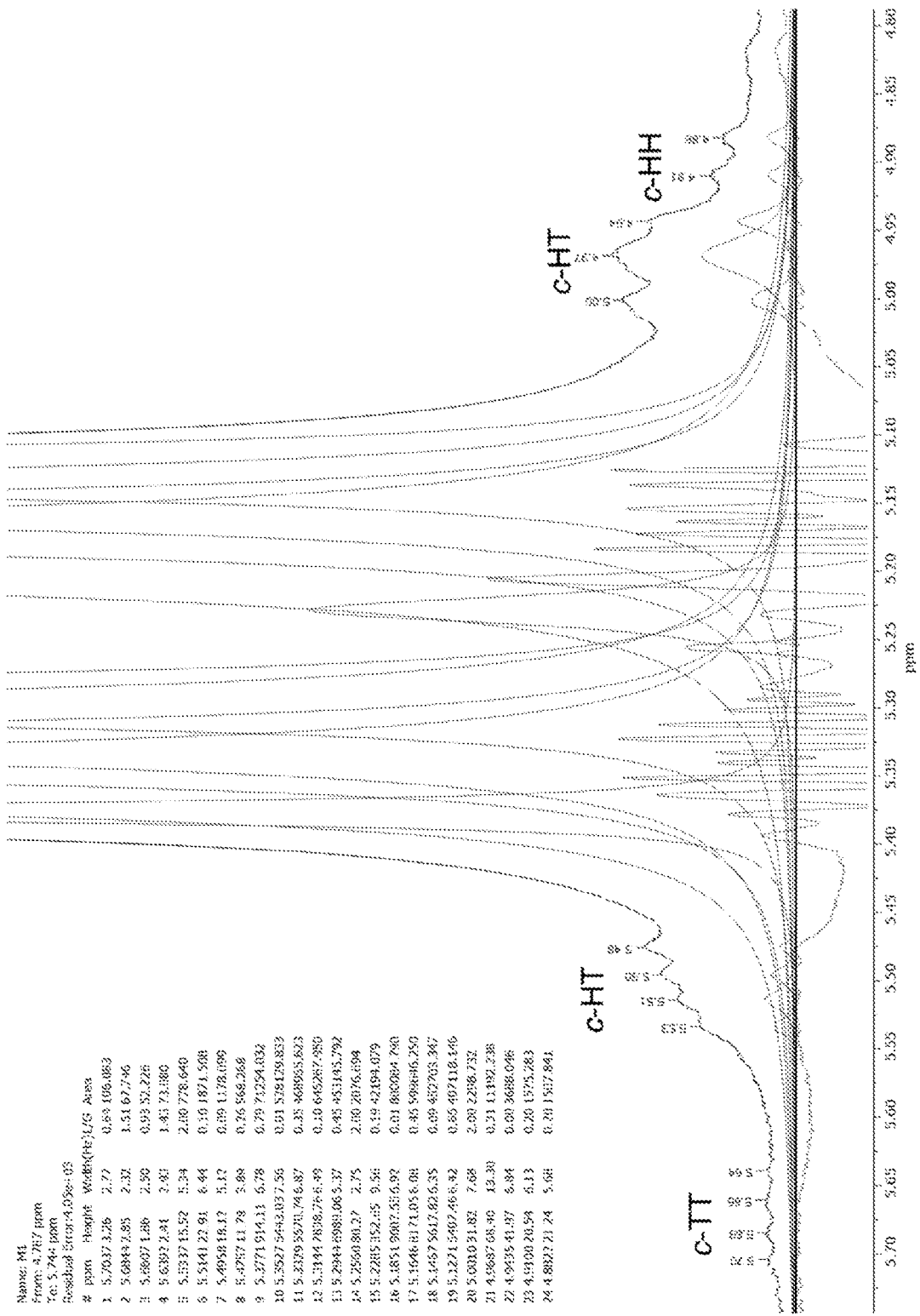
FIG. 27 shows zoomed-in $^1H$ NMR of poly(δ-pinene) in $CDCl_3$ taken on a B400 with $T_0=10$ s. Peak deconvolution was performed in MestReNova with the resulting areas shown on the FIG. 26.

Initial polymerizations were performed on the 3:1 δ:α-pinene mixture in order to prove the efficacy of the ROMP. Grubbs 2nd Generation catalyst was chosen for these initial studies due to its' high catalytic activity and functional group tolerance. Polymerization was conducted with aliquots taken between 15 seconds to 512 minutes in order to monitor the reaction speed. The results of this study demonstrated a very active monomer in δ-pinene, with near quantitative conversion occurring only 10 minutes after reaction start, with most of that time coming from an induction period brought about from the relatively slow initiation of G2 (FIGS. 24-25).

Resulting from the G2/δ-pinene polymerization, the catalyst was switched to the faster initiating but slower propagating, Grubbs 3' generation catalyst to slow to reaction down and afford higher control over the polymerization. In addition to this, out of concern about the effects α-pinene might have on catalyst viability and reaction rates, an extra purification step was added at the end of the synthesis to remove the α-isomer, as is described in the synthesis section. Isomeric separation can also be achieved through the utilization of differing complexation rates between either secondary or tertiary olefins interacting with silver nitrate.

Figures 9A, 9B:
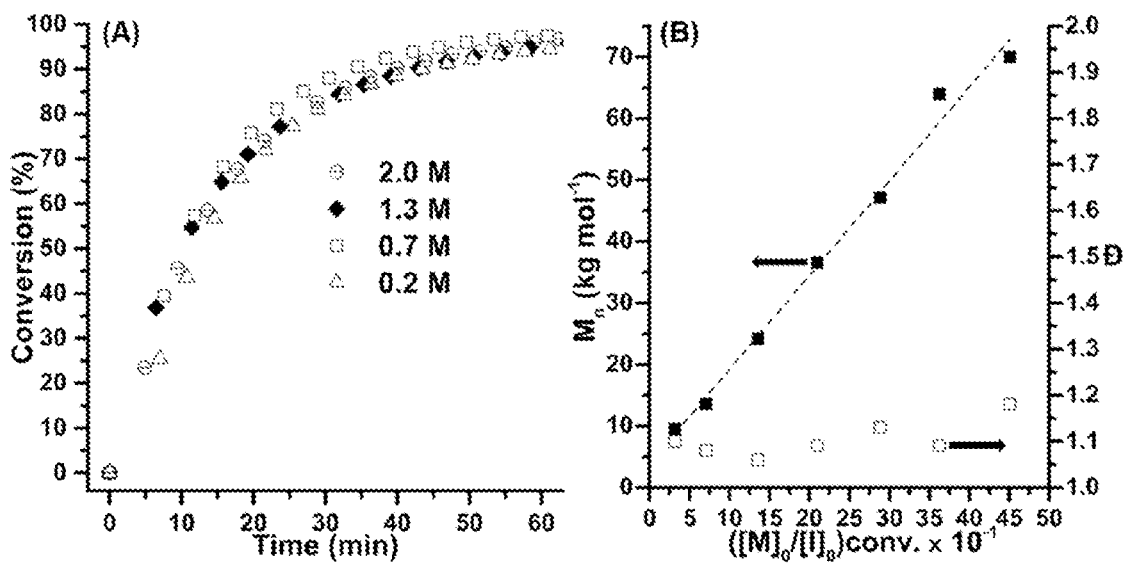
FIGS. 9A-9B illustrate.
Figure 10:
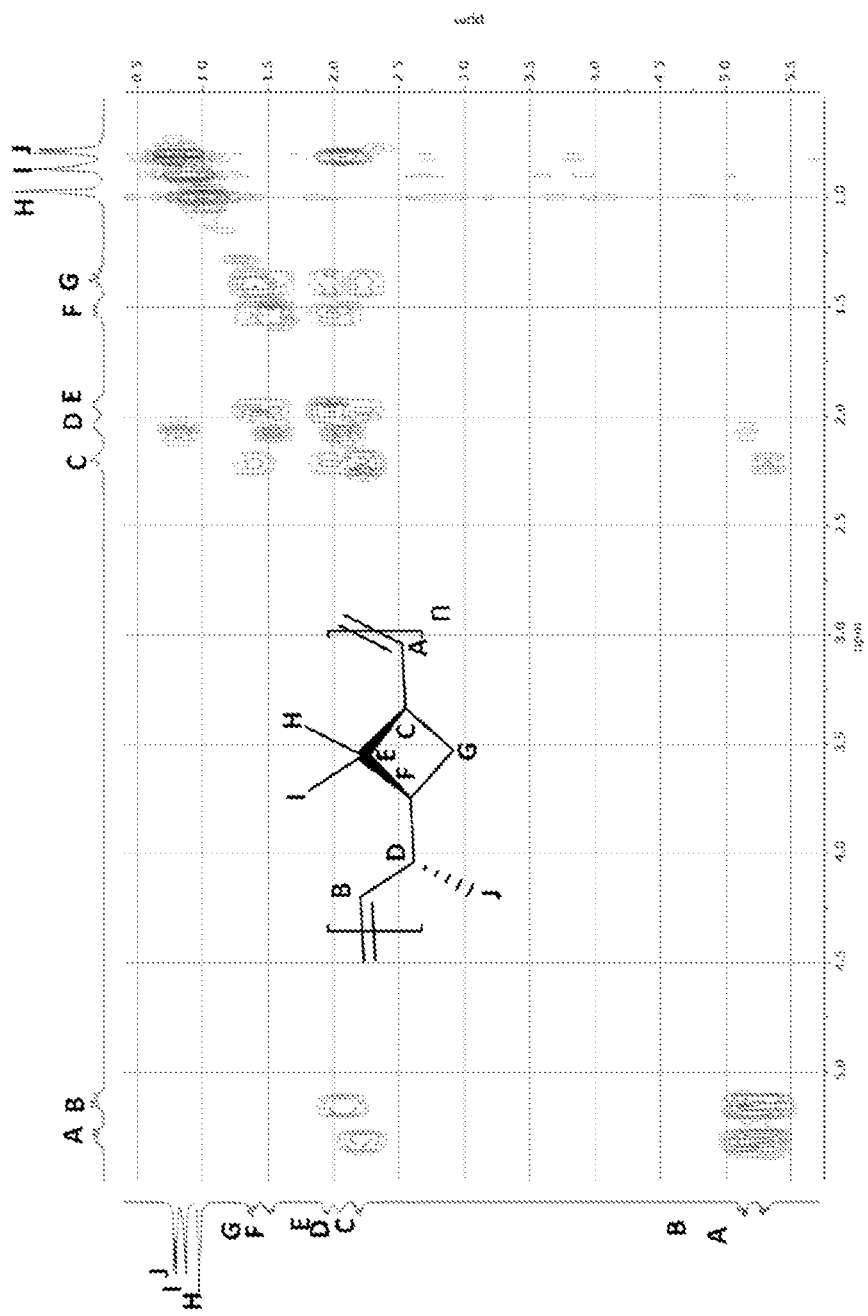
FIG. 10 shows a COSY NMR spectrum (CDCl$_3$, 25° C.) of poly(δ-pinene).
Figure 11:
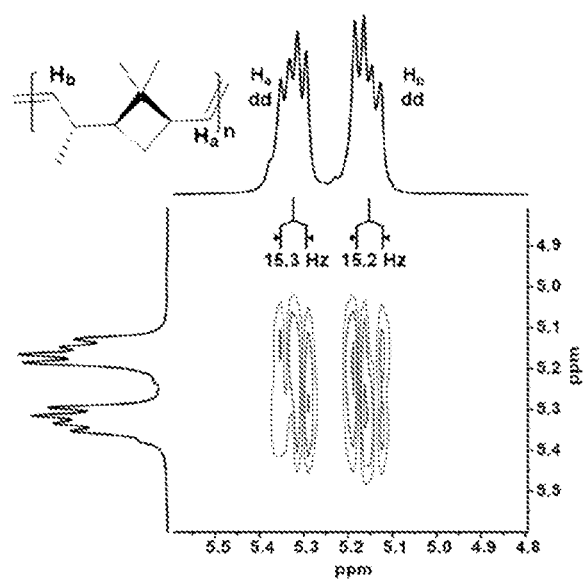
FIG. 11 depicts a $^1$H-$^1$H correlated spectrum (COSY) NMR of an olefinic region of pδp.
Figure 12:
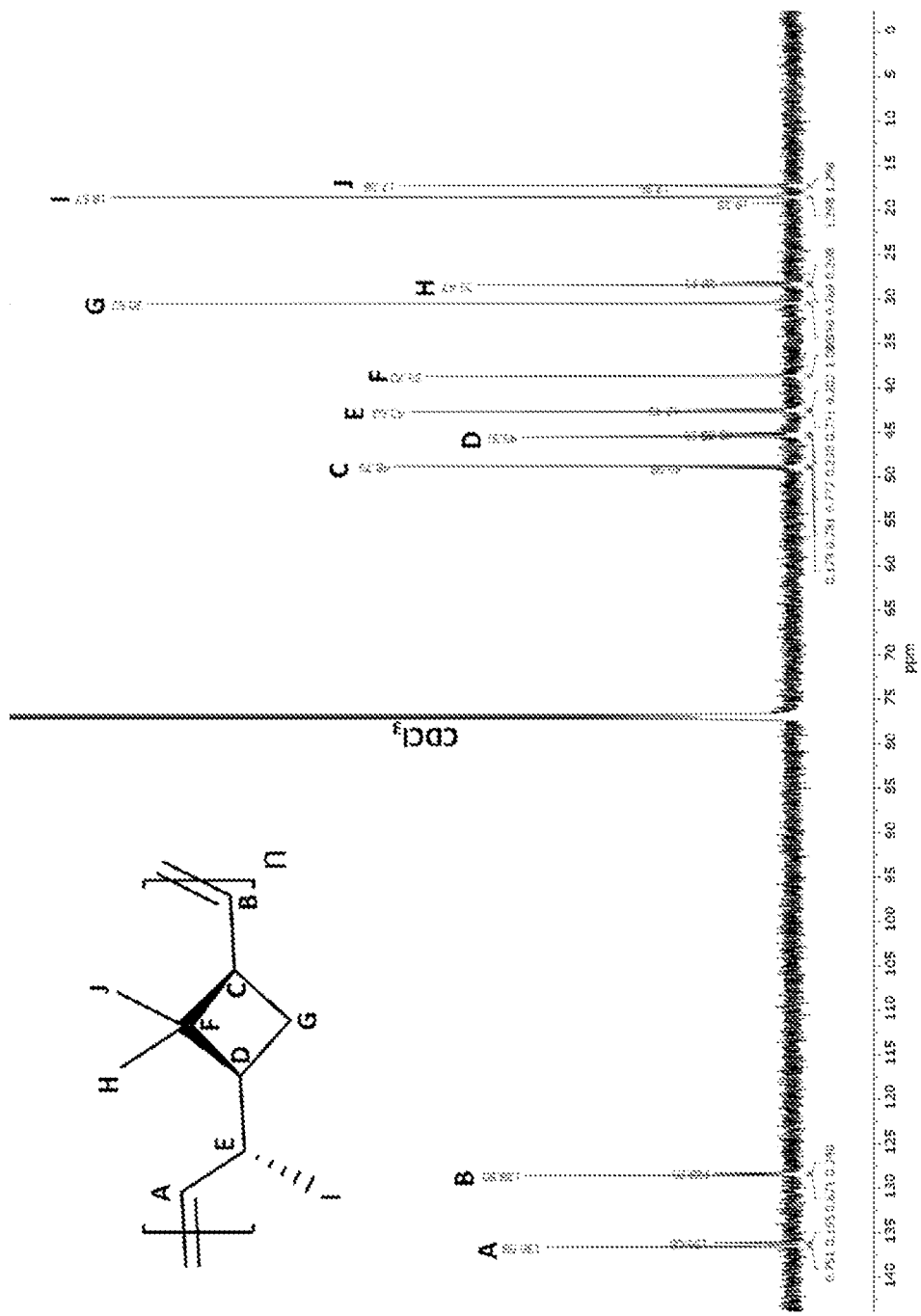
FIG. 12 shows a $^{13}$C NMR spectrum (CDCl$_3$, 25° C.) of poly(δ-pinene).
Figure 13:
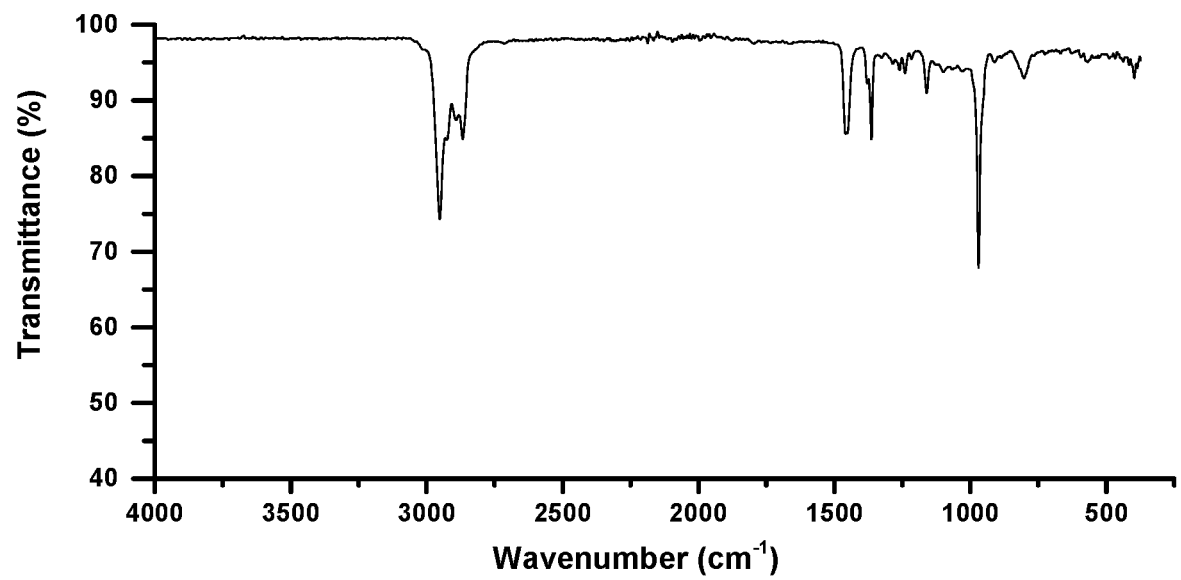
FIG. 13 shows an FTIR spectrum of poly(δ-pinene).
Figure 14:
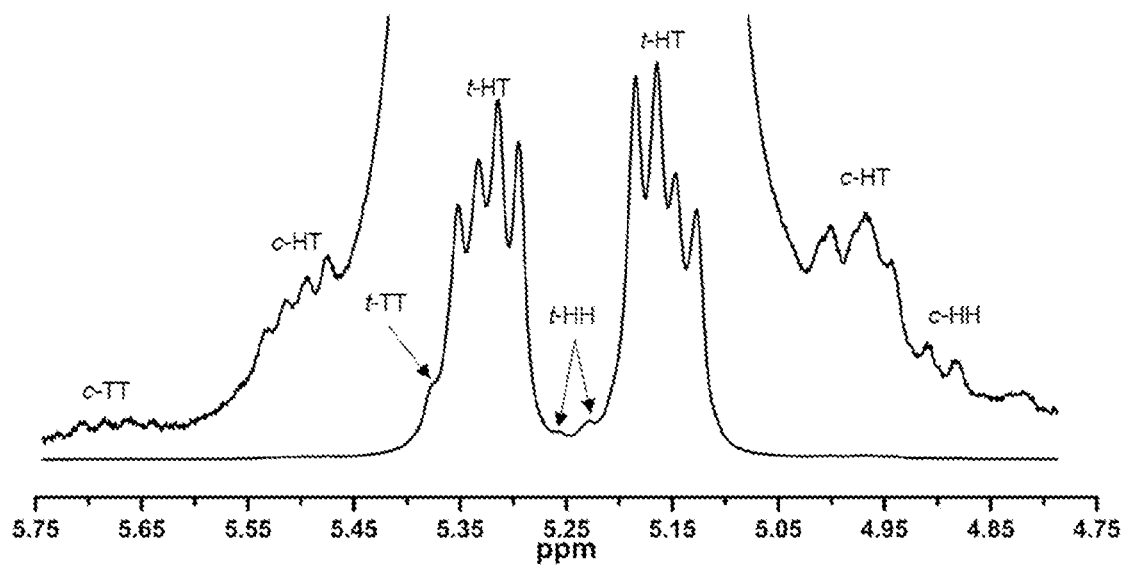
FIG. 14 depicts stacked $^1$H-NMR spectra of the olefin region of poly(δ-pinene) in CDCl$_3$. The bottom trace is the broad view of the two major olefin peaks that correspond to trans head-to-tail pδp. The top trace is a greatly zoomed-in version of the same spectrum in order to show minor contributing olefin peaks.

G3 polymerizations of purified δ-pinene were carried out in NMR tubes utilizing deuterated chloroform as a solvent in order to monitor reaction kinetics over the course of the reaction. The polymerization of δ-pinene proceeded in a much more controlled manner than the aforementioned G2 study while still achieving extremely high conversions independent of monomer concentration (FIG. 9A). In order to demonstrate the living-like nature of G3 polymerization of δ-pinene, a series of polymerizations were carried out with varying monomer to catalyst ratios. Polymer conversion was measured through $^1$H-NMR monitoring of the olefin peak prior to polymer purification via precipitation in methanol. Polymer was vacuum dried prior to molar mass determination via gel-permeation chromatography. The results of these trials demonstrate excellent control over the reactions, with molar masses steadily increasing from 10 to 70 kg mol$^{-1}$ as a direct function of $[M]_0/[I]_0$ while dispersity remains low for all samples, 1.2>Đ (FIG. 9B).

The decomposition of pδp was gathered by thermogravimetric analysis (TGA), with a heating rate of 10° C. min$^{-1}$ under an argon atmosphere. The decomposition temperature was calculated at the point of 5% of the initial mass of pδp lost, $T_d$=337° C. (FIG. 19). Differential scanning calorimetry was similarly performed at a heating rate of 10° C. min$^{-1}$ under an inert nitrogen atmosphere and exhibited a glass transition temperature of $T_g$=99° C. (FIG. 20).

Regioregularity was examined through peak decoupling of a concentrated $^1$H NMR of pδp in CDCl$_3$ (FIGS. 7, 8, 14, and 26-27). Decoupled peaks were assigned configurations based on previous work done and can be seen in FIG. 14, and their full values can be examined in Table 1. The results of this analysis show a highly regioregular polymer with 96.87% of the polymer is both trans and head-to-tail with regards to positional isomerism. This result agrees well with results previously garnered in cyclooctene-based monomers, wherein a greater steric hindrance asymmetrically applied to an allylic position of an internal olefin led to predominately (up to 99%) distal insertion of catalyst.

TABLE 1

Deconvoluted peak areas of poly(δ-pinene). Designations are labeled, grouped, and summed in order to calculate the overall regioregularity of pδp.

| Peak # | ppm | Area | Designation | Total Area (%) |
|---|---|---|---|---|
| 1 | 5.70 | 106.083 | c-TT | 0.01 |
| 2 | 5.68 | 67.746 | | |
| 3 | 5.66 | 52.226 | | |
| 4 | 5.64 | 73.080 | | |
| 5 | 5.53 | 778.640 | c-HT | 0.10 |
| 6 | 5.51 | 1871.508 | | |
| 7 | 5.50 | 1178.099 | | |
| 8 | 5.48 | 568.268 | | |
| 9 | 5.38 | 71254.032 | t-TT | 1.58 |
| 10 | 5.35 | 528129.833 | t-HT | 46.61 |
| 11 | 5.33 | 468955.623 | | |
| 12 | 5.31 | 645267.950 | | |
| 13 | 5.29 | 453145.792 | | |
| 14 | 5.26 | 2076.694 | t-HH | 0.98 |
| 15 | 5.23 | 42194.079 | | |
| 16 | 5.19 | 800084.790 | t-HT | 50.26 |
| 17 | 5.16 | 599646.250 | | |
| 18 | 5.15 | 452703.347 | | |
| 19 | 5.13 | 407118.146 | | |
| 20 | 5.00 | 2298.732 | c-HT | 0.38 |
| 21 | 4.97 | 11192.238 | | |
| 22 | 4.94 | 3688.046 | | |
| 23 | 4.91 | 1575.283 | c-HH | 0.07 |

Furthermore, the olefin signals contain coupling constants of 15.3 and 15.2 Hz each, which is consistent with the literature reported values. Furthering this trans content, 2.56% of pδp is trans-head-to-head or tail-to-tail, resulting from the more sterically hindered insertion and yielding a polymer that has an overall trans content of 99.43%. Of the remaining 0.57% of polymer that is cis, head-to-tail polymer accounts for 0.48%, with the rare and unfavorable cis head-to-head and cis tail-to-tail conformations making up less than 0.1% of poly(δ-pinene)'s composition. The polarimetry of poly(δ-pinene) produced a specific optical rotation $[\alpha]_{589}^{24}$=+83° (±1.1°), which is in agreement with the notion that this polymerization proceeds in a well-defined and well-controlled manner that managed to retain δ-pinenes' stereochemical information ($[\alpha]_{589}^{24}$=−35° (±1.2°)) throughout the polymerization as a direct result of the high head-to-tail selectivity.

Figures 15A, 15B:
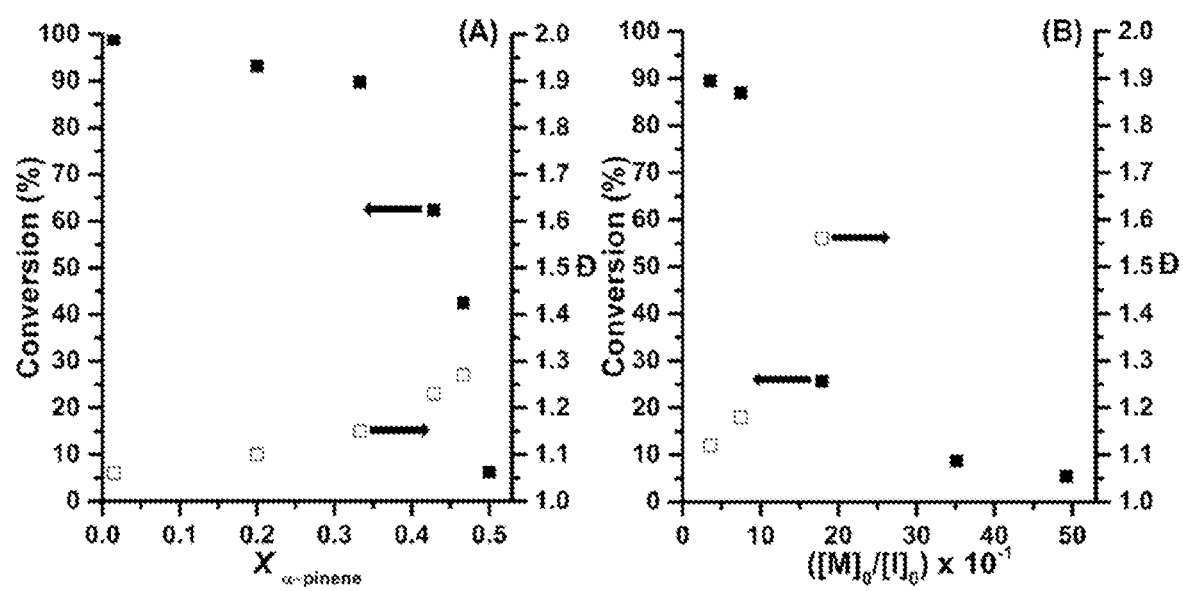
FIGS. 15A-15B illustrate.

To test the necessity of removing α-pinene, a series of polymerizations were conducted with increasing doping of α-pinene relative to δ-pinene. The polymerizations were all carried out, targeting 20 kg mol$^{-1}$ ($[M]_0/[I]_0$=147) at 23° C. for 1 hour. The added α-pinene was treated as a solvent and subtracted from the total volume of CDCl$_3$ needed to make a 1.0 M solution. High conversion (>90%) was achieved up to 33 mol % α-pinene in the monomer feedstock, notably within range of the ~25 mol % α-pinene produced from the monomer synthesis, demonstrating that complex purification is not necessary to produce pδp in good yield. Further increasing the α-pinene inclusion beyond 33 mol % acted to inhibit polymerizations from reaching high conversions and resulted in higher disparities, 1.3>Đ, than observed in the purified monomer reactions. Reactions attempted 50 mol % α-pinene stunted polymerization significantly, only reaching conversions up to 6% and yield no polymer upon precipitation attempts, indicating an upper threshold on α-pinene tolerance in the ring-opening of δ-pinene (FIG. 15A).

In order to further probe the α-pinene tolerance of this polymerization, a new batch of monomers was synthesized. This monomer was purified through vacuum transfer as previously described, however, the α-pinene was never removed through neither CSI reaction nor AgNO$_3$ column, yielding a purified mixture of δ:α-pinene determined by $^1$H-NMR to contain 28.9% α-pinene, as well as an unknown peak at 4.71 ppm that is commonly removed from the more rigorous purification. This monomer feedstock was utilized to perform another series of polymerizations varying the monomer-to-initiator ratio, again treating the excess α-pinene purely as a solvent. The results of this trial show a severe inhibition of polymerization, prevention polymerizations reaching high conversion when ([M]$_0$/[I]$_0$) is high, with dispersity suffering worse than seen in ratios twice as high when no α-pinene is present (FIG. 15B). While these results demonstrate that the polymerization δ-pinene is tolerant of an impure feedstock, those seeking to achieve high molar masses are better achieved with more rigorous purification methods.

Figure 16:
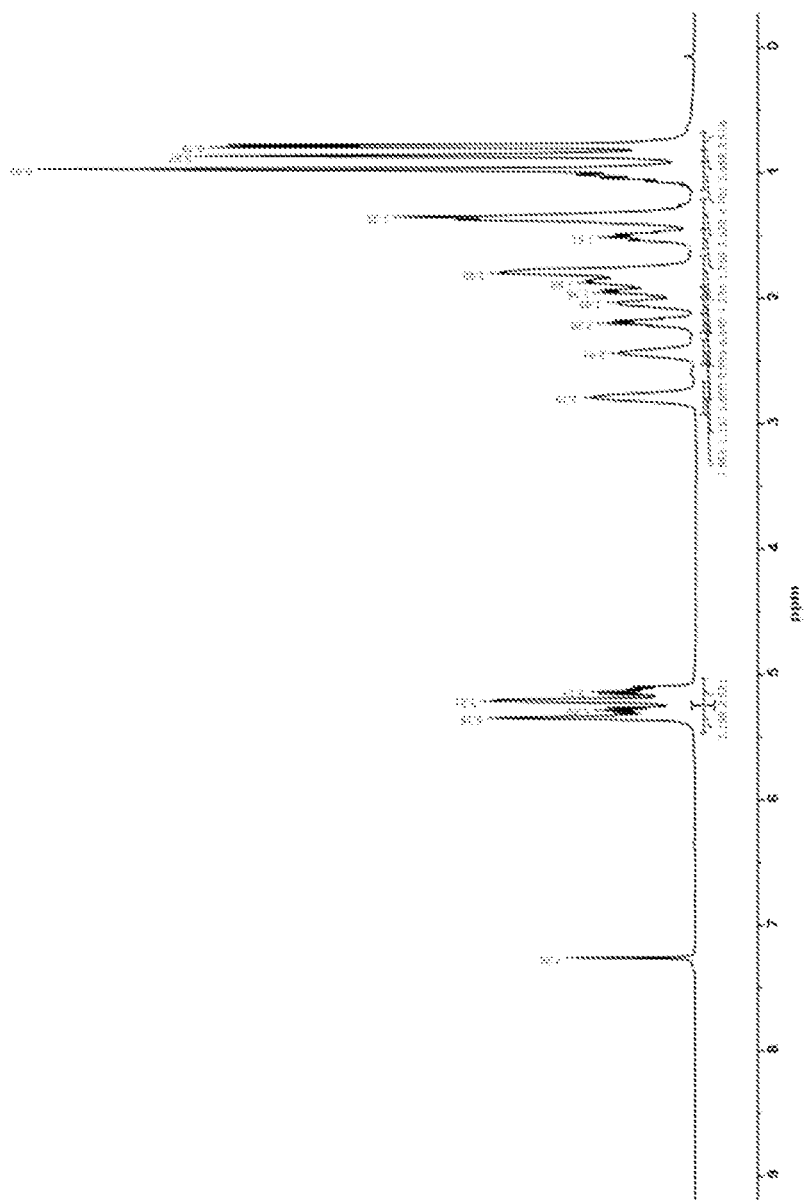
FIG. 16 shows a $^1H$ NMR spectrum ($CDCl_3$, 25° C.) of poly(norbornene)-block-poly(δ-pinene).

A block copolymerization of norbornene and δ-pinene was attempted in order to provide further evidence of the living-like nature of δ-pinene. This polymerization successfully yielded poly(norbornene)-block-poly(δ-pinene) (pnb-b-pδp), with the conversion of δ-pinene remaining high (81.0%) even when utilized as an added monomer to an ongoing polymerization. Additionally, a DSC thermogram yielded two distinct glass transition temperatures, $T_g1=50°$ C. and $T_g2=92°$ C. The presence of multiple distinct glass transitions indicates a microphase separation occurring between the blocks of poly(norbornene) and poly(δ-pinene), with reductions in $T_g$ correlating to the size of each polymer block. Analysis of the $^1$H-NMR of purified pnb-b-pδp gives a mole fraction of 59.3% pnb to 40.7% pδp. Assuming near quantitative conversion of norbornene in conjunction with the 81.0% conversion of δ-pinene observed in the crude NMR yields a mole fraction of 55.3% and 44.7% for poly(norbornene) and poly(δ-pinene), respectively. (FIG. 16) The agreement between these numbers further serves to illustrate δ-pinene behaves in a living-like manner. Furthermore, the NMR again displays sharp signals for the poly(δ-pinene) related peaks, indicating a highly regioregular polymer even when copolymerized.

It is further understood, however, that the δ-pinenes disclosed herein can form other types of copolymers, including statistical copolymers.

In yet further aspects, the compositions formed by the disclosed methods are substantially thermally stable up to about 100° C., up to about 150° C., up to about 200° C., up to about 250° C., up to about 300° C., up to about 350° C., or up to about 400° C. It is understood that the compositions formed by the disclosed methods are able to withstand fire or give protection from it for a period of time.

Additional unlimiting examples of methods of making and use of the δ-pinene can be found in Yarolimek et al. "Investigating the effect of α-pinene on the ROMP of δ-pinene" in Polymer Chemistry, 2021, 12, 5048, the content of which is incorporated herein in its whole entirety.

Other advantages that are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Exemplary Aspects

In view of the described processes and compositions, hereinbelow are described certain more particularly described aspects of the disclosures. These particularly recited aspects should not, however, be interpreted to have any limiting effect on any different claims containing different or more general teachings described herein, or that the "particular" aspects are somehow limited in some way other than the inherent meanings of the language and formulas literally used therein.

Example 1: A polymer comprising: a repeating unit of Formula (I):

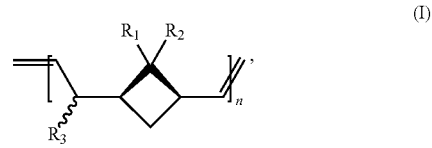

wherein $R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, $C(O)R'$, $C(O)NH_2$, $(O)NHR'$ wherein each of $R_1$, $R_2$, $R_3$, independent of the other, is optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; wherein R' is independently chosen from $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, any of which are optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

Example 2: The polymer of any examples herein, particularly example 1, wherein the polymer is thermoplastic.

Example 3: The polymer of any examples herein, particularly examples 1-2, wherein the polymer has an average molecular weight from about 100 to about 500,000 Dalton.

Example 4: The polymer of any examples herein, particularly examples 1-3, wherein the polymer has a glass transition temperature from about 70° C. to about 140° C.

Example 5: The polymer of any examples herein, particularly examples 1-4, wherein the polymer has a regio-regularity of greater than 0 to 100%.

Example 6: The polymer of any examples herein, particularly example 5, wherein the regioregularity is greater than 50%.

Example 7: The polymer of any examples herein, particularly example 5 or 6, wherein the regioregularity is greater than 90%.

Example 8: The polymer of any examples herein, particularly examples 1-7, wherein the polymer comprises from 0% to 100% of a trans-isomer.

Example 9: The polymer of any examples herein, particularly example 8, wherein the polymer comprises greater than 0% of the trans-isomer.

Example 10: The polymer of any examples herein, particularly example 9, wherein the polymer comprises a head-to-head trans-isomer, a head-to-tail trans-isomer, tail-to-tail isomer trans-isomer, or a combination thereof.

Example 11: The polymer of any examples herein, particularly example 10, wherein the polymer is less than about 10% of the head-to-head trans-isomer, the tail-to-tail isomer trans-isomer, or a combination thereof.

Example 12: The polymer of any examples herein, particularly examples 9-11, wherein the polymer comprises greater than 0% of the cis-isomer.

Example 13: The polymer of any examples herein, particularly examples 9-12, wherein the polymer comprises less than 5% of the cis-isomer.

Example 14: The polymer of any examples herein, particularly examples 1-13, wherein the polymer is crosslinkable.

Example 15: The polymer of any examples herein, particularly examples 1-14, wherein the polymer is substantially transparent.

Example 16: The polymer of any examples herein, particularly examples 1-15, wherein the polymer is moldable and/or extrudable.

Example 17: The polymer of any examples herein, particularly examples 1-16, wherein the polymer is substantially biomass based.

Example 18: The polymer of any examples herein, particularly examples 1-17, wherein the polymer is recyclable.

Example 19: An article comprising the polymer of any examples herein, particularly examples 1-18.

Example 20: The article of any examples herein, particularly example 19, wherein the article comprises bottles, fibers, textile, gloves, components in electronic devices, components in electrical devices, containers, tableware, cutlery, tire components, construction materials, automotive & aeronautic components, sporting equipment, and any combination thereof.

Example 21: A composition comprising: a) the polymer of any examples herein, particularly examples 1-18 present in an amount from greater than 0% to less than 100% by the weight of the composition; and b) an additive, wherein the additive reacts with a ring opened product of the polymer.

Example 22: The composition of any examples herein, particularly example 21, wherein the additive comprises one or more of 3',3'',5',5''-tetrabromophenolsulfonephthalein (Bromophenol Blue), 3,3'-[(3-Carboxy-4-oxocyclohexa-2,5-dien-1-ylidene)methylene]bis(6-hydroxybenzoic acid) (Aurinytricaboxulic acid), ethyl-[4-[[4-[ethyl-[(3-sulfophenyl)methyl]amino]phenyl]-(4-hydroxy-2-sulfophenyl)methylidene]-1-cyclohexa-2,5-dienylidene]-[(3-sulfophenyl)methyl]azanium (Fast Green FCF), or 2,6-Dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol (Bromocresol green).

Example 23: The composition of any examples herein, particularly example 21 or 22, wherein the additive is a sensor indicating changes to the polymer.

Example 24: A block copolymer composition comprising: a) a repeating block unit comprising a monomer of the polymer a monomer of the polymer of any examples herein, particularly examples 1-18 present in an amount from greater than 0% to less than 100% of the block copolymer composition; and b) a repeating block unit comprising a monomer of a further polymer, wherein the further polymer is different from the polymer of a).

Example 25: The block copolymer composition of any examples herein, particularly example 24, wherein the further polymer comprises a cycloolefin.

Example 26: The block copolymer composition of any examples herein, particularly example 25, wherein the cycloolefin polymer comprises a substituted or unsubstituted bridged cyclic hydrocarbon.

Example 27: The block copolymer composition of any examples herein, particularly example 26, the substituted or unsubstituted bridged cyclic hydrocarbon comprises a substituted or unsubstituted norbornene.

Example 28: The block copolymer composition of any examples herein, particularly examples 24-27, further comprising at least one additional repeating block unit that is different from a) or b).

Example 29: An article comprising the block copolymer composition of any examples herein, particularly examples 24-28.

Example 30: A method comprising: polymerizing a δ-pinene in the presence of a catalyst, thereby forming a polymer having a structure of Formula (I):

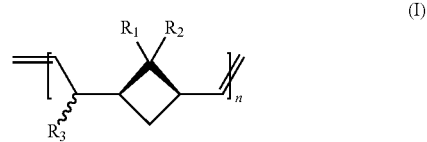

wherein $R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, $C(O)R'$, $C(O)NH_2$, $C(O)NHR'$ wherein each of $R_1$, $R_2$, $R_3$, independent of the other, is optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; wherein R' is independently, chosen from $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, any of which are optionally substituted with $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 10,000.

Example 31: The method of any examples herein, particularly example 30, wherein the catalyst is a ring-opening metathesis polymerization (ROMP) catalyst.

Example 32: The method of any examples herein, particularly example 31, wherein the polymerizing comprises a living ring-opening metathesis polymerization.

Example 33: The method of any examples herein, particularly examples 30-32, wherein the catalyst comprises a Grubbs catalyst.

Example 34: The method of any examples herein, particularly examples 33, wherein the Grubb catalyst is a $3^{rd}$ generation Grubbs catalyst.

Example 35: The method of any examples herein, particularly examples 30-34, wherein the δ-pinene is formed by converting a first composition comprising an α-pinene under conditions effective to form a second composition comprising the δ-pinene.

Example 36: The method of any examples herein, particularly example 35, wherein the second composition comprises an α-pinene from 0% to less than 100%.

Example 37: The method of any examples herein, particularly example 36, wherein the second composition is purified prior to the polymerizing the δ-pinene to substantially remove the α-pinene if present.

Example 38: The method of any examples herein, particularly example 37, wherein the second composition is purified by selectively reacting the α-pinene or separating the α-pinene from the second composition, or by a combination thereof.

Example 39: The method of any examples herein, particularly example 38, wherein the step of selectively reacting comprises forming a derivative of the α-pinene.

Example 40: The method of any examples herein, particularly example 39 wherein the derivative of the α-pinene is a beta-lactam derivative of the α-pinene.

Example 41: The method of any examples herein, particularly example 40, wherein the step of separation comprises a silver nitrate coated silica gel, fractional distillation, or a combination thereof.

Example 42: The method of any examples herein, particularly examples 38-41, wherein a yield of the δ-pinene is greater than 10% to 100% after purification step.

Example 43: The method of any examples herein, particularly examples 30-42, wherein the polymer has an average molecular weight from about 100 to about 500,000 Dalton.

Example 44: The method of any examples herein, particularly examples 30-43, wherein the polymer has a glass transition temperature about 70° C. to about 140° C.

Example 45: The method of any examples herein, particularly examples 30-44, wherein the polymer has a regioregularity of greater than 0 to 100%.

Example 46: The method of any examples herein, particularly example 45 wherein the regioregularity is greater than 50%.

Example 47: The method of any examples herein, particularly example 45 or 46, wherein the regioregularity is greater than 90%.

Example 48: The method of any examples herein, particularly examples 30-47, wherein the polymer comprises from 0% to 100% of a trans-isomer.

Example 49: The method of any examples herein, particularly examples 30-48, wherein the polymer comprises greater than 0% of trans-isomer.

Example 50: The method of any examples herein, particularly example 49, wherein the polymer comprises a head-to-head trans-isomer, a head-to-tail trans-isomer, tail-to-tail isomer trans-isomer, or a combination thereof.

Example 51: The method of any examples herein, particularly example 50, wherein the polymer is less than about 10% the head-to-head trans-isomer, the tail-to-tail isomer trans-isomer, or a combination thereof.

Example 52: The method of any examples herein, particularly examples 49-51, wherein the polymer comprises greater than 0% of the cis-isomer.

Example 53: The method of any examples herein, particularly examples 49-52, wherein the polymer comprises less than 5% of the cis-isomer.

Example 54: The method of any examples herein, particularly examples 30-53, wherein the polymer is crosslinkable.

Example 55: The method of any examples herein, particularly examples 30-54, wherein the polymer is substantially transparent.

Example 56: The method of any examples herein, particularly examples 30-55 wherein the polymer is moldable and/or extrudable.

Example 57: The method of any examples herein, particularly examples 30-56, wherein the polymer is substantially biomass based.

Example 58: The method of any examples herein, particularly examples 30-57, wherein the polymer is recyclable.

Example 59: The method of any examples herein, particularly examples 30-58, further comprising reacting the polymer under conditions effective to form a hydrogenated olefin.

Example 60: A hydrogenated olefin formed by the method of any examples herein, particularly example 59.

Example 61: An article comprising the hydrogenated olefin of any examples herein, particularly example 60.

Example 62: A method comprising: forming a block copolymer comprising: i) a repeating block unit comprising a monomer of the polymer of any examples herein, particularly examples 1-21 present in an amount from greater than 0% to less than 100% of the block copolymer composition; and ii) a repeating block unit comprising a monomer of a further polymer, wherein the further polymer is different from the polymer of i); wherein the step of forming comprising a reaction in the presence of a catalyst.

Example 63: The method of any examples herein, particularly example 62, wherein the further polymer is a cycloolefin polymer.

Example 64: The method of any examples herein, particularly example 62 or 63 wherein the cycloolefin comprises a substituted or unsubstituted bridged cyclic hydrocarbon.

Example 65: The method of any examples herein, particularly example 64, wherein the substituted or unsubstituted bridged cyclic hydrocarbon comprises a substituted or unsubstituted norbornene.

Example 66: The method of any examples herein, particularly examples 62-65, wherein the reaction is a ring-opening metathesis polymerization (ROMP).

Example 67: The method of any examples herein, particularly examples 62-66, wherein the catalyst comprises a Grubbs catalyst.

Example 68: The method of any examples herein, particularly example 67, wherein the Grubbs catalyst is a $3^{rd}$ generation Grubbs catalyst.

Example 69: The method of any examples herein, particularly examples 62-68, wherein the block copolymer further comprises at least one additional repeating block unit comprising a monomer that is different from i) or ii).

Example 70: A copolymer composition comprising: a) a repeating unit comprising a monomer of the polymer of any examples herein, particularly examples 1-18 present in an amount from greater than 0% to less than 100% of the copolymer composition; and b) a repeating unit comprising a monomer of a further polymer, wherein the further polymer is different from the polymer of a).

Example 71: The copolymer composition of any examples herein, particularly example 70, wherein the copolymer composition is a statistical copolymer.

Example 72: The copolymer composition of any examples herein, particularly examples 70-71, further comprising at least one additional repeating unit that is different from a) or b).

Example 73: An article comprising the copolymer composition of any examples herein, particularly examples 70-72.

Example 74: A method comprising: forming a copolymer comprising: i) a repeating unit comprising a monomer of the polymer of any examples herein, particularly examples 1-18 present in an amount from greater than 0% to less than 100% of the copolymer composition; and ii) a repeating unit comprising a monomer of a further polymer, wherein the further polymer is different from the polymer of i); wherein the step of forming comprising a reaction in the presence of a catalyst.

Example 75: The method of any examples herein, particularly example 74, wherein the reaction is a ring-opening metathesis polymerization (ROMP).

Example 76: The method of any examples herein, particularly examples 74-75, wherein the catalyst comprises a Grubbs catalyst.

Example 77: The method of any examples herein, particularly example 76, wherein the Grubbs catalyst is a $3^{rd}$ generation Grubbs catalyst.

Example 78: The method of any examples herein, particularly examples 74-77, wherein the copolymer further comprises at least one additional repeating unit comprising a monomer that is different from i) or ii).

REFERENCES

1. Geyer, R.; Jambeck, J. R.; Law, K. L., Production, use, and fate of all plastics ever made. *Science Advances* 2017, 3 (7).
2. Miller, R. G.; Sorrell, S. R., The future of oil supply. *Philosophical transactions. Series A, Mathematical, physical, and engineering sciences* 2013, 372 (2006), 20130179-20130179.
3. Wilbon, P. A.; Chu, F.; Tang, C., Progress in Renewable Polymers from Natural Terpenes, Terpenoids, and Rosin. *Macromolecular Rapid Communications* 2013, 34 (1), 8-37.
4. Gandini, A., The irruption of polymers from renewable resources on the scene of macromolecular science and technology. *Green Chemistry* 2011, 13 (5), 1061-1083.
5. Kawaguchi, H.; Ogino, C.; Kondo, A., Microbial conversion of biomass into bio-based polymers. *Bioresource Technology* 2017, 245, 1664-1673.
6. Sibaja, B.; Sargent, J.; Auad, M. L., Renewable thermoset copolymers from tung oil and natural terpenes. *Journal of Applied Polymer Science* 2014, 131 (23).
7. Stubba, D.; Lahm, G.; Geffe, M.; Runyon, J. W.; Arduengo Iii, A. J.; Opatz, T., Xylochemistry—Making Natural Products Entirely from Wood. *Angewandte Chemie International Edition* 2015, 54 (47), 14187-14189.
8. Groß, J.; Kühlbom, J.; Opatz, T., Applications of xylochemistry from laboratory to industrial scale. *Green Chemistry* 2020, 22 (14), 4411-4425.
9. Bhatia, S. *Global Impact of the Modern Pine Chemical Industry*; Pine Chemicals Association International: 2016.
10. Zannoni, N.; Leppla, D.; Lembo Silveira de Assis, P. I.; Hoffmann, T.; Sá, M.; Araújo, A.; Williams, J., Surprising chiral composition changes over the Amazon rainforest with height, time and season. *Communications Earth & Environment* 2020, 1 (1), 4.
11. Silvestre, A. J. D.; Gandini, A., Chapter 2—Terpenes: Major Sources, Properties and Applications. In *Monomers, Polymers and Composites from Renewable Resources*, Belgacem, M. N.; Gandini, A., Eds. Elsevier Amsterdam, 2008; pp 17-38.
12. Winnacker, M., Pinenes: Abundant and Renewable Building Blocks for a Variety of Sustainable Polymers. *Angewandte Chemie International Edition* 2018, 57 (44), 14362-14371.
13. Weems, A. C.; Delle Chiaie, K. R.; Worch, J. C.; Stubbs, C. J.; Dove, A. P., Terpene- and terpenoid-based polymeric resins for stereolithography 3D printing. *Polymer Chemistry* 2019, 10 (44), 5959-5966.
14. Della Monica, F.; Kleij, A. W., From terpenes to sustainable and functional polymers. *Polymer Chemistry* 2020.
15. Stadler, B. M.; Wulf, C.; Werner, T.; Tin, S.; de Vries, J. G., Catalytic Approaches to Monomers for Polymers Based on Renewables. *ACS Catalysis* 2019, 9 (9), 8012-8067.
16. Schmedding, R.; Ma, M.; Zhang, Y.; Farrell, S.; Pye, H. O. T.; Chen, Y.; Wang, C. t.; Rasool, Q. Z.; Budisulistiorini, S. H.; Ault, A. P.; Surratt, J. D.; Vizuete, W., α-Pinene-Derived organic coatings on acidic sulfate aerosol impacts secondary organic aerosol formation from isoprene in a box model. *Atmospheric Environment* 2019, 213, 456-462.
17. Yu, P.; Li, A. L.; Liang, H.; Lu, J., Polymerization of β-pinene with Schiff-base nickel complexes catalyst: Synthesis of relatively high molecular weight poly(β-pinene) at high temperature with high productivity. *Journal of Polymer Science Part A: Polymer Chemistry* 2007, 45 (16), 3739-3746.
18. Satoh, K.; Nakahara, A.; Mukunoki, K.; Sugiyama, H.; Saito, H.; Kamigaito, M., Sustainable cycloolefin polymer from pine tree oil for optoelectronics material: living cationic polymerization of β-pinene and catalytic hydrogenation of high-molecular-weight hydrogenated poly(β-pinene). *Polymer Chemistry* 2014, 5 (9), 3222-3230.
19. Lu, J.; Kamigaito, M.; Sawamoto, M.; Higashimura, T.; Deng, Y. X., Living Cationic Isomerization Polymerization of β-Pinene. 1. Initiation with HCl-2-Chloroethyl Vinyl Ether Adduct/TiCl3(OiPr) in Conjunction with nBu4NCl. *Macromolecules* 1997, 30 (1), 22-26.
20. Kennedy, J. P.; Chou, T. In *Poly(isobutylene-co-β-pinene) a new sulfur vulcanizable, ozone resistant elastomer by cationic isomerization copolymerization*, Mechanisms of Polyreactions-Polymer Characterization, Berlin, Heidelberg, 1976//; Springer Berlin Heidelberg: Berlin, Heidelberg, 1976; pp 1-30.
21. Keszler, B.; Kennedy, J. P., Synthesis of high molecular weight poly (β-pinene). In *Macromolecules: Synthesis, Order and Advanced Properties*, Springer Berlin Heidelberg: Berlin, Heidelberg, 1992; pp 1-9.

22. Satoh, K., Controlled/living polymerization of renewable vinyl monomers into bio-based polymers. *Polymer Journal* 2015, 47 (8), 527-536.
23. Kukhta, N. A.; Vasilenko, I. V.; Kostjuk, S. V., Room temperature cationic polymerization of β-pinene using modified AlCl3 catalyst: toward sustainable plastics from renewable biomass resources. *Green Chemistry* 2011, 13 (9), 2362-2364.
24. Winnacker, M.; Sag, J., Sustainable terpene-based polyamides via anionic polymerization of a pinene-derived lactam. *Chemical Communications* 2018, 54 (7), 841-844.
25. Winnacker, M.; Sag, J.; Tischner, A.; Rieger, B., Sustainable, Stereoregular, and Optically Active Polyamides via Cationic Polymerization of ε-Lactams Derived from the Terpene β-Pinene. *Macromolecular Rapid Communications* 2017, 38 (9), 1600787.
26. Quilter, H. C.; Hutchby, M.; Davidson, M. G.; Jones, M. D., Polymerisation of a terpene-derived lactone: a bio-based alternative to ε-caprolactone. *Polymer Chemistry* 2017, 8 (5), 833-837.
27. Firdaus, M.; Montero de Espinosa, L.; Meier, M. A. R., Terpene-Based Renewable Monomers and Polymers via Thiol-Ene Additions. *Macromolecules* 2011, 44 (18), 7253-7262.
28. Winnacker, M.; Lamparelli, D. H.; Capacchione, C.; Güngör, H. H.; Stieglitz, L.; Rodewald, K. S.; Schmidt, M.; Gronauer, T. F., Sustainable Polyesteramides and Copolyamides: Insights into the Copolymerization Behavior of Terpene-Based Lactams. *Macromolecular Chemistry and Physics* 2020, 221 (12), 2000110.
29. Fried, A. D.; Brantley, J. N., Controlled Polymerization of β-Pinadiene: Accessing Unusual Polymer Architectures with Biomass-Derived Monomers. *ACS Macro Letters* 2020, 9 (4), 595-599.
30. Lu, J.; Kamigaito, M.; Sawamoto, M.; Higashimura, T.; Deng, Y. X., Cationic polymerization of β-pinene with the AlCl3/SbCl3 binary catalyst: Comparison with α-pinene polymerization. *Journal of Applied Polymer Science* 1996, 61 (6), 1011-1016.
31. Llevot, A.; Dannecker, P. K.; von Czapiewski, M.; Over, L. C.; Söyler, Z.; Meier, M. A. R., Renewability is not Enough: Recent Advances in the Sustainable Synthesis of Biomass-Derived Monomers and Polymers. *Chemistry—A European Journal* 2016, 22 (33), 11510-11521.
32. Higashimura, T.; Lu, J.; Kamigaito, M.; Sawamoto, M.; Deng, Y. X., Cationic polymerization of α-pinene with the binary catalyst AlCl3/SbCl3. *Die Makromolekulare Chemie* 1992, 193 (9), 2311-2321.
33. Liu, Z.; Zhang, T.; Zeng, W.; Zhu, H.; An, X., Cationic polymerization of α-pinene using Keggin silicotungstic acid as a homogeneous catalyst. *Reaction Kinetics, Mechanisms and Catalysis* 2011, 104 (1), 125.
34. Liu, S.; Zhou, L.; Yu, S.; Xie, C.; Liu, F.; Song, Z., Polymerization of α-pinene using Lewis acidic ionic liquid as catalyst for production of terpene resin. *Biomass and Bioenergy* 2013, 57, 238-242.
35. Stamm, A.; Biundo, A.; Schmidt, B.; Brücher, J.; Lundmark, S.; Olsén, P.; Fogelström, L.; Malmström, E.; Bornscheuer, U. T.; Syrén, P. O., A Retro-biosynthesis-Based Route to Generate Pinene-Derived Polyesters. *ChemBioChem* 2019, 20 (13), 1664-1671.
36. Stockmann, P. N.; Pastoetter, D. L.; Woelbing, M.; Falcke, C.; Winnacker, M.; Strittmatter, H.; Sieber, V., New Bio-Polyamides from Terpenes: α-Pinene and (+)-3-Carene as Valuable Resources for Lactam Production. *Macromolecular Rapid Communications* 2019, 40 (11), 1800903.
37. Miyaji, H.; Satoh, K.; Kamigaito, M., Bio-Based Polyketones by Selective Ring-Opening Radical Polymerization of α-Pinene-Derived Pinocarvone. *Angewandte Chemie International Edition* 2016, 55 (4), 1372-1376.
38. Higashimura, T.; Lu, J.; Kamigaito, M.; Sawamoto, M.; Deng, Y. X., Cationic polymerization of α-pinene with aluminium-based binary catalysts, 2. Survey of catalyst systems. *Die Makromolekulare Chemie* 1993, 194 (12), 3441-3453.
39. Strick, B. F.; Delferro, M.; Geiger, F. M.; Thomson, R. J., Investigations into Apopinene as a Biorenewable Monomer for Ring-Opening Metathesis Polymerization. *ACS Sustainable Chemistry & Engineering* 2015, 3 (7), 1278-1281.
40. Chen, Z.; Zhu, X.; Yang, J.; Mercer, J. A. M.; Burns, N. Z.; Martinez, T. J.; Xia, Y., The cascade unzipping of ladderane reveals dynamic effects in mechanochemistry. *Nature Chemistry* 2020, 12 (3), 302-309.
41. Su, J. K.; Feist, J. D.; Yang, J.; Mercer, J. A. M.; Romaniuk, J. A. H.; Chen, Z.; Cegelski, L.; Burns, N. Z.; Xia, Y., Synthesis and Mechanochemical Activation of Ladderene-Norbornene Block Copolymers. *Journal of the American Chemical Society* 2018, 140 (39), 12388-12391.
42. Hsu, T. G.; Zhou, J.; Su, H. W.; Schrage, B. R.; Ziegler, C. J.; Wang, J., A Polymer with "Locked" Degradability: Superior Backbone Stability and Accessible Degradability Enabled by Mechanophore Installation. *Journal of the American Chemical Society* 2020, 142 (5), 2100-2104.
43. Li, J.; Nagamani, C.; Moore, J. S., Polymer Mechanochemistry: From Destructive to Productive. *Accounts of Chemical Research* 2015, 48 (8), 2181-2190.
44. Takahashi, H.; Sakuragi, M.; Hasegawa, M., A photodegradable polymer Polyhexamethylene-α-truxillamide. *Journal of Polymer Science Part B: Polymer Letters* 1971, 9 (9), 685-688.
45. Wang, Z.; Miller, B.; Mabin, M.; Shahni, R.; Wang, Z. D.; Ugrinov, A.; Chu, Q. R., Cyclobutane-1,3-Diacid (CBDA): A Semi-Rigid Building Block Prepared by [2+2] Photocyclization for Polymeric Materials. *Scientific Reports* 2017, 7 (1), 13704.
46. Tateyama, S.; Masuo, S.; Suvannasara, P.; Oka, Y.; Miyazato, A.; Yasaki, K.; Teerawatananond, T.; Muangsin, N.; Zhou, S.; Kawasaki, Y.; Zhu, L.; Zhou, Z.; Takaya, N.; Kaneko, T., Ultrastrong, Transparent Polytruxillamides Derived from Microbial Photodimers. *Macromolecules* 2016, 49 (9), 3336-3342.
47. Frisch, M. J.; Trucks, G. W.; Schlegel, H. B.; Scuseria, G. E.; Robb, M. A.; Cheeseman, J. R.; Scalmani, G.; Barone, V.; Petersson, G. A.; Nakatsuji, H.; Li, X.; Caricato, M.; Marenich, A. V.; Bloino, J.; Janesko, B. G.; Gomperts, R.; Mennucci, B.; Hratchian, H. P.; Ortiz, J. V.; Izmaylov, A. F.; Sonnenberg, J. L.; Williams; Ding, F.; Lipparini, F.; Egidi, F.; Goings, J.; Peng, B.; Petrone, A.; Henderson, T.; Ranasinghe, D.; Zakrzewski, V. G.; Gao, J.; Rega, N.; Zheng, G.; Liang, W.; Hada, M.; Ehara, M.; Toyota, K.; Fukuda, R.; Hasegawa, J.; Ishida, M.; Nakajima, T.; Honda, Y.; Kitao, O.; Nakai, H.; Vreven, T.; Throssell, K.; Montgomery Jr., J. A.; Peralta, J. E.; Ogliaro, F.; Bearpark, M. J.; Heyd, J. J.; Brothers, E. N.; Kudin, K. N.; Staroverov, V. N.; Keith, T. A.; Kobayashi, R.; Normand, J.; Raghavachari, K.; Rendell, A. P.; Burant, J. C.; Iyengar, S. S.; Tomasi, J.; Cossi, M.; Millam, J. M.; Klene, M.; Adamo, C.; Cammi, R.; Ochterski, J. W.; Martin, R. L.; Morokuma, K.; Farkas, O.; Foresman, J. B.; Fox, D. J. *Gaussian* 09 E.01(Gaussian, Inc.), Wallingford CT, 2013.

48. Nielsen, A. B.; Holder, A. J. *Gauss View* 5.0, *User's Reference*. GAUSSIAN Inc., Pittsburgh, PA, 2009.
49. Brown, H. C.; Tierney, P. A., The Reaction of Lewis Acids of Boron with Sodium Hydride and Borohydride1. *Journal of the American Chemical Society* 1958, 80 (7), 1552-1558.
50. Brown, H. C.; Zweifel, G., A STEREOSPECIFIC CIS HYDRATION OF THE DOUBLE BOND IN CYCLIC DERIVATIVES. *Journal of the American Chemical Society* 1959, 81 (1), 247-247.
51. Blankespoor, R. L.; Piers, K., Hydroboration-oxidation of (1R)-(+)-alpha-pinene to isopinocampheol: A microscale experiment that displays regio- and stereochemistry using NMR spectroscopy and molecular mechanics calculations. *Journal of Chemical Education* 1991, 68 (8), 693.
52. Kaltschnee, L.; Kolmer, A.; Timári, I.; Schmidts, V.; Adams, R. W.; Nilsson, M.; Kövér, K. E.; Morris, G. A.; Thiele, C. M., "Perfecting" pure shift HSQC: full homodecoupling for accurate and precise determination of heteronuclear couplings. *Chemical Communications* 2014, 50 (99), 15702-15705.
53. Szakonyi, Z.; Martinek, T. A.; Sillanpaa, R.; F010p, F., Regio- and stereoselective synthesis of the enantiomers of monoterpene-based 1-amino acid derivatives. *Tetrahedron: Asymmetry* 2007, 18 (20), 2442-2447.
54. Forcina, V.; Garcia-Dominguez, A.; Lloyd-Jones, G. C., Kinetics of initiation of the third generation Grubbs metathesis catalyst: convergent associative and dissociative pathways. *Faraday Discussions* 2019, 220 (0), 179-195.
55. Sanford, M. S.; Love, J. A.; Grubbs, R. H., A Versatile Precursor for the Synthesis of New Ruthenium Olefin Metathesis Catalysts. *Organometallics* 2001, 20 (25), 5314-5318.
56. Guillory, G. A.; Kennemur, J. G., Investigating the effects of bulky allylic substituents on the regioregularity and thermodynamics of ROMP on cyclopentene. *European Polymer Journal* 2019, 120, 109251.
57. Tuba, R.; Al-Hashimi, M.; Bazzi, H. S.; Grubbs, R. H., One-Pot Synthesis of Poly(vinyl alcohol) (PVA) Copolymers via Ruthenium Catalyzed Equilibrium Ring-Opening Metathesis Polymerization of Hydroxyl Functionalized Cyclopentene. *Macromolecules* 2014, 47 (23), 8190-8195.
58. Rablen, P. R., A Procedure for Computing Hydrocarbon Strain Energies Using Computational Group Equivalents, with Application to 66 Molecules †. *Chemistry* 2020, 2 (2).
59. Muhs, M. A.; Weiss, F. T., Determination of Equilibrium Constants of Silver-Olefin Complexes Using Gas Chromatography. *Journal of the American Chemical Society* 1962, 84 (24), 4697-4705.
60. Royzen, M.; Yap, G. P. A.; Fox, J. M., A Photochemical Synthesis of Functionalized trans-Cyclooctenes Driven by Metal Complexation. *Journal of the American Chemical Society* 2008, 130 (12), 3760-3761.
61. Kobayashi, S.; Pitet, L. M.; Hillmyer, M. A., Regio- and Stereoselective Ring-Opening Metathesis Polymerization of 3-Substituted Cyclooctenes. *Journal of the American Chemical Society* 2011, 133 (15), 5794-5797.
62. Martinez, H.; Zhang, J.; Kobayashi, S.; Xu, Y.; Pitet, L. M.; Matta, M. E.; Hillmyer, M. A., Functionalized regioregular linear polyethylenes from the ROMP of 3-substituted cyclooctenes. *Applied Petrochemical Research* 2015, 5 (1), 19-25.
63. Martinez, H.; Miró, P.; Charbonneau, P.; Hillmyer, M. A.; Cramer, C. J., Selectivity in Ring-Opening Metathesis Polymerization of Z-Cyclooctenes Catalyzed by a Second-generation Grubbs Catalyst. *ACS Catalysis* 2012, 2 (12), 2547-2556.
64. Brits, S.; Neary, W. J.; Palui, G.; Kennemur, J. G., A new echelon of precision polypentenamers: highly isotactic branching on every five carbons. *Polymer Chemistry* 2018, 9 (13), 1719-1727.
65. Zhang, J.; Deubler, R.; Hartlieb, M.; Martin, L.; Tanaka, J.; Patyukova, E.; Topham, P. D.; Schacher, F. H.; Perrier, S., Evolution of Microphase Separation with Variations of Segments of Sequence-Controlled Multiblock Copolymers. *Macromolecules* 2017, 50 (18), 7380-7387.
66. Abraham, R. J.; Cooper, M. A.; Indyk, H.; Siverns, T. M.; Whittaker, D., The NMR spectra and conformations of cyclic compounds—VII: The conformations of β-pinene, pinocarvone and the cis- and trans-pinocarveols. *Organic Magnetic Resonance* 1973, 5 (8), 373-377.
67. Kolehmainen, E.; Laihia, K.; Laatikainen, R.; Vepsäläinen, J.; Niemitz, M.; Suontamo, R., Complete Spectral Analysis of the 1H NMR 16-Spin System of β-Pinene. *Magnetic Resonance in Chemistry* 1997, 35 (7), 463-467.
68. Mazzola, E. P.; Lambert, J. B.; Ridge, C. D., The shielding effect of the double bond in 2-norbornene and α-pinene and β-pinene. *Journal of Physical Organic Chemistry* 2018, 31 (8), e3816.
69. Abraham, R. J.; Canton, M.; Griffiths, L., Proton chemical shifts in NMR: Part 17. Chemical shifts in alkenes and anisotropic and steric effects of the double bond. *Magnetic Resonance in Chemistry* 2001, 39 (8), 421-431.
70. Burwell, R. L., The Mechanism of the Pyrolyses of Pinenes. *Journal of the American Chemical Society* 1951, 73 (9), 4461-4462.
71. Pinho, P. G.; Pio, C. A.; Carter, W. P. L.; Jenkin, M. E., Evaluation of α- and β-pinene degradation in the detailed tropospheric chemistry mechanism, MCM v3.1, using environmental chamber data. *Journal of Atmospheric Chemistry* 2007, 57 (2), 171-202.
72. Kolicheski, M. B.; Cocco, L. C.; Mitchell, D. A.; Kaminski, M., Synthesis of myrcene by pyrolysis of β-pinene: Analysis of decomposition reactions. *Journal of Analytical and Applied Pyrolysis* 2007, 80 (1), 92-100.
73. Chae, C. G.; Yu, Y. G.; Seo, H. B.; Kim, M. J.; Kishore, M. Y. L. N.; Lee, J. S., Molecular and kinetic design for the expanded control of molecular weights in the ring-opening metathesis polymerization of norbornene-substituted polyhedral oligomeric silsesquioxanes. *Polymer Chemistry* 2018, 9 (42), 5179-5189.

The invention claimed is:
1. A polymer comprising:
a repeating unit of Formula (I):

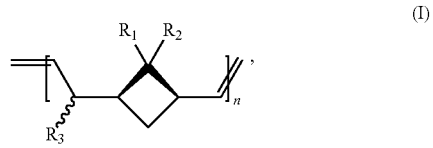

wherein $R_1$, $R_2$, $R_3$, are independently selected from hydrogen, $C_1$-$C_{10}$ alkyl, $C_1$-$C_{10}$ alkoxy, $C_1$-$C_6$ cycloalkyl, $C_5$-$C_{15}$ aryl, $C_1$-$C_{13}$ heteroaryl, $C_3$-$C_{15}$ heterocycloalkyl, $C_1$-$C_{15}$ heteroalkyl, $C_6$-$C_{14}$ aryloxy, hydroxyl, halogen, CN, $CF_3$, $CO_2H$, $CO_2NH_2$, $CO_2NHR'$, $CO_2R'$, C(O)R', C(O)NH$_2$, or C(O)NHR' wherein each of R$_1$, R$_2$, R$_3$, independent of the other, is optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol;

wherein R' is independently chosen from C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, or C$_6$-C$_{14}$ aryloxy, any of which are optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 100,000.

2. The polymer of claim 1, wherein the polymer has an average molecular weight from about 100 to about 500,000 Dalton and/or a glass transition temperature from about 70° C. to about 140° C.

3. The polymer of claim 1, wherein the regioregularity is greater than 50%.

4. The polymer of claim 1, wherein the polymer comprises from 0% to 100% of a trans-isomer.

5. The polymer of claim 4, wherein the polymer is less than about 10% of a head-to-head trans-isomer, a tail-to-tail isomer trans-isomer, or a combination thereof.

6. The polymer of claim 4, wherein the polymer comprises less than 5% of the cis-isomer.

7. The polymer of claim 1, wherein the polymer is crosslinkable.

8. The polymer of claim 1, wherein the polymer is recyclable.

9. An article comprising the polymer of claim 1, wherein the article comprises bottles, fibers, textile, gloves, components in electronic devices, components in electrical devices, containers, tableware, cutlery, tire components, construction materials, automotive and aeronautic components, sporting equipment, or any combination thereof.

10. A composition comprising:
   a) the polymer of claim 1 present in an amount from greater than 0% to less than 100% by the weight of the composition; and
   b) an additive, wherein the additive reacts with a ring-opened product of the polymer.

11. The composition of claim 10, wherein the additive comprises one or more of 3',3",5',5"-tetrabromophenolsulfonephthalein (Bromophenol Blue), 3,3'-[(3-Carboxy-4-oxo-cyclohexa-2,5-dien-1-ylidene)methylene]bis(6-hydroxy-benzoic acid) (Aurinytricaboxulic acid), ethyl-[4-[[4-[ethyl-[(3-sulfophenyl)methyl]amino]phenyl]-(4-hydroxy-2-sulfophenyl)methylidene]-1-cyclohexa-2,5-dienylidene]-[(3-sulfophenyl)methyl]azanium (Fast Green FCF), or 2,6-Dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol (Bromocresol green).

12. The composition of claim 10, wherein the additive is a sensor indicating changes to the polymer.

13. A copolymer composition comprising:
   a) a unit comprising a monomer of the polymer of claim 1 present in an amount from greater than 0% to less than 100% of the copolymer composition; and
   b) a unit comprising a monomer of a further polymer, wherein the further polymer is different from the polymer of a).

14. The copolymer of claim 13, wherein the copolymer is a block copolymer, statistical copolymer, or a combination thereof.

15. The copolymer composition of claim 13, wherein the further polymer comprises a cycloolefin comprising a substituted or unsubstituted bridged cyclic hydrocarbon.

16. The copolymer composition of claim 13 further comprising at least one additional repeating unit that is different from a) and b).

17. A method comprising:
   polymerizing a δ-pinene in the presence of a catalyst, thereby forming a polymer having a structure of Formula (I):

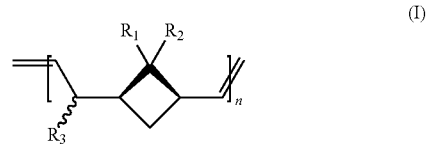

wherein R$_1$, R$_2$, R$_3$, are independently selected from hydrogen, C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, hydroxyl, halogen, CN, CF$_3$, CO$_2$H, CO$_2$NH$_2$, CO$_2$NHR', CO$_2$R', C(O)R', C(O)NH$_2$, or C(O)NHR' wherein each of R$_1$, R$_2$, R$_3$, independent of the other, is optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol;

wherein R' is independently, chosen from C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, or C$_6$-C$_{14}$ aryloxy, any of which are optionally substituted with C$_1$-C$_{10}$ alkyl, C$_1$-C$_{10}$ alkoxy, C$_1$-C$_6$ cycloalkyl, C$_5$-C$_{15}$ aryl, C$_1$-C$_{13}$ heteroaryl, C$_3$-C$_{15}$ heterocycloalkyl, C$_1$-C$_{15}$ heteroalkyl, C$_6$-C$_{14}$ aryloxy, aldehyde, amino, carboxylic acid, ester, ether, halide, hydroxy, ketone, nitro, silyl, sulfo-oxo, sulfonyl, sulfone, sulfoxide, or thiol; and wherein n is an integer from 2 to 10,000.

18. The method of claim 17 wherein the catalyst is a ring-opening metathesis polymerization (ROMP) catalyst.

19. The method of claim 17, wherein the catalyst comprises a Grubbs catalyst.

20. The method of claim 17, wherein the δ-pinene is formed by converting a first composition comprising an α-pinene under conditions effective to form a second composition comprising the δ-pinene such that the second composition comprises an α-pinene from 0% to less than 100%.

21. The method of claim 20, wherein the second composition is purified prior to the polymerizing the δ-pinene to substantially remove the α-pinene if present.

22. The method of claim 21, wherein the second composition is purified by selectively reacting the α-pinene or separating the α-pinene from the second composition, or by a combination thereof.

23. The method of claim 22, wherein the step of selectively reacting comprises forming a derivative of the α-pinene.

24. The method of claim 22, wherein the step of separation comprises a silver nitrate coated silica gel, fractional distillation, or a combination thereof.

25. The method of claim 22, wherein a yield of the δ-pinene is greater than 10% to 100% after purification step.

26. The method of claim 17 further comprising reacting the polymer under conditions effective to form a hydrogenated olefin.

27. A method comprising:
 forming a copolymer comprising:
  i) a unit comprising a monomer of the polymer of claim 1 present in an amount from greater than 0% to less than 100% of the copolymer composition; and
  ii) a unit comprising a monomer of a further polymer, wherein the further polymer is different from the polymer of i);
 wherein the step of forming comprises a reaction in the presence of a catalyst.

28. The method of claim 27 wherein the formed copolymer is a block copolymer, a statistical copolymer, or a combination thereof.

29. The method of claim 27, wherein the copolymer further comprises at least one additional repeating unit comprising a monomer that is different from i) and ii).

* * * * *